(12) United States Patent
Merriman et al.

(10) Patent No.: US 12,504,396 B2
(45) Date of Patent: Dec. 23, 2025

(54) POLYCYCLIC AROMATIC BRIDGES FOR MOLECULAR ELECTRONIC SENSORS

(71) Applicant: Roswell Biotechnologies, Inc., San Diego, CA (US)

(72) Inventors: Barry Merriman, San Diego, CA (US); Tim Geiser, San Diego, CA (US); Paul W. Mola, San Diego, CA (US); Darryl Rideout, San Diego, CA (US)

(73) Assignee: SemiconBio, San Diego, CA (US)

( * ) Notice: Subject to any disclaimer, the term of this patent is extended or adjusted under 35 U.S.C. 154(b) by 154 days.

(21) Appl. No.: 17/602,999

(22) PCT Filed: Apr. 13, 2020

(86) PCT No.: PCT/US2020/028004
§ 371 (c)(1),
(2) Date: Mar. 14, 2022

(87) PCT Pub. No.: WO2020/210832
PCT Pub. Date: Oct. 15, 2020

(65) Prior Publication Data
US 2025/0085251 A1    Mar. 13, 2025

Related U.S. Application Data

(60) Provisional application No. 62/833,562, filed on Apr. 12, 2019.

(51) Int. Cl.
*G01N 27/327*   (2006.01)
*C07D 495/04*   (2006.01)
(Continued)

(52) U.S. Cl.
CPC ....... *G01N 27/3278* (2013.01); *C07D 495/04* (2013.01); *C08F 136/22* (2013.01); *G01N 27/307* (2013.01)

(58) Field of Classification Search
CPC ............ G01N 27/307; G01N 27/3278; G01N 27/308; C12Q 1/6869; C12Q 1/6825;
(Continued)

(56) References Cited

U.S. PATENT DOCUMENTS

| | | | |
|---|---|---|---|
| 4,923,586 | A | 5/1990 | Katayama et al. |
| 5,082,627 | A | 1/1992 | Stanbro |

(Continued)

FOREIGN PATENT DOCUMENTS

WO    2018098286 A1    5/2018

OTHER PUBLICATIONS

Synlett, 2013, 24, 0259-0263 (Year: 2013).*
(Continued)

*Primary Examiner* — Gurpreet Kaur
(74) *Attorney, Agent, or Firm* — Spectrum IP Law Group LLC; Dianoosh Salehi

(57) ABSTRACT

In various embodiments, synthetic bridge molecules are disclosed, usable in molecular electronics sensors. In various aspects, bridge molecules comprise fused ring polycyclic aromatic hydrocarbon structures in the shape of a long and narrow ribbon, with end groups on opposite short ends for selective binding to metal electrodes, one or more substituents near the midpoint of a long edge for binding to a probe molecule, and one or more additional substituent groups for solubility or other effects. In various embodiments, the bridge molecules herein are conducting, and provide a closed circuit in a sensor when forming a bridge between gapped electrodes.

10 Claims, 50 Drawing Sheets

(51) Int. Cl.
  *C08F 136/22* (2006.01)
  *G01N 27/30* (2006.01)
(58) Field of Classification Search
  CPC ..... C07D 495/04; C07C 13/62; C07C 321/24; C07C 2603/54
  See application file for complete search history.

(56) References Cited

U.S. PATENT DOCUMENTS

| | | |
|---|---|---|
| 5,194,133 A | 3/1993 | Clark et al. |
| 5,366,140 A | 11/1994 | Koskenmaki et al. |
| 5,414,588 A | 5/1995 | Barbee, Jr. et al. |
| 5,486,449 A | 1/1996 | Hosono et al. |
| 5,532,128 A | 7/1996 | Eggers et al. |
| 5,583,359 A | 12/1996 | Ng et al. |
| 5,639,507 A | 6/1997 | Galvagni |
| 5,646,420 A | 7/1997 | Yamashita |
| 5,767,687 A | 6/1998 | Geist |
| 5,871,918 A | 2/1999 | Thorp et al. |
| 5,881,184 A | 3/1999 | Guidash |
| 5,965,452 A | 10/1999 | Kovacs |
| 5,982,018 A | 11/1999 | Wark et al. |
| 6,051,380 A | 4/2000 | Sosnowski et al. |
| 6,060,023 A | 5/2000 | Maracas |
| 6,094,335 A | 7/2000 | Early |
| 6,110,354 A | 8/2000 | Saban et al. |
| 6,123,819 A | 9/2000 | Peeters |
| 6,144,023 A | 11/2000 | Clerc |
| 6,238,927 B1 | 5/2001 | Abrams et al. |
| 6,440,662 B1 | 8/2002 | Gerwen et al. |
| 6,464,889 B1 | 10/2002 | Lee et al. |
| 6,506,564 B1 | 1/2003 | Mirkin et al. |
| 6,537,747 B1 | 3/2003 | Mills, Jr. et al. |
| 6,670,131 B2 | 12/2003 | Hashimoto |
| 6,673,533 B1 | 1/2004 | Wohlstadter et al. |
| 6,716,620 B2 | 4/2004 | Bashir et al. |
| 6,749,731 B2 | 6/2004 | Kobori et al. |
| 6,762,050 B2 | 7/2004 | Fukushima et al. |
| 6,764,745 B1 | 7/2004 | Karasawa et al. |
| 6,790,341 B1 | 9/2004 | Saban et al. |
| 6,824,974 B2 | 11/2004 | Pisharody et al. |
| 6,861,224 B2 | 3/2005 | Fujita et al. |
| 6,916,614 B1 | 7/2005 | Takenaka et al. |
| 6,958,216 B2 | 10/2005 | Kelley et al. |
| 7,015,046 B2 | 3/2006 | Wohlstadter et al. |
| 7,075,428 B1 | 7/2006 | Oleynik |
| 7,169,272 B2 | 1/2007 | Fritsch et al. |
| 7,183,055 B2 | 2/2007 | Weide et al. |
| 7,189,435 B2 | 3/2007 | Tuominen et al. |
| 7,202,480 B2 | 4/2007 | Yokoi et al. |
| 7,208,077 B1 | 4/2007 | Albers et al. |
| 7,276,206 B2 | 10/2007 | Augustine et al. |
| 7,399,585 B2 | 7/2008 | Gau |
| 7,432,120 B2 | 10/2008 | Mascolo et al. |
| 7,470,533 B2 | 12/2008 | Xu et al. |
| 7,507,320 B2 | 3/2009 | Hwang et al. |
| 7,531,120 B2 | 5/2009 | Rijn et al. |
| 7,579,823 B1 | 8/2009 | Ayliffe |
| 7,691,433 B2 | 4/2010 | Kronholz et al. |
| 7,785,785 B2 | 8/2010 | Pourmand et al. |
| 7,834,344 B2 | 11/2010 | Mascolo et al. |
| 7,851,045 B2 | 12/2010 | Gandon et al. |
| 7,886,601 B2 | 2/2011 | Merassi et al. |
| 7,901,629 B2 | 3/2011 | Calatzis et al. |
| 7,943,394 B2 | 5/2011 | Flandre et al. |
| 8,241,508 B2 | 8/2012 | D'urso et al. |
| 8,313,633 B2 | 11/2012 | Li et al. |
| 8,351,181 B1 | 1/2013 | Ahn et al. |
| 8,591,816 B2 | 11/2013 | Calatzis et al. |
| 8,652,768 B1 | 2/2014 | Huber et al. |
| 8,753,893 B2 | 6/2014 | Liu et al. |
| 8,927,464 B2 | 1/2015 | Aizenberg et al. |
| 8,940,663 B2 | 1/2015 | Iqbal et al. |
| 9,070,733 B2 | 6/2015 | Rajagopal et al. |
| 9,108,880 B2 | 8/2015 | Jin et al. |
| 9,139,614 B2 | 9/2015 | Medintz et al. |
| 9,306,164 B1 | 4/2016 | Chang et al. |
| 9,829,456 B1 | 11/2017 | Jin et al. |
| 9,956,743 B2 | 5/2018 | Jin et al. |
| 10,036,064 B2 | 7/2018 | Merriman et al. |
| 10,125,420 B2 | 11/2018 | Jin et al. |
| 10,151,722 B2 | 12/2018 | Jin et al. |
| 10,508,296 B2 | 12/2019 | Merriman et al. |
| 10,526,696 B2 | 1/2020 | Jin et al. |
| 10,584,410 B2 | 3/2020 | Jin et al. |
| 10,597,767 B2 | 3/2020 | Merriman et al. |
| 10,648,941 B2 | 5/2020 | Merriman et al. |
| 10,712,334 B2 | 7/2020 | Choi et al. |
| 2002/0022223 A1 | 2/2002 | Connolly |
| 2002/0090649 A1 | 7/2002 | Chan et al. |
| 2002/0137083 A1 | 9/2002 | Kobori et al. |
| 2002/0138049 A1 | 9/2002 | Allen et al. |
| 2002/0142150 A1 | 10/2002 | Baumann et al. |
| 2002/0142477 A1 | 10/2002 | Lewis et al. |
| 2002/0172963 A1 | 11/2002 | Kelley et al. |
| 2002/0184939 A1 | 12/2002 | Yadav et al. |
| 2003/0025133 A1 | 2/2003 | Brousseau |
| 2003/0040173 A1 | 2/2003 | Fonash et al. |
| 2003/0064390 A1 | 4/2003 | Schülein et al. |
| 2003/0087296 A1 | 5/2003 | Fujita et al. |
| 2003/0109031 A1 | 6/2003 | Chafin et al. |
| 2003/0141189 A1 | 7/2003 | Lee et al. |
| 2003/0141276 A1 | 7/2003 | Lee |
| 2003/0186263 A1 | 10/2003 | Frey et al. |
| 2003/0224387 A1 | 12/2003 | Kunwar et al. |
| 2004/0012161 A1 | 1/2004 | Chiu |
| 2004/0014106 A1 | 1/2004 | Patno et al. |
| 2004/0023253 A1 | 2/2004 | Kunwar et al. |
| 2004/0038090 A1 | 2/2004 | Faris |
| 2004/0048241 A1 | 3/2004 | Freeman et al. |
| 2004/0063100 A1 | 4/2004 | Wang |
| 2004/0086929 A1 | 5/2004 | Weide et al. |
| 2004/0096866 A1 | 5/2004 | Hofmann et al. |
| 2004/0146863 A1 | 7/2004 | Pisharody et al. |
| 2004/0209355 A1 | 10/2004 | Edman et al. |
| 2004/0209435 A1 | 10/2004 | Partridge et al. |
| 2004/0229247 A1 | 11/2004 | DeBoer et al. |
| 2004/0235016 A1 | 11/2004 | Hamers et al. |
| 2004/0248282 A1 | 12/2004 | M. et al. |
| 2005/0029227 A1 | 2/2005 | Chapman |
| 2005/0067086 A1 | 3/2005 | Ito et al. |
| 2005/0074911 A1 | 4/2005 | Kornilovich et al. |
| 2005/0151541 A1 | 7/2005 | Brinz et al. |
| 2005/0156157 A1 | 7/2005 | Parsons et al. |
| 2005/0164371 A1 | 7/2005 | Arinaga |
| 2005/0172199 A1 | 8/2005 | Miller et al. |
| 2005/0181195 A1 | 8/2005 | Dubrow |
| 2005/0221473 A1 | 10/2005 | Dubin et al. |
| 2005/0227373 A1 | 10/2005 | Flandre et al. |
| 2005/0247573 A1 | 11/2005 | Nakamura et al. |
| 2005/0285275 A1 | 12/2005 | Son et al. |
| 2005/0287548 A1 | 12/2005 | Bao et al. |
| 2005/0287589 A1 | 12/2005 | Connolly |
| 2006/0003482 A1 | 1/2006 | Chinthakindi et al. |
| 2006/0019273 A1 | 1/2006 | Connolly et al. |
| 2006/0024504 A1 | 2/2006 | Nelson et al. |
| 2006/0024508 A1 | 2/2006 | D'Urso et al. |
| 2006/0029808 A1 | 2/2006 | Zhai et al. |
| 2006/0051919 A1 | 3/2006 | Mascolo et al. |
| 2006/0051946 A1 | 3/2006 | Mascolo et al. |
| 2006/0105449 A1 | 5/2006 | Larmer et al. |
| 2006/0105467 A1 | 5/2006 | Niksa et al. |
| 2006/0128239 A1 | 6/2006 | Nun et al. |
| 2006/0147983 A1 | 7/2006 | O'Uchi |
| 2006/0154489 A1 | 7/2006 | Tornow et al. |
| 2006/0275853 A1 | 12/2006 | Mathew et al. |
| 2007/0026193 A1 | 2/2007 | Luzinov et al. |
| 2007/0048748 A1 | 3/2007 | Williams et al. |
| 2007/0140902 A1 | 6/2007 | Calatzis et al. |
| 2007/0148815 A1 | 6/2007 | Chao et al. |
| 2007/0184247 A1 | 8/2007 | Simpson et al. |
| 2007/0186628 A1 | 8/2007 | Curry et al. |
| 2007/0207487 A1 | 9/2007 | Emig et al. |
| 2007/0231542 A1 | 10/2007 | Deng et al. |

(56) References Cited

U.S. PATENT DOCUMENTS

| | | |
|---|---|---|
| 2008/0012007 A1 | 1/2008 | Li et al. |
| 2008/0098815 A1 | 5/2008 | Merassi et al. |
| 2008/0149479 A1 | 6/2008 | Olofsson et al. |
| 2008/0199657 A1 | 8/2008 | Capron et al. |
| 2008/0199659 A1 | 8/2008 | Zhao |
| 2009/0006284 A1 | 1/2009 | Liu et al. |
| 2009/0011222 A1 | 1/2009 | Xiu et al. |
| 2009/0017571 A1 | 1/2009 | Nuckolls et al. |
| 2009/0020428 A1 | 1/2009 | Levitan et al. |
| 2009/0027036 A1 | 1/2009 | Nuckolls et al. |
| 2009/0152109 A1 | 6/2009 | Whitehead et al. |
| 2009/0162927 A1 | 6/2009 | Naaman et al. |
| 2009/0170716 A1 | 7/2009 | Su et al. |
| 2009/0178935 A1 | 7/2009 | Reymond et al. |
| 2009/0295372 A1 | 12/2009 | Krstic et al. |
| 2009/0297913 A1 | 12/2009 | Zhang et al. |
| 2009/0306578 A1 | 12/2009 | Sivan et al. |
| 2009/0324308 A1 | 12/2009 | Law et al. |
| 2010/0038342 A1 | 2/2010 | Lim et al. |
| 2010/0044212 A1 | 2/2010 | Kim et al. |
| 2010/0055397 A1 | 3/2010 | Kurihara et al. |
| 2010/0132771 A1 | 6/2010 | Lu |
| 2010/0142259 A1 | 6/2010 | Drndic et al. |
| 2010/0149530 A1 | 6/2010 | Tomaru |
| 2010/0167938 A1 | 7/2010 | Su et al. |
| 2010/0184062 A1 | 7/2010 | Steinmüller-Nethl et al. |
| 2010/0188109 A1 | 7/2010 | Edel et al. |
| 2010/0194409 A1 | 8/2010 | Gao et al. |
| 2010/0201381 A1 | 8/2010 | Iqbal et al. |
| 2010/0206367 A1 | 8/2010 | Jeong et al. |
| 2010/0227416 A1 | 9/2010 | Koh et al. |
| 2010/0280397 A1 | 11/2010 | Feldman et al. |
| 2010/0285275 A1 | 11/2010 | Baca et al. |
| 2010/0285601 A1 | 11/2010 | Kong et al. |
| 2010/0288543 A1 | 11/2010 | Hung et al. |
| 2010/0300899 A1 | 12/2010 | Levine et al. |
| 2011/0056845 A1 | 3/2011 | Stellacci et al. |
| 2011/0065588 A1 | 3/2011 | Su et al. |
| 2011/0076783 A1 | 3/2011 | Liu et al. |
| 2011/0091787 A1 | 4/2011 | McGrath et al. |
| 2011/0160077 A1 | 6/2011 | Chaisson et al. |
| 2011/0166034 A1 | 7/2011 | Kwong et al. |
| 2011/0217763 A1 | 9/2011 | Rasooly et al. |
| 2011/0227558 A1 | 9/2011 | Mannion et al. |
| 2011/0229667 A1 | 9/2011 | Jin et al. |
| 2011/0233075 A1 | 9/2011 | Soleymani et al. |
| 2011/0248315 A1 | 10/2011 | Nam et al. |
| 2011/0287956 A1 | 11/2011 | Iqbal et al. |
| 2011/0291673 A1 | 12/2011 | Shibata et al. |
| 2011/0311853 A1 | 12/2011 | Fratti |
| 2011/0312529 A1 | 12/2011 | He et al. |
| 2012/0060905 A1 | 3/2012 | Fogel et al. |
| 2012/0122715 A1 | 5/2012 | Gao et al. |
| 2012/0220046 A1 | 8/2012 | Chao |
| 2012/0258870 A1 | 10/2012 | Schwartz et al. |
| 2012/0286332 A1 | 11/2012 | Rothberg et al. |
| 2012/0309106 A1 | 12/2012 | Eichen et al. |
| 2013/0049158 A1 | 2/2013 | Hong et al. |
| 2013/0071289 A1 | 3/2013 | Knoll |
| 2013/0108956 A1 | 5/2013 | Lu et al. |
| 2013/0109577 A1 | 5/2013 | Korlach et al. |
| 2013/0162276 A1 | 6/2013 | Lee et al. |
| 2013/0183492 A1 | 7/2013 | Lee et al. |
| 2013/0214875 A1 | 8/2013 | Duncan et al. |
| 2013/0239349 A1 | 9/2013 | Knights et al. |
| 2013/0245416 A1 | 9/2013 | Yarmush et al. |
| 2013/0273340 A1 | 10/2013 | Neretina et al. |
| 2013/0281325 A1 | 10/2013 | Elibol et al. |
| 2013/0331299 A1 | 12/2013 | Reda et al. |
| 2014/0001055 A1 | 1/2014 | Elibol et al. |
| 2014/0011013 A1 | 1/2014 | Jin et al. |
| 2014/0018262 A1 | 1/2014 | Reda et al. |
| 2014/0027775 A1 | 1/2014 | Quick et al. |
| 2014/0048776 A1 | 2/2014 | Huang et al. |
| 2014/0054788 A1 | 2/2014 | Majima et al. |
| 2014/0057283 A1 | 2/2014 | Wang et al. |
| 2014/0061049 A1 | 3/2014 | Lo et al. |
| 2014/0079592 A1 | 3/2014 | Chang et al. |
| 2014/0170567 A1 | 6/2014 | Sakamoto et al. |
| 2014/0174927 A1 | 6/2014 | Bashir et al. |
| 2014/0197459 A1 | 7/2014 | Kis et al. |
| 2014/0218637 A1 | 8/2014 | Gao et al. |
| 2014/0235493 A1 | 8/2014 | Zang et al. |
| 2014/0253827 A1 | 9/2014 | Gao et al. |
| 2014/0284667 A1 | 9/2014 | Basker et al. |
| 2014/0320849 A1 | 10/2014 | Chou et al. |
| 2014/0367749 A1 | 12/2014 | Bai et al. |
| 2014/0377900 A1 | 12/2014 | Astier et al. |
| 2015/0005188 A1 | 1/2015 | Levner et al. |
| 2015/0017655 A1 | 1/2015 | Huang et al. |
| 2015/0049332 A1 | 2/2015 | Sun et al. |
| 2015/0057182 A1 | 2/2015 | Merriman et al. |
| 2015/0065353 A1 | 3/2015 | Turner et al. |
| 2015/0068892 A1 | 3/2015 | Ueno et al. |
| 2015/0077183 A1 | 3/2015 | Ciubotaru |
| 2015/0148264 A1 | 5/2015 | Esfandyarpour et al. |
| 2015/0177150 A1 | 6/2015 | Rothberg et al. |
| 2015/0191709 A1 | 7/2015 | Heron et al. |
| 2015/0263203 A1 | 9/2015 | Lewis et al. |
| 2015/0294875 A1 | 10/2015 | Khondaker et al. |
| 2015/0344945 A1 | 12/2015 | Mandell et al. |
| 2016/0017416 A1 | 1/2016 | Boyanov et al. |
| 2016/0155971 A1 | 6/2016 | Strachan et al. |
| 2016/0187282 A1 | 6/2016 | Gardner et al. |
| 2016/0265047 A1 | 9/2016 | Rooyen et al. |
| 2016/0284811 A1 | 9/2016 | Yu et al. |
| 2016/0290957 A1 | 10/2016 | Ram et al. |
| 2016/0319342 A1 | 11/2016 | Kawai et al. |
| 2016/0377564 A1 | 12/2016 | Carmignani et al. |
| 2017/0023512 A1 | 1/2017 | Cummins et al. |
| 2017/0037462 A1 | 2/2017 | Turner et al. |
| 2017/0038333 A1 | 2/2017 | Turner et al. |
| 2017/0043355 A1 | 2/2017 | Fischer |
| 2017/0044605 A1 | 2/2017 | Merriman et al. |
| 2017/0131237 A1 | 5/2017 | Ikeda |
| 2017/0184542 A1 | 6/2017 | Chatelier et al. |
| 2017/0234825 A1 | 8/2017 | Elibol et al. |
| 2017/0240962 A1 | 8/2017 | Merriman et al. |
| 2017/0288017 A1 | 10/2017 | Majima et al. |
| 2017/0332918 A1 | 11/2017 | Keane |
| 2018/0014786 A1 | 1/2018 | Keane |
| 2018/0031508 A1 | 2/2018 | Jin et al. |
| 2018/0031509 A1 | 2/2018 | Jin et al. |
| 2018/0045665 A1 | 2/2018 | Jin et al. |
| 2018/0297321 A1 | 10/2018 | Jin et al. |
| 2018/0305727 A1 | 10/2018 | Merriman et al. |
| 2018/0340220 A1 | 11/2018 | Merriman et al. |
| 2019/0004003 A1 | 1/2019 | Merriman et al. |
| 2019/0033244 A1 | 1/2019 | Jin et al. |
| 2019/0039065 A1 | 2/2019 | Choi et al. |
| 2019/0041355 A1 | 2/2019 | Merriman et al. |
| 2019/0041378 A1 | 2/2019 | Choi et al. |
| 2019/0079041 A1* | 3/2019 | Sinitskii ............... G01N 27/127 |
| 2019/0094175 A1 | 3/2019 | Merriman et al. |
| 2019/0194801 A1 | 6/2019 | Jin et al. |
| 2019/0355442 A1 | 11/2019 | Merriman et al. |
| 2019/0376925 A1 | 12/2019 | Choi et al. |
| 2019/0383770 A1 | 12/2019 | Choi et al. |
| 2020/0157595 A1 | 5/2020 | Merriman et al. |
| 2020/0217813 A1 | 7/2020 | Merriman et al. |
| 2020/0242482 A1 | 7/2020 | Merriman et al. |
| 2020/0277645 A1 | 9/2020 | Merriman et al. |
| 2020/0385850 A1 | 12/2020 | Merriman et al. |
| 2020/0385855 A1 | 12/2020 | Jin et al. |
| 2020/0393440 A1 | 12/2020 | Jin et al. |

OTHER PUBLICATIONS

International Search Report issued on Sep. 4, 2020 for corresponding PCT/US2020/028004, 7 pages.

(56) References Cited

OTHER PUBLICATIONS

Yang et al., "Two-Dimensional Graphene Nanoribbons," J. Am. Soc., vol. 130, Issue 13, Mar. 7, 2008, retrieved on Jun. 5, 2001 from https://pubs.acs.org/doi/10.102/ja710234t.

* cited by examiner

Figure 12 COMPOUND (IV)

COMPOUND (V)

HOMOCYCLIC RINGS
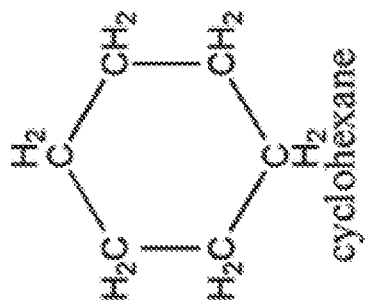
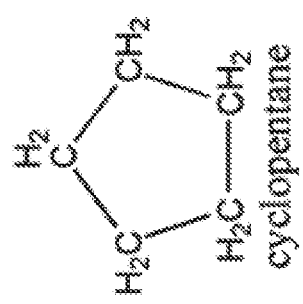
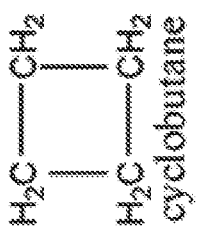
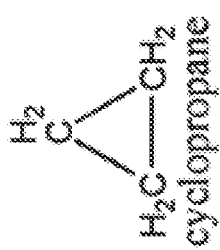
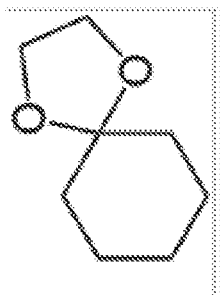
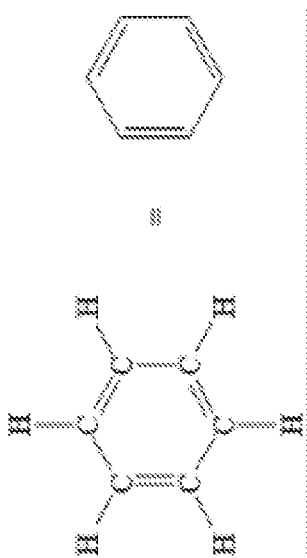
Figure 15

COMPOUND (VI)

COMPOUND (VII)

COMPOUND (VIII)

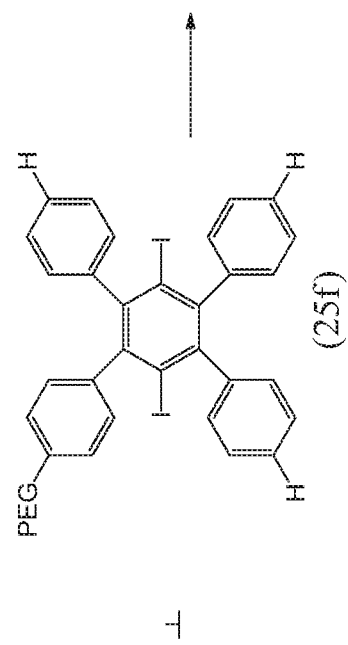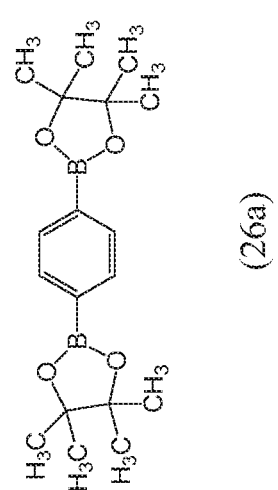
Figure 26

Compound (XIII)

COMPOUND (XIII)

COMPOUND (XII)

COMPOUND (XIX)

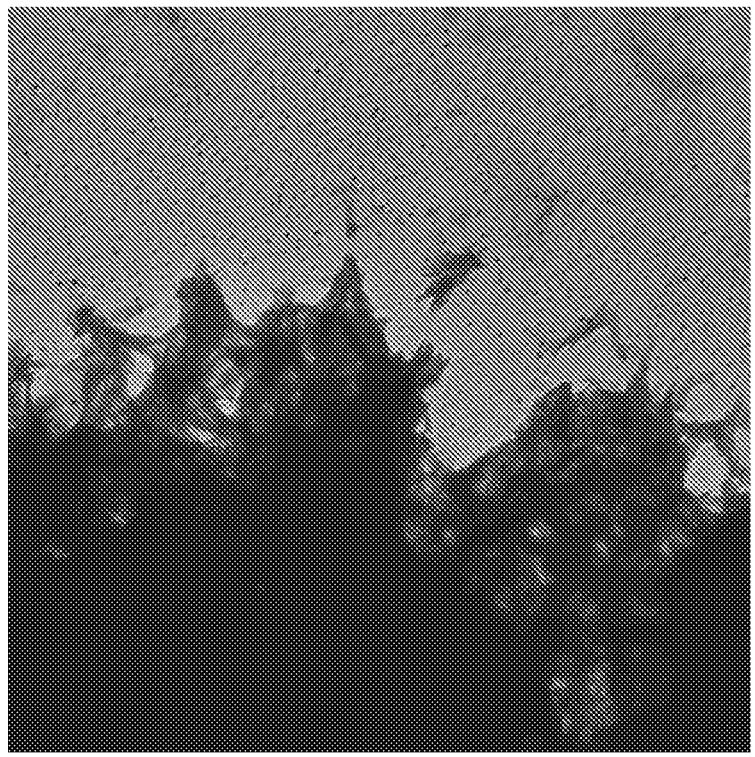
TEM Image
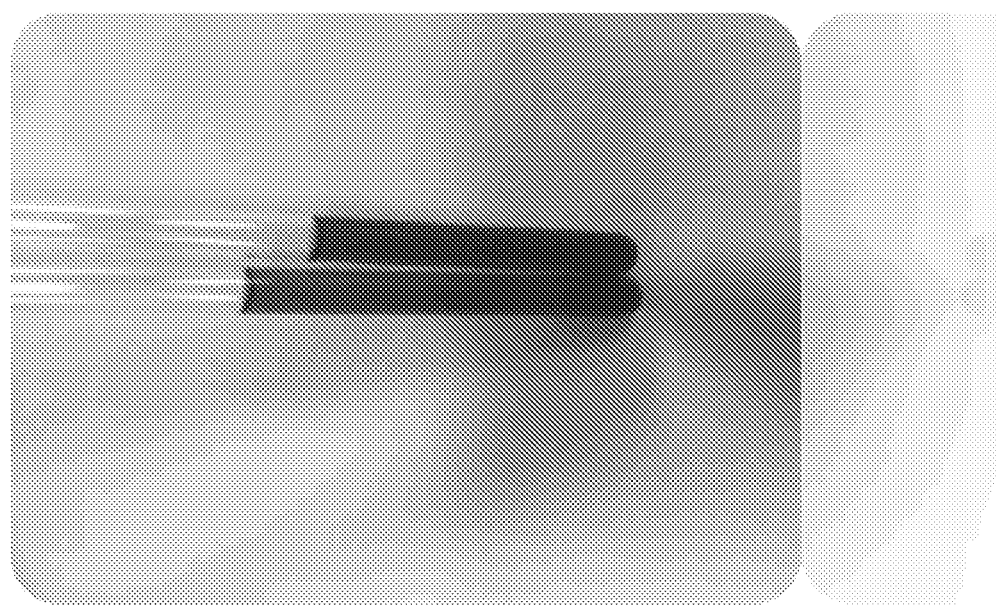
Figure 44c

POLYCYCLIC AROMATIC BRIDGES FOR MOLECULAR ELECTRONIC SENSORS

CROSS-REFERENCE TO RELATED APPLICATIONS

This application is a National Phase of and claims priority to PCT/US2020/028004 filed Apr. 13, 2020, which claims priority to and the benefit of U.S. Provisional Patent Application Ser. No. 62/833,562 filed Apr. 12, 2019 and entitled "Polycyclic Aromatic Bridges for Molecular Electronic Sensors," the disclosure of which is incorporated herein by reference in its entirety.

FIELD

The present disclosure relates generally to molecular electronic sensors, and more particularly to the design, synthesis and use of electron conducting polycyclic aromatic molecules as components in molecular electronic sensors.

BACKGROUND

The broad field of molecular electronics was introduced in the 1970's by Aviram and Ratner. The thought was the smallest possible electrical circuits would incorporate single molecules as circuit components. Molecular circuit elements could provide diverse functions, operating as switches, rectifiers, actuators or sensors, depending on the molecule. Such constructs could be applied as sensors because molecular interactions could provide a basis for single molecule sensing.

For example, one class of molecular elements usable in electronic circuits, which has been studied extensively, is carbon nanotubes (CNTs). A carbon nanotube can be used to bridge between two electrodes, thereby forming a molecular wire. CNTs are extensively studied because, amongst all nano-scale circuitry options, they are easily formed in bulk. For example, they occur as byproducts of combustion at the molecular level and they have good electrical conductivity properties. However, they are not formed in precise, highly controlled reactions, and there is very little ability to engineer, prescribe or design and control their dimensions, or to make modifications to them with atomic precision in terms of location and elemental composition.

Molecular sensors may comprise various biopolymers as bridges between two electrodes and may rely on at least some degree of molecular self-assembly in their fabrication. In spite of the advancements recently seen in the field of molecular electronic sensors, new macromolecules are desired for such sensors, rather than CNTs or biomolecules, such as to reduce cost, ease self-assembly attachment of macromolecules to other components, and to improve performance, durability and reliability of the molecular sensors comprising macromolecular circuit components.

SUMMARY

In various embodiments, synthetic macromolecules are disclosed that are usable in various molecular electronic sensors. In various aspects, the design and synthesis of polycyclic aromatic compounds are described, in addition to the use of the molecules herein as bridge molecules in molecular electronic sensor circuits.

In various embodiments, polycyclic aromatic bridge molecules herein comprise molecular ribbons having a core structure consisting essentially of fused benzene rings and/or heteroaromatic rings, such that the ribbon includes only $sp^2$ hybridized carbon atoms throughout. In various examples, the molecular ribbon is functionalized at specific positions to aid bonding of the molecular ribbon to metal electrodes and to other molecules such as probe molecules, and to optimize desired solubility of the molecular ribbon in various solvents.

BRIEF DESCRIPTION OF THE FIGURES

FIG. 15 illustrates embodiments of homocyclic carbon ring structures usable as building blocks for the polycyclic aromatic hydrocarbon bridge molecules herein or representative of monomeric moieties or sub-structures within the bridge molecules disclosed herein;

FIGS. 22-30 illustrate an embodiment of a synthesis route to the synthetic bridge molecules represented by Compound (XV) of FIG. 21:

FIGS. 44a-44e illustrate an embodiment of a PAH bridge molecule, wherein FIG. 44a illustrates the 2D chemical structure of Compound (XIX): FIG. 44b shows a 3D model of Compound (XIX): FIG. 44c shows a picture of a bulk sample and a TEM image of the compound: FIG. 44d shows the mass spectrum of the compound; and FIG. 44e shows the $^1$H-NMR spectrum of the compound.

DETAILED DESCRIPTION

Figure 1:
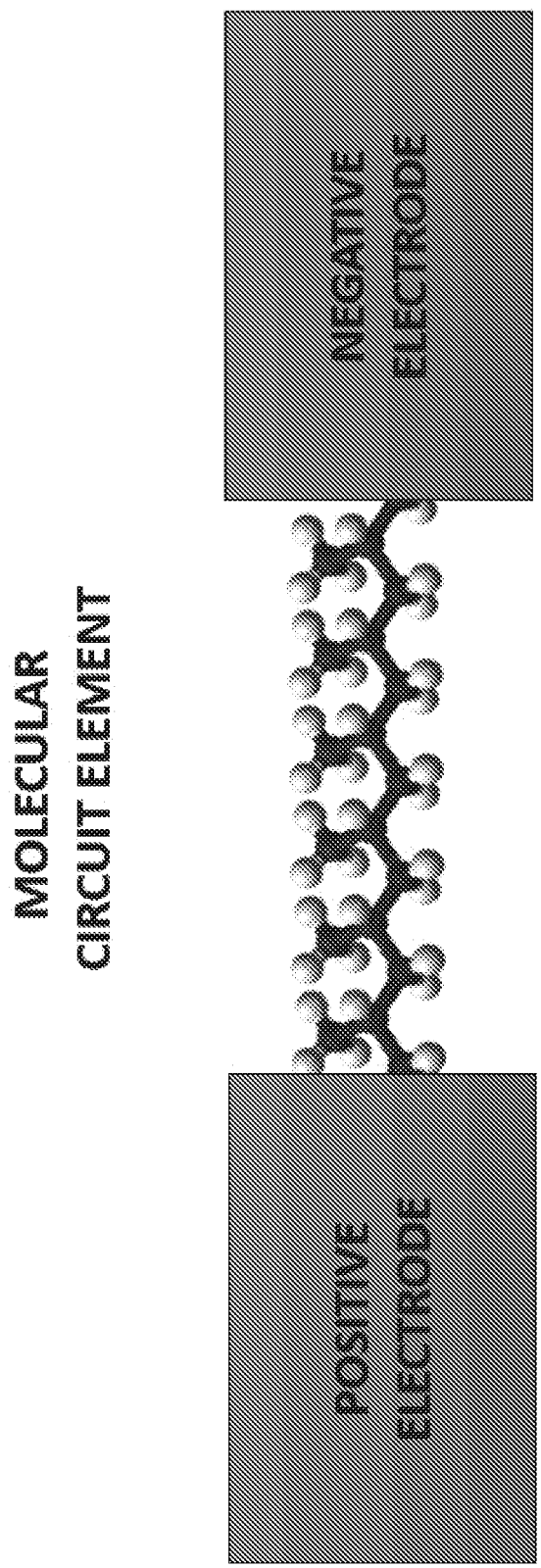
FIG. 1 illustrates the general concept of molecular electronics, wherein a molecular circuit element bridges between two spaced-apart electrodes.

Molecular electronics refers to circuits that use single molecules or molecular assemblies as components of an electronic circuit. FIG. 1 illustrates the general concept of molecular electronics wherein a molecule participates as a critical element in an electrical circuit. In the example illustrated, a molecule is used as a conducting bridge that completes an electrical circuit between positive and negative, or source and drain, electrodes. Such a circuit may be a sensing circuit, in which the single molecular bridge constitutes a transducer interacting with a test solution to produce an electrical signal related to the composition of the test solution. In particular, such a sensor complex may comprise a single conducting bridge molecule, where the signal relates to modulation of an electrical current passing through the molecular conductor.

Figure 2:
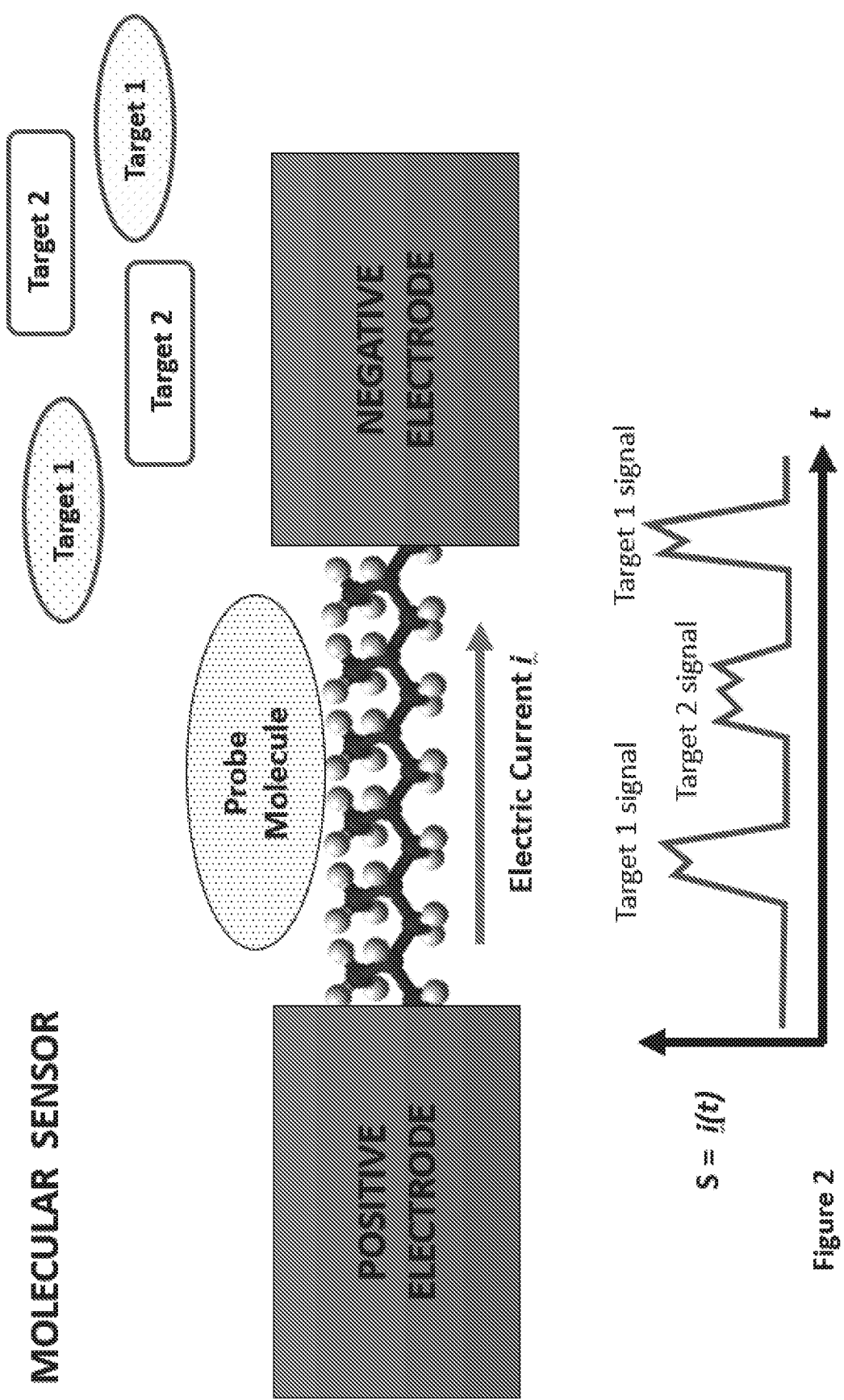
FIG. 2 illustrates an embodiment of a molecular electronics sensor and an example of its functioning.

FIG. 2 illustrates an embodiment of a molecular electronic sensor comprising a circuit that further comprises a probe molecule in addition to a bridge molecule. In the upper portion of the figure, a probe molecule is depicted interacting with various target molecules in solution, wherein the probe molecule is coupled to a molecular bridge molecule that is directly in the circuit. The lower portion of the figure shows the sensor functioning through a monitoring of the current through the bridge molecule, and the generation of discrete current spikes indicating various interactions of the probe molecule with various target molecules.

Figure 3:
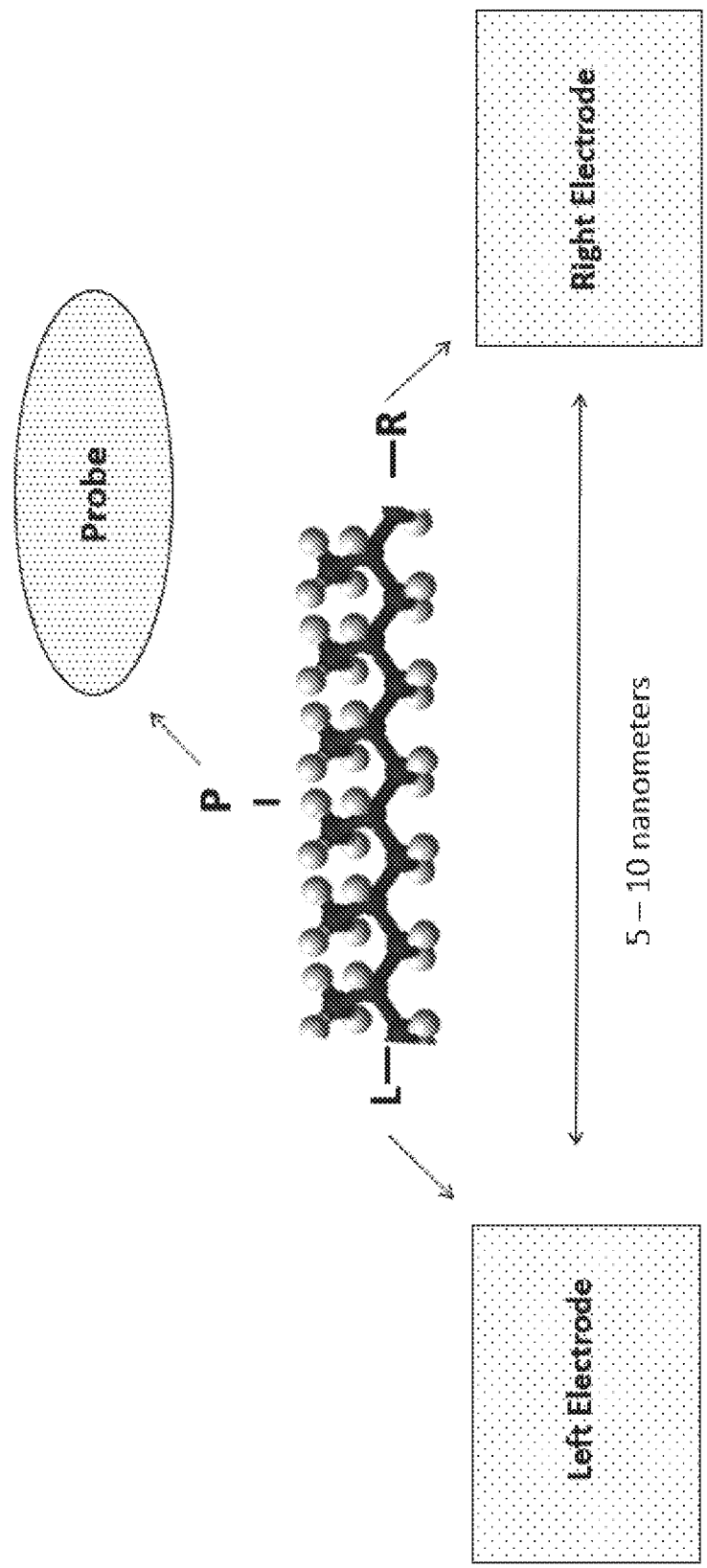
FIG. 3 illustrates an embodiment of a self-assembly process in the fabrication of a molecular electronic sensor.

FIG. 3 illustrates the general concept of self-assembly in the fabrication of molecular sensors. In various aspects, molecular electronic sensors are able to self-assemble via chemical reactions, allowing for efficient fabrication on a commercial scale. FIG. 3 illustrates a bridge molecule having chemical groups L, R and P capable of self-assembly, whereby a probe molecule ("Probe") conjugates to the P functional group, the left electrode conjugates to the L functional group, and the right electrode conjugates to the R functional group. In various embodiments, L and R are chemically different substituents such that the bridge molecule may self-assemble in a particular orientation to the electrodes. In other examples, L and R are identical groups. Note that "left" and "right" are used throughout the present disclosure to simplify discussions regarding the orientation of a molecule having two ends that can attach to spaced apart electrodes, one end of the molecule attaching to one electrode and the other end of the molecule attaching to the other electrode so as to bridge the gap between the two spaced-apart electrodes. Depending on the spatial orientation of the viewer, the left electrode may be a source electrode and the right electrode a drain electrode, or vice versa. Likewise, a long and narrow molecule (e.g., a DNA oligomer, a polypeptide, or a polycyclic aromatic hydrocarbon nanoribbon) will have a far left end and a far right end, such as the ends of a piece of string or the short ends of a rectangular strip or ribbon.

Figure 4:
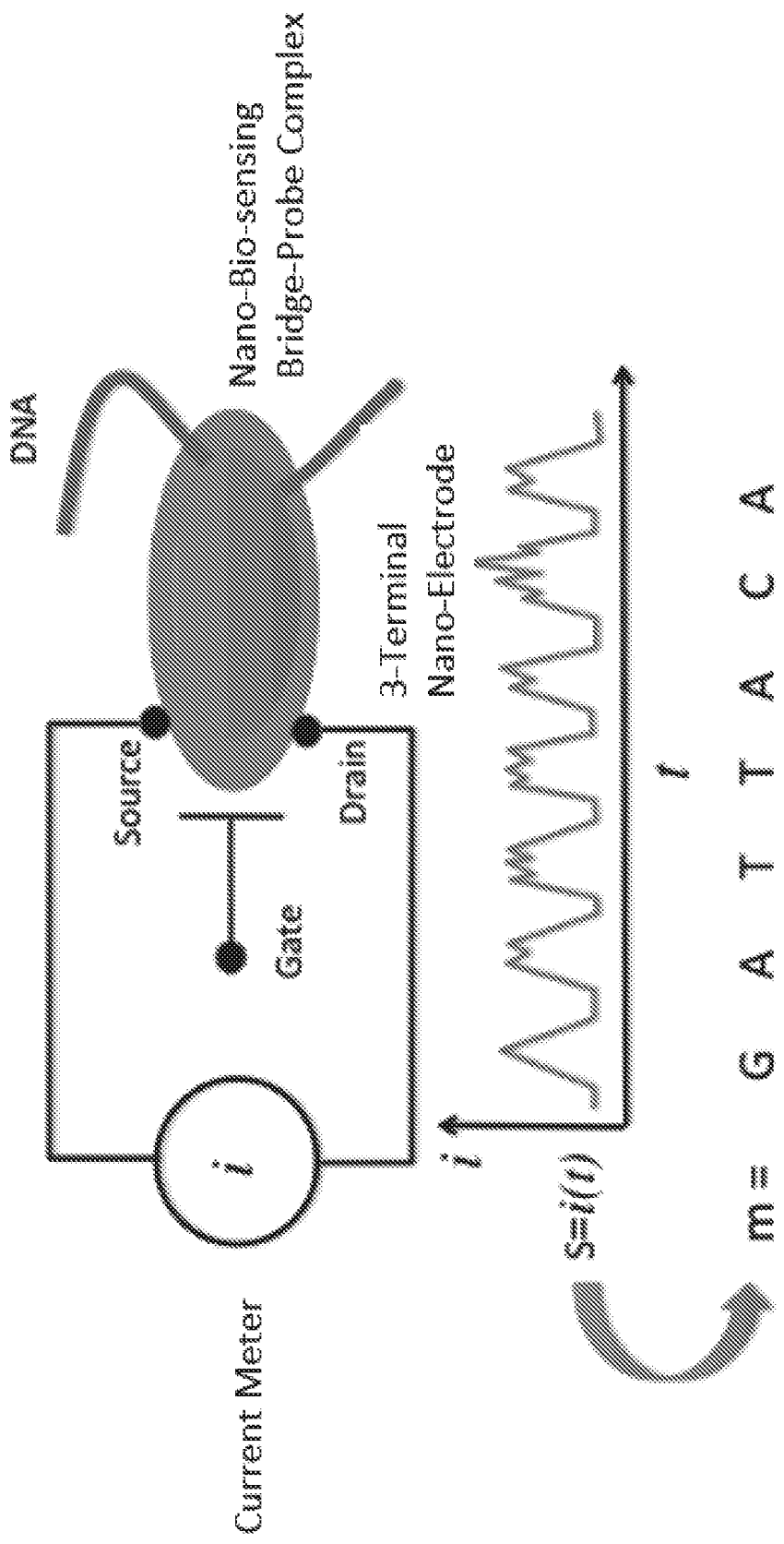
FIG. 4 illustrates an embodiment of a molecular electronic sensor usable for DNA sequencing.
Figure 5:
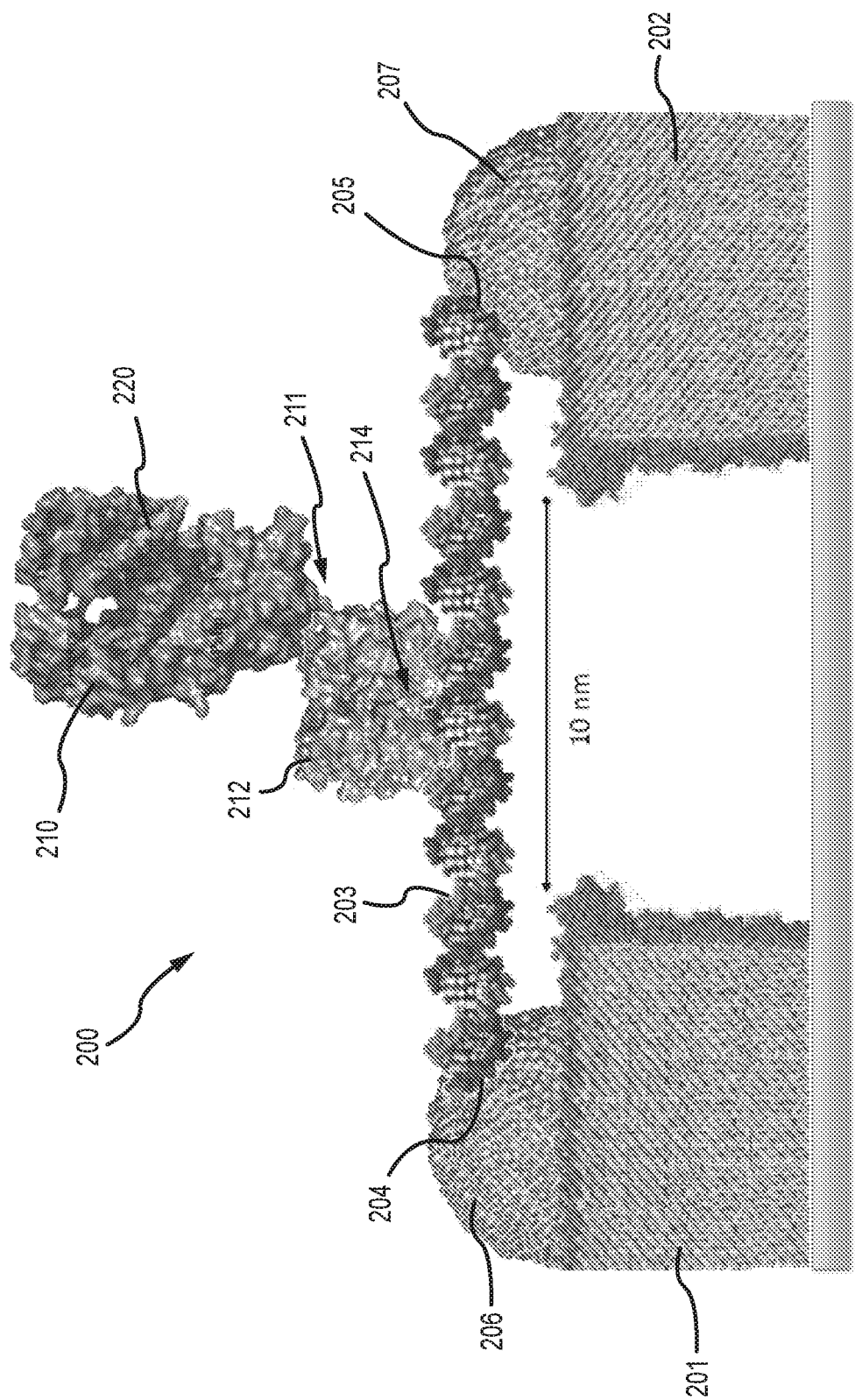
FIG. 5 illustrates an embodiment of a molecular sensor structure comprising a polymerase conjugated to a bridge molecule spanning an electrode gap, usable for DNA sequencing experiments.

Of interest are molecular sensors designed for and applied to DNA sequencing. An embodiment of a molecular sensor for DNA sequencing is illustrated in FIGS. 4 and 5. In these examples, an electronic circuit comprises a molecular complex further comprising an enzyme such as a polymerase conjugated to a bridge molecule. The enzyme processively engages with a DNA strand causing electrical perturbations in the molecular electronic circuit detectable with a sensitive current meter. The conducting bridge molecule may comprise a biopolymer, e.g., a double stranded DNA molecule, and the probe molecule may comprise a DNA polymerase capable of engaging targets of single stranded DNA to produce sequence-related signals. Electrical signals may comprise electrical current spikes over time as shown. The current signals thus observed may contain distinctive spikes that correspond to a particular DNA base, allowing a determination of the DNA sequence.

FIG. 5 illustrates an embodiment of a working sensor 200 in detail, used herein as a DNA reader device for a DNA sequencing system. Molecular sensor structure 200 comprises two electrodes 201 and 202, comprising titanium (Ti), aluminum (Al), copper (Cu), ruthenium (Ru), platinum (Pt), palladium (Pd), chromium (Cr) or other metal. Electrodes 201 and 202 may comprise the source and drain electrodes in a circuit. The electrodes 201 and 202 are separated by a nanogap of about 10 nm. Other gap distances may be required to accommodate other lengths of biomolecular bridges and relative size of a probe molecule conjugated thereto. In this example, the bridge molecule 203 comprises a double-stranded DNA oligomer molecule of about 20 nm in length (e.g., 60 bases: 6 helical turns), with thiol groups 204 and 205 configured at both 3' and 5' ends of the oligomer for coupling of the bridge molecule 203 to gold contacts 206 and 207 provided on each metal electrode 201 and 202. The bonds between the ends of the DNA oligomer and the gold contact points comprise sulfur-gold bonds, available from thiol groups on 5' ends of the DNA bridge molecule binding to the gold. The probe molecule in this sensor comprises Klenow Fragment of *E. coli* Polymerase I molecule 210, chemically crosslinked at covalent linkage 211 to a Streptavidin protein 212, using a biotinylated site on the polymerase, which in turn is coupled to a binding site 214 via a biotinylated nucleotide in the synthetic DNA oligomer 203. In operation, the sensor 200 further comprises a DNA strand 220 being processed by the polymerase 210. FIG. 5 approximates the relative sizes of the molecules and atoms. In accordance with the present disclosure, this exemplary double stranded DNA bridge molecule 203 can be replaced with synthetic bridge molecules, such as the fused polycyclic aromatic hydrocarbon ribbons described herein.

In various embodiments, a molecular sensor for DNA sequencing further comprises arrays of nano-scale electrodes, such as electrodes arranged in a plurality of pairs of electrodes. The two electrodes in a pair of electrodes may be spaced apart (gapped) by a nano-scale gap referred to herein as a "nanogap." An example of a measurement system usable to generate sensor signals corresponding to DNA bases is illustrated in FIG. 6.

Figure 6:
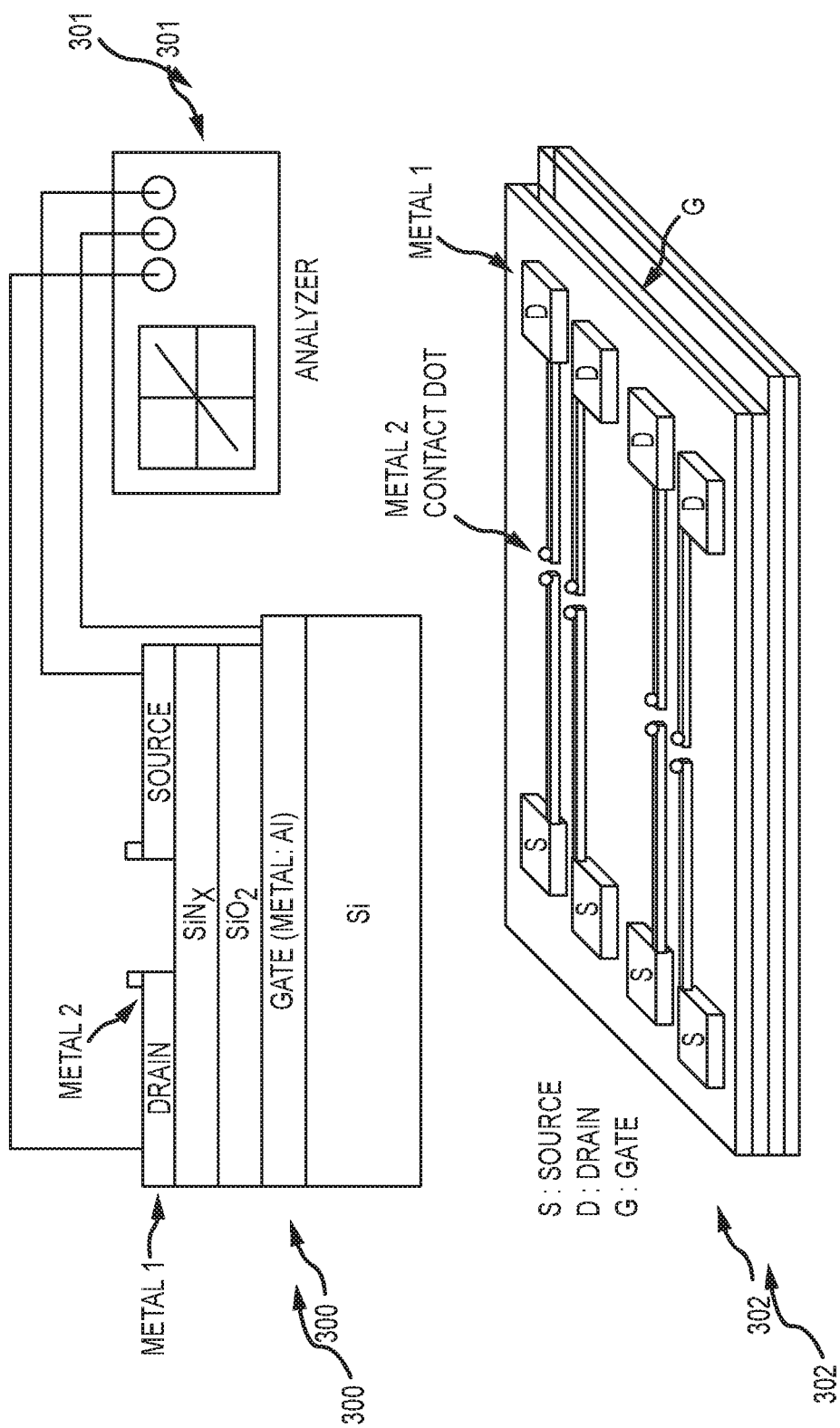
FIG. 6 illustrates an embodiment of a set-up for electrical measurements on molecular sensors.

As illustrated in FIG. 6, such a nano-scale sensor can be placed by post-processing onto the pixels of a CMOS sensor pixel array, which further comprises all the supporting measurement, readout and control circuitry needed to produce these signals from a large number of sensors operating in parallel. FIG. 6 illustrates an embodiment of various electrical components and connections in molecular sensors. In the upper portion of the figure, a cross-section of an electrode-substrate structure 300 is illustrated, with attachment to an analyzer 301 for applying voltages and measuring currents through the bridge molecule of the sensor. In the lower portion of the figure, a perspective view of electrode array 302 is illustrated, usable for bridging circuits. Each pair of electrodes comprises a first metal (e.g., "Metal-1"), and a contact dot or island of a second metal (e.g., "Metal-2") at each electrode end near the gap separating the electrodes. In various examples, Metal-1 and Metal-2 may comprise the same metal or different metals. In other aspects, the contact dots are gold (Au) islands atop metal electrodes comprising a different metal. In various experiments, contact dots comprise gold (Au) beads or gold (Au)-coated electrode tips that support self-assembly of a single bridge molecule over each gap between electrode pairs, such as via thiol-gold binding or reactive carbene-gold binding at each end of the bridge molecule.

Figure 7:
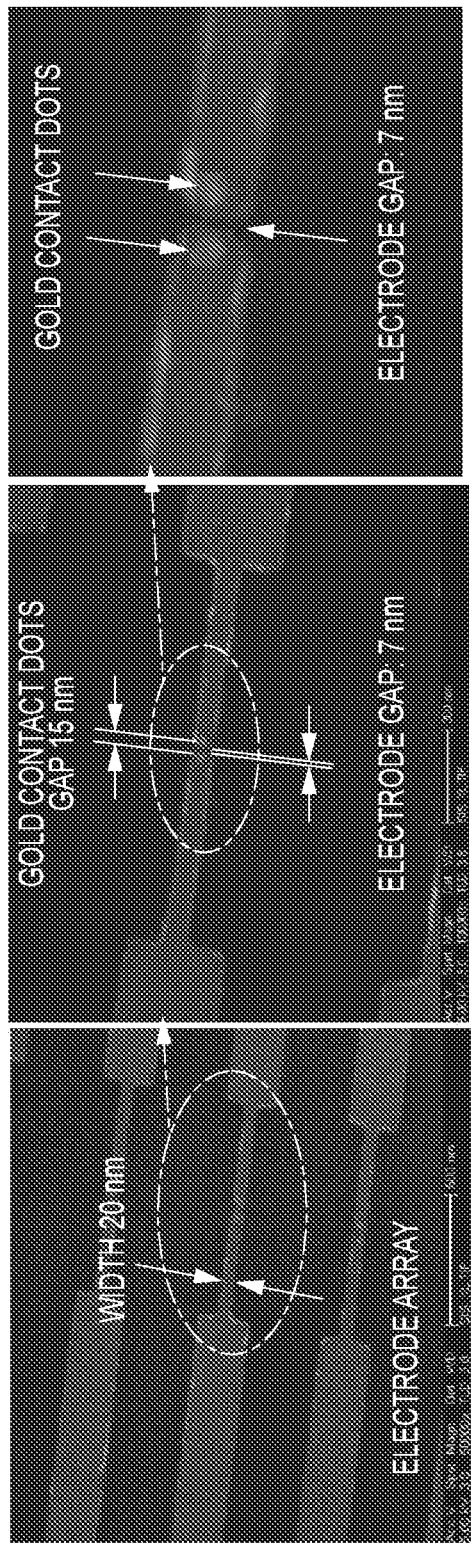
FIG. 7 sets forth electron microscope (EM) images of spaced-apart electrodes comprising gold metal dot contacts for molecular bridge binding.

FIG. 7 illustrates reduction to practice of an embodiment of a DNA sequencing sensor. Electron microscope images show electrodes with gold metal dot contacts for bridge binding. In this example, electrodes are disposed on a silicon substrate, and were produced via e-beam lithography. At the left is shown an array of electrodes, in this case titanium with gold dot contacts. The middle image in the figure is a close-up showing an electrode gap of 7 nm, and the gold dot contacts on the electrodes spaced apart by about 15 nm. The image at the right is a close-up showing approximately 10 nm gold dots at the tips of the electrodes.

Figure 8:
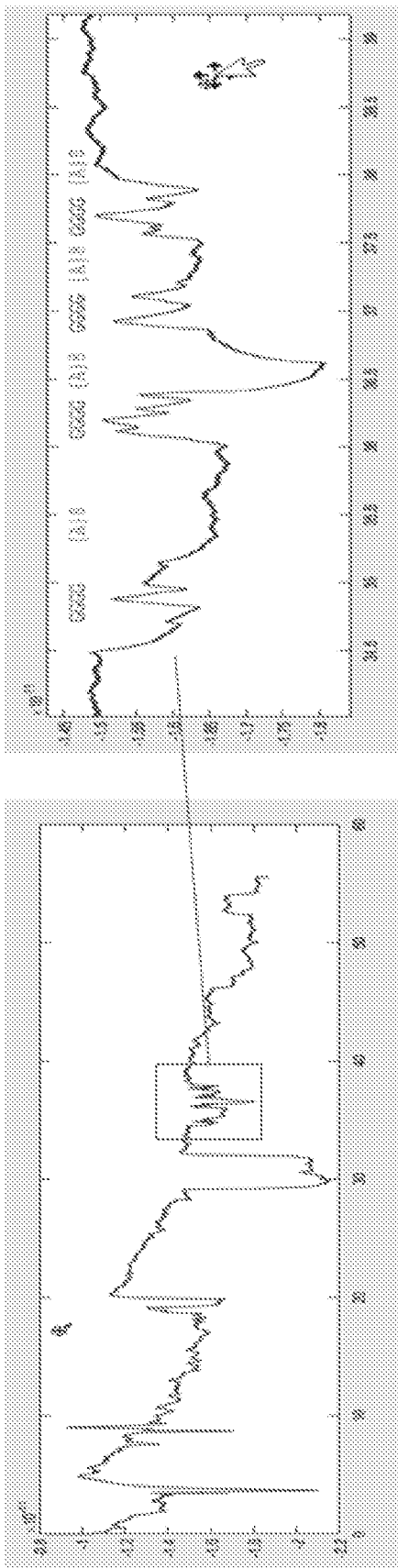
FIG. 8 illustrates an example of sequencing signals generated from an experimental molecular sensor in a DNA sequencing trial.

The resulting measured signals from DNA sequencing are shown in FIG. 8. These signals were obtained from the polymerase sensor, processing a template having the sequence $G_4A_8$-$G_4A_8$-$G_4A_8$-$G_4A_8$. The signals show current versus time during an experimental run. The inset from t=34 seconds to 39 seconds shows electrical signals reflective of this underlying sequence. In various embodiments, the enhancing of such signals provides for more accurate sequencing.

The bridge molecule in a molecular electronic sensor, such as the sensors discussed herein, may comprise molecules other than DNA, and in some cases these bridge molecules may be entirely synthetic molecules, such as polycyclic aromatic compounds comprising fused aromatic rings. In various embodiments herein, a novel class of bridge molecules is disclosed for use in molecular electronic sensors. Further disclosed herein are the means for synthesizing these novel molecules and their methods of use for applications in sensing DNA template-driven single molecule nucleotide (dNTP) incorporation events mediated by an attached polymerase, and in particular, for DNA sequencing.

Figure 9:
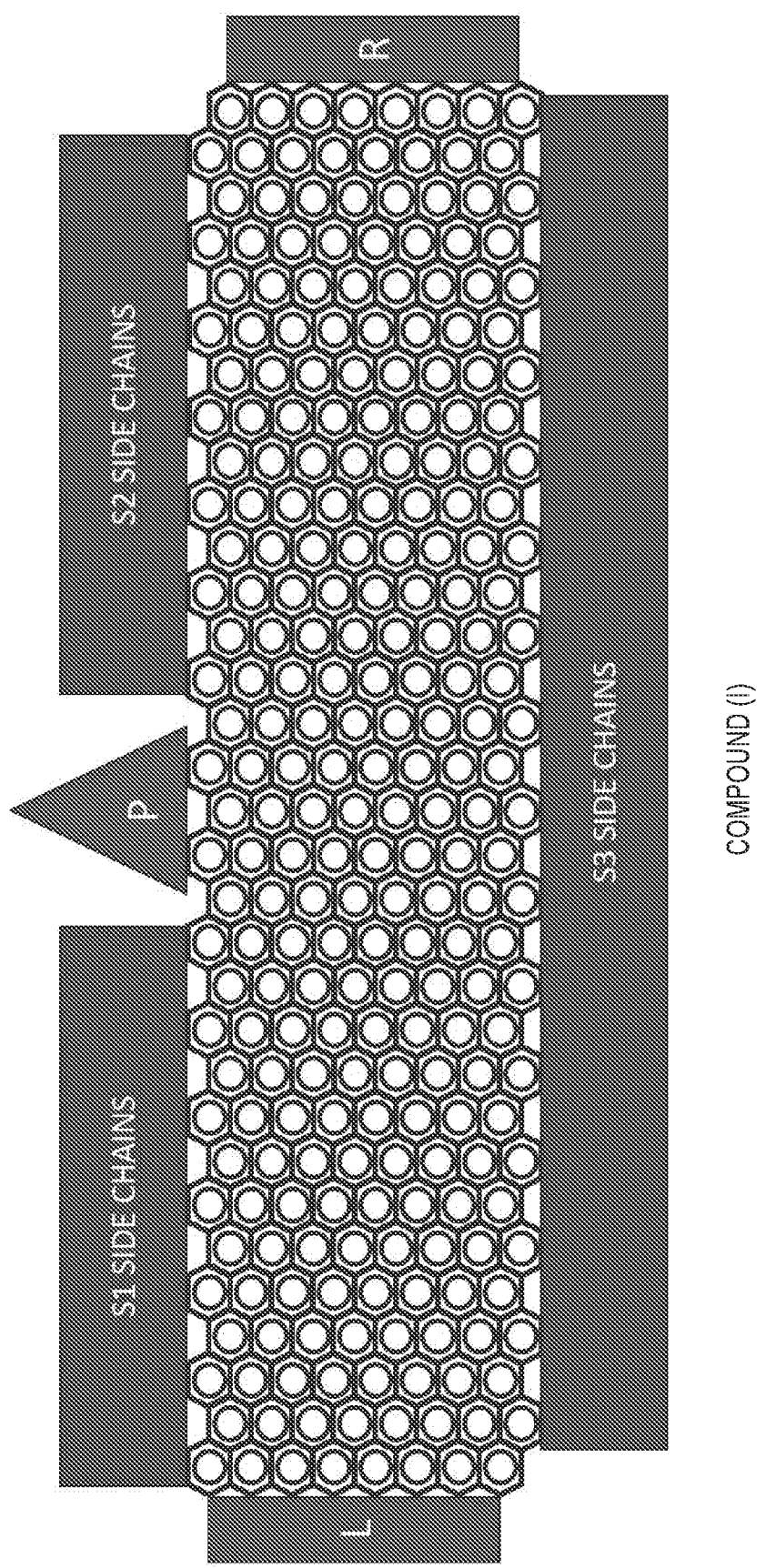
FIG. 9 illustrates a general structural scheme and design rational for polycyclic aromatic ring bridge molecules in accordance with the present disclosure, represented by a polycyclic ribbon structure, Compound (I)

In various aspects of the present disclosure, polycyclic aromatic molecules are disclosed. The synthetic molecules comprise specific structures and various functional groups and form a class of bridge molecules suitable for molecular sensor applications. One general class of such molecules disclosed herein is represented by Compound (I) illustrated schematically in FIG. 9. FIG. 9 sets forth a general structural scheme and design rationale for polycyclic aromatic ring bridge molecules in accordance with the present disclosure. As shown in FIG. 9, the general class of molecules represented by Compound (I) comprises a polymeric ribbon-like structure, or nanoribbon, comprising fused aromatic rings that provide desirable structural and electrical conduction properties. The aromatic rings may be homocyclic (e.g., entirely carbocyclic) or heterocyclic (e.g., one or more heteroatoms in any of the aromatic rings in the ribbon), or any combination of carbocyclic and heterocyclic aromatic rings such as to define a particular structure for a nanoribbon. As used herein, the acronym "PAH" refers to a carbocyclic nanoribbon structure, or in other words, a "polycyclic aromatic hydrocarbon" comprising fused aromatic rings. In various embodiments, all of the aromatic rings within a PAH are benzene rings and the entire ribbon comprises delocalized electrons from the π-orbitals.

As shown in Compound (I) in FIG. 9, left and right terminal groups (L and R groups, respectively) are provided on any location at opposite edges of the ribbon. These functional groups are chosen to support self-assembly to individual circuit electrode pairs, ensuring bridge-to-electrode conductivity when the nanoribbon is bonded and thus bridging between a pair of electrodes. Optionally, and depending on the nature of the functional groups L and R, a nanoribbon such as Compound (I) may be designed with the ability to spatially orient itself and bond with specificity, namely L to one electrode and R to the other electrode in a pair of spaced-apart electrodes. Compound (I) also comprises one or more attachment groups P that support self-assembly of a probe molecule to the nanoribbon to form a probe-molecule complex. The P-functionality may be positioned anywhere along one of the parallel long edges of the molecular ribbon, such as at or near the midpoint in the length of the PAH ribbon. As further illustrated schematically in FIG. 9, Compound (I) may also comprise one or more diverse functionalizing side chains S1, S2, S3, etc., chosen to promote solubility of the PAH ribbon, sensor self-assembly, and enhanced signaling performance. FIG. 9 schematically shows these side chains S1, S2, S3, etc. bonded to any one of two edges of the nanoribbon Compound (I) to provide for various solubility, structural, conformational and/or self-assembly properties. However, it's important to note that there can be any number of S1, S2, S3, etc. side chains, bonded to any location along any of the four edges of the ribbon, in order to provide the desired structural and functional properties in the ribbon.

The schematic structure of Compound (I) is not intended to be limited to uniform width ribbons as illustrated. For example, various embodiments of polycyclic bridge molecules may comprise repeating periodicity in the width, such as sections of 3-ring width and 5-ring width. These non-uniform width ribbons are discussed in more detail herein.

Figure 10:
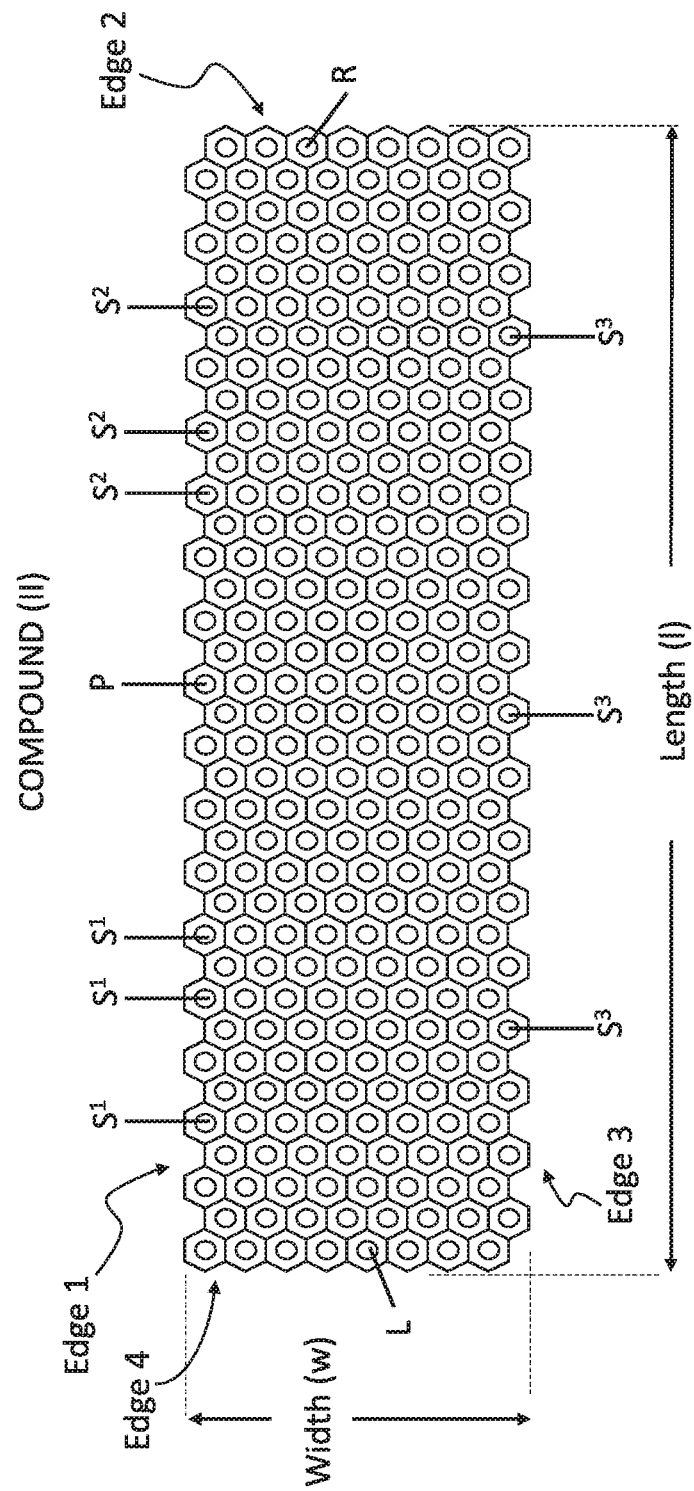
FIG. 10 illustrates a general structural scheme and design rational for various polycyclic aromatic ring bridge molecules represented by polycyclic ribbon structure, Compound (II)

With reference now to FIG. 10, the genus of nanoribbons can be more clearly appreciated by the structure of Compound (II), comprising a rectangular shaped PAH core ribbon structure consisting entirely of fused benzene rings. As illustrated, Compound (II) has a sheet-like structure, with width (w) and length (l) determined primarily by the number of fused rings in the core structure of the molecule. Certainly, long extending functional groups bonded to the ribbon may exaggerate the width and/or length of the molecular bridge and even eclipse the width and/or length of the core ribbon structure, but herein reference is made to the core ribbon structure dimensions, w and l for simplicity. The sheet-like structure of Compound (II) results in four edges to the ribbon, defined as Edge 1, Edge 2, Edge 3 and Edge 4, as illustrated. Edges 1 and 3 are referred to herein as the longer parallel edges, whereas Edges 2 and 4 are referred to herein as the shorter parallel edges. The "ends" of the PAH ribbon are necessarily the edges Edge 2 and Edge 4. As mentioned above for Compound (I), the various substituents L, R, P and $S^1$, $S^2$, $S^3$, etc. can be situated anywhere around the ribbon, although for bridging the gap between spaced-apart electrodes, it is practical to have the L and R functional groups on Edges 2 and 4, i.e., the opposing shorter edges or "ends" of the ribbon. In various embodiments, the P functional group, for bonding to a probe molecule, may be situated along one of the longer edges, Edge 1 or Edge 3, somewhere near the midpoint of the length (l). There may be more than one P functional group configured to bond to a probe molecule. It is important to understand that the number and positions of the various side chains $S^1$, $S^2$, $S^3$, etc. is entirely variable. For example, there may be just one S1 group bonded very specifically to a particular benzene ring in Compound (II) and no $S^2$ or $S^3$ groups. Or there may be several or more different groups $S^1$, $S^2$, $S^3$, etc. bonded to various distinct sites. Since the core PAH ribbon comprises a fused aromatic system, the one or more substituent groups $S^1$, $S^2$, $S^3$, etc. can only be bonded to carbon atoms along the edges of the ribbon. In various embodiments, any combination of two or more $S^1$, $S^2$, $S^3$ groups may form additional aromatic rings, or non-aromatic rings.

In various embodiments, a ribbon comprises fused benzene rings such that the ribbon is entirely carbocyclic and each carbon atom $sp^2$ hybridized. The synthetic bridge molecules herein having such a nanoribbon core are electrically conducting through delocalization of electrons. Depending on the spatial orientation of the fused benzene rings, a PAH ribbon comprising a rectangular ribbon structure of constant width will necessarily have zig-zag periodicity on two of its opposing parallel edges and tooth-like periodicity on the other two opposing parallel edges, but in no instances would all four edges of the ribbon be zig-zag or tooth-like because of the hexagonal shape to each of the rings in the ribbon. Two parallel edges will necessarily have a tooth-like periodicity whereas the other two parallel edges will necessarily have a zig-zag periodicity. For Compound (II) in FIG. 10, Edge 2 and Edge 4, the shorter edges, comprise a zig-zag periodicity, whereas Edge 1 and Edge 3, the longer edges, comprise a tooth-like periodicity. A ribbon where the width (w) is stretched out to be longer than length (l) will reverse this orientation and the shorter edges of the PAH ribbon will have the tooth-like periodicity. These strict rules are not followed when the core structure is just a linear string of fused benzene rings (i.e., a single ring width ribbon). These aspects will become more evident as various sub-genus and species molecules are discussed.

Figure 35A:
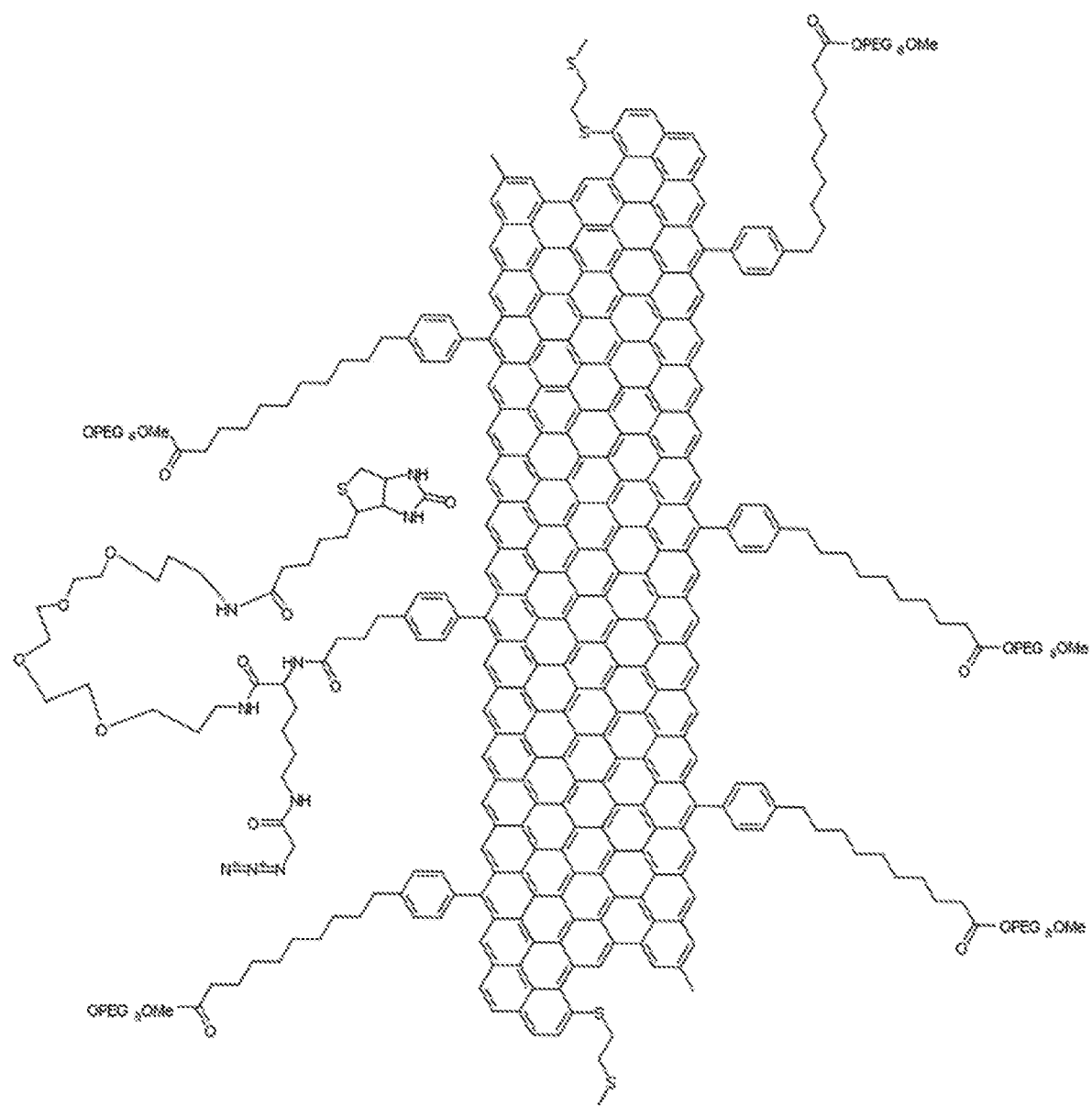
FIGS. 35a and 35b illustrate the 2D chemical structure of a synthetic bridge molecule comprising a zigzag edge PAH bridge, Compound (XIII), and the corresponding 3D structural model, respectively.

Herein, a "zig-zag" nanoribbon refers to a polycyclic aromatic hydrocarbon nanoribbon having fused benzene rings oriented such that the longer parallel edges comprise the zig-zag periodicity whereas the shorted parallel edges comprises the tooth-like periodicity (FIG. 35a is an example of what is referred to herein as a "zig-zag" nanoribbon structure).

Herein, a "non-zig-zag" nanoribbon refers to a polycyclic aromatic hydrocarbon nanoribbon having fused benzene rings oriented such that the longer parallel edges comprise the tooth-like periodicity whereas the shorter parallel edges comprises the zig-zag periodicity (Compound (II) in FIG. 10 is an example of what is referred to herein as a "non-zig-zag" nanoribbon structure because the shorter parallel edges Edge 2 and Edge 4, rather than the longer parallel edges, have the zig-zag periodicity).

For zig-zag nanoribbons, (e.g., the structures exemplified in FIGS. 35a, 35b and 43), each fused benzene ring contributes 0.23 nm to the length of the nanoribbon and 0.46 nm to the width of the nanoribbon. In various embodiments, the length of a zig-zag nanoribbon ranges from about 12 to about 434 benzene rings, (from about 3 nm to about 100 nm), and the width from about 1 to about 50 benzene rings (from about 0.46 nm to about 23 nm). For the non-zig-zag nanoribbon, (e.g., Compound (I) in FIG. 9 and Compound (II) in FIG. 10), the orientation of the benzene rings is reversed, and each benzene ring contributes 0.46 nm to the length of the nanoribbon and 0.23 nm to the width of the nanoribbon. In various embodiments, the length of a non-zig-zag nanoribbon such as Compound (II) ranges from about 6 to about 217 benzene rings, (from about 3 nm to about 100 nm), and the width from about 1 to about 100 benzene rings (from about 0.23 nm to about 23 nm).

In the illustrated embodiment of Compound (II) (FIG. 10), there are 8 aromatic rings across the width of the ribbon shaped molecule and 36 aromatic rings down the length. As shown, the longer parallel edges Edge 1 and Edge 3 have the tooth-like periodicity whereas the shorter parallel edges have the zig-zag periodicity, and thus this molecule comprises a "non-zig-zag" nanoribbon structure in accordance to the nomenclature convention herein, since the longer edges are non-zig-zag (i.e. they comprise the tooth-like periodicity).

In various embodiments, a synthetic bridge molecule for use in a molecular sensor comprises a fused polycyclic aromatic hydrocarbon PAH ring core structure, wherein the ribbon core structure is rectangular and sheet-like, having two generally parallel longer edges, designated the top and bottom edges of the molecule, and two general parallel short edges designated the left and right edges (or ends) of the molecule, wherein the two longer edges of the ribbon comprise a zig-zag periodicity and the two shorter edges of the molecule comprise a tooth-like periodicity (a "zig-zag" nanoribbon), or vice versa (a "non-zig-zag" nanoribbon), as explained above, and wherein the synthetic bridge molecule further comprises at least one left substituent "L" bonded to the left (short) end of the molecule and at least one right substituent "R" bonded to the right (opposite short) end of the molecule, L and R being capable of bonding to a metal electrode or to a metal contact point disposed on an electrode, and wherein the bonding of the functional groups L and R to the ribbon core structure may comprise direct covalent bonding to a carbon atom of one of the peripheral benzene rings, or L and/or R may be linked to the ribbon core structure by any number of intervening atoms (referred to as a "linker"). In general, both L and R have functionality to facilitate bonding of the nanoribbon to a metal such as gold. In various aspects, L and R comprise a sulfur atom, and in some examples L and R each comprise a thiol, thiol ether, disulfide or disulfide ether. In other embodiments, either or both L and R comprise reactive carbene moieties that are able to bond to gold and other metals. In certain aspects, L or R may comprise a thiol functionality whereas the other group L or R may comprise a reactive carbene, such as to provide for orientation of a PAH bridge molecule. In various examples, L and/or R comprise a carbene precursor that can form a reactive carbene for bonding to gold or other metals.

In various embodiments, L and/or R may comprise a reactive carbene atom or a carbene precursor that can lead to a reactive carbene atom, which can then bind to gold or other metal. Herein, the term "reactive carbene" is used broadly to include any substituent having a carbene atom, which is defined in chemistry as a bivalent neutral carbon atom having one additional unshared pair of electrons. Thus, in various embodiments, L and/or R include at least one carbene atom. The carbene atom may be flanked by any other types of atoms. In various aspects, the carbene atom may be flanked on both sides by N atoms. If the N atoms and the central carbene atom are contiguous and within a ring, the reactive carbene moiety is referred to as a "N-heterocyclic carbene," or an "NHC." The stability and/or persistence of the reactive carbene in an NHC is sometimes sterically promoted by having bulky substituents on each N-atom, such as i-propyl groups, t-butyl groups, or adamantyl groups, and so forth. Further, the term "carbene precursor" is used to indicate a moiety that generates a reactive carbene atom, such as upon reaction with a base. In various aspects, carbene precursors comprise the structure, —$^+$N=CH—N—, which upon reaction with base (to deprotonate the central alkenyl carbon atom), generates the reactive carbene, —N—C—N—. Various aspects of stabilized carbenes and carbene binding to gold is disclosed in Crudden, C. M., et al., "Ultra Stable Self-Assembled Monolayers of N-Heterocyclic Carbenes on Gold," *Nature Chemistry*, 6, 409-414 (2014), incorporated herein by reference.

In various embodiments, L and/or R comprise carbene precursors further comprising a diazole or benzodiazole group. Each N-atom may further comprise sterically bulky groups, e.g., i-propyl, t-butyl or adamantyl groups. In certain examples, L and/or R end groups for binding to gold comprise the following structure, 6-[1,3-diisopropyl-1H-benzo[d]imidazol-3-ium]-yl, which can be deprotonated by a base, e.g., KO$^t$Bu, to yield an NHC:

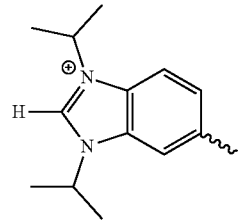

In the structure above, the wavy line indicates an attachment point to a nanoribbon core structure, either directly or through intervening atoms, to one of the aromatic rings around the periphery of the nanoribbon. The NHC-precursor substituent above is symmetrical, thus linkage to the 6-yl or 5-yl positions are equivalent. Note the substituent can isomerize as well, with the position of the double bond and positive charge moving to the other N-atom. As mentioned, the i-propyl groups may be replaced by other sterically bulky groups.

In other embodiments, L and/or R end groups for binding to gold or other metals comprise the following structure, 6-[1,3-diisopropyl-1H-benzo[d]imidazol-3-ium]-thioyl, which can be deprotonated by a base, e.g., KO$^t$Bu, to yield an NHC:

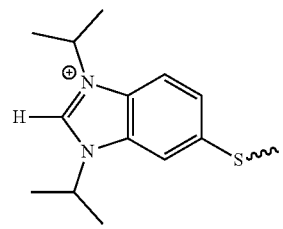

In the structure above, the wavy line indicates an attachment point to a nanoribbon core structure, either directly or through intervening atoms to one of the aromatic rings around the periphery of the nanoribbon. The NHC-precursor substituent above is symmetrical, thus linkage to the 6-yl or 5-yl positions are equivalent. Note the substituent can isomerize as well, with the position of the double bond and positive charge moving to the other N-atom. As mentioned, the i-propyl groups may be replaced by other sterically bulky groups. The two carbene precursor structures present above only differ in their attachment linkage to a nanoribbon, namely with or without an intervening S-atom.

With continued reference to Compound (I) in FIG. 9 and Compound (II) in FIG. 10, nanoribbons in accordance with the present disclosure further comprise at least one substituent P capable of bonding to a probe molecule, such as an enzyme or other binding probe. In various examples, P is bonded to the top or bottom edge of the ribbon, either directly bonded to an available site on a peripheral benzene ring along one of the long edges of the ribbon or bonded through any number of intervening atoms. In various non-limiting examples, P may comprise an azide, an alkyne, a thiol, a biotin, a carboxylic acid, a ketone, an aldehyde, an alcohol or streptavidin. In various embodiments, these functional choices for P, i.e., P having a reactive azide, alkyne, thiol, biotin, carboxylic acid, ketone, aldehyde, or alcohol moiety as part of the structure of the P-group, or comprising a streptavidin, may be spaced apart from the portion of polyaromatic core structure to which it is bonded by an AHX linker (6-aminohexanoic acid), any length of PEG, or any other configuration of a tether having various combinations of C— and heteroatoms.

In various embodiments, P may be selected from:

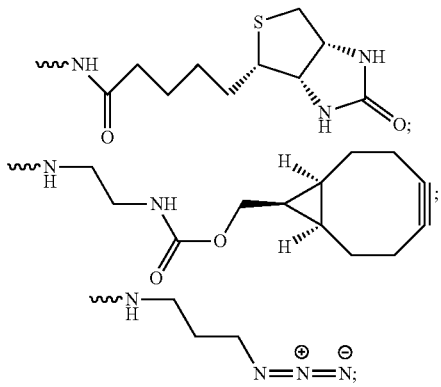

—CH(CH$_3$)—SH;
—C(CH$_3$)$_2$—SH;
—CH$_2$—C(CH$_3$)$_2$—SH;
—(CH$_2$)$_{10}$—N$_3$;
-PEG-5-biotin;
—(CH$_2$)$_7$—C(=O)NH—(CH$_2$CH$_2$O)$_4$—(CH$_2$)$_3$—N$_3$;
—(CH$_2$)$_9$—C(=O)NH—(CH$_2$CH$_2$O)$_6$—(CH$_2$)$_2$—O—NH$_2$;
any other azide or alkyne for click chemistry;
an alkoxyamine, or a ketone or aldehyde for alkoxime click chemistry; or
streptavidin for a biochemical linkage.

The probe molecule, such as a DNA polymerase or other processive enzyme, may be derivatized with complementary moieties to allow linkage of the probe molecule to the P-group on the polycyclic aromatic bridge compound, such as through formation of a triazole, an alkoxime, a biotin-streptavidin complex, or any combination thereof.

The synthetic bridge molecules represented by Compounds (I) and (II) further comprise one or more side chains, S1, S2, S3, and so forth, each bonded to any of the four edges of the ribbon, such as to the top or the bottom longer parallel edges. These one or more side chains may comprise PEG esters or PEG ethers, a dendron, or other groups such as short or long chain esters or ethers, as set forth herein.

As used herein, the shorthand notation "X-APAH" indicates the width of a nanoribbon bridge molecule based on polycyclic aromatic hydrocarbon structure and comprising X atoms along its width. A PAH ribbon may comprise a fusion of aromatic rings defining a width and length to the ribbon, such as exemplified by Compound (II) of FIG. 10 having a width (w) defined by the (8) fused benzene rings and 17 contiguous carbon atoms therefrom. For example, a molecule with tetracene (naphthacene) units fused side-to-side may be designated as having a "9-APAH" structure because such a molecule has 9-carbon atoms in a line from end to end in the tetracene structure. Hexacene, a linear fusion of six benzene rings, provides 13 atoms from end to end, and thus structures based on hexacene may be referred to herein as having a "13-APAH" structure. The structure of Compound (II) in FIG. 10 may be referred to as having a "17-APAH" structure. In various embodiments, X for X-APAH nanoribbons is from about 2 (e.g., a string of cyclobutadiene fused linearly) to about 201 (e.g., a polycyclic aromatic hydrocarbon ribbon having about 100 benzene rings fused together across the width of the ribbon). For non-zigzag fused benzene ring systems, such as the illustrated Compounds (I) and (II) structures, X=2 times (the number of benzene rings)-1. Thus, for Compound (II) in FIG. 10, X=(2×8)−1=17. Thus, the ribbons denoted as Compounds (I) and (II) may be designated as 17-APAH ribbons.

Functionalized polycyclic aromatic hydrocarbon nanoribbons have been described previously. However, the molecules disclosed are not precisely functionalized with appendages such as the L, R. P. S$^1$, S$^2$, S$^3$, etc. groups as disclosed herein, (see Y. Huang, et al., "Poly(ethylene oxide) Functionalized Graphene Nanoribbons with Excellent Solution Processability," *J. Am. Chem. Soc.*, 2016, 138 (32), pp 10136-10139.

Figure 11:
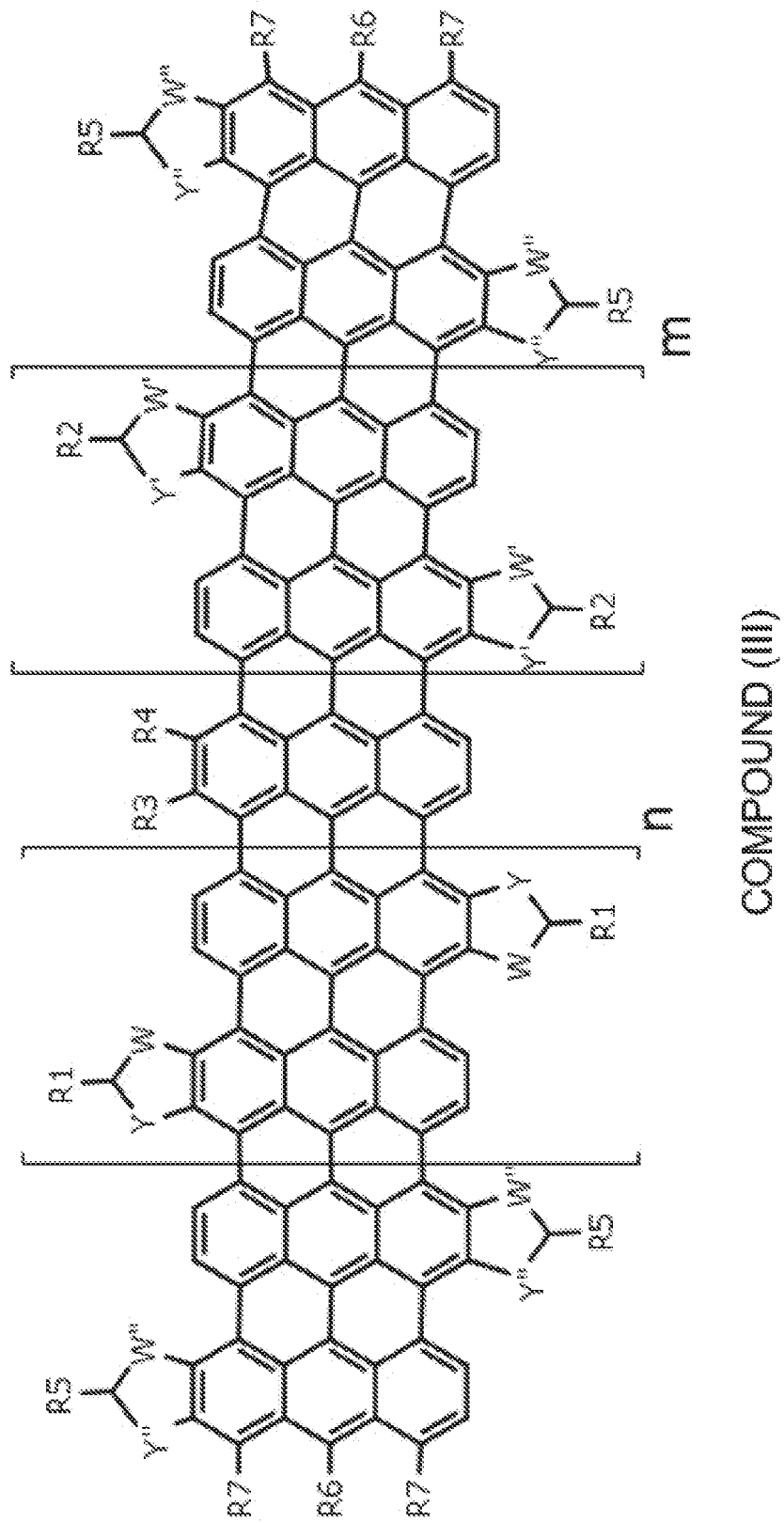
FIG. 11 illustrates a genus of polycyclic aromatic hydrocarbon bridge molecules, Compound (III) in accordance with the present disclosure.

Another embodiment of a polycyclic aromatic bridge molecule, Compound (III) is illustrated in FIG. 11. Compound (III) comprises a ribbon formed from aromatic hydrocarbon rings, and further comprises diverse groups that provide any combinations of self-assembly anchors and/or water solubilizing side chains. In various embodiments, Compound (III) comprises substituent groups that facilitate probe molecule complex formation and bonding of each end of Compound (III) to electrodes. As noted in the structure, various groups may bond to the ribbon at more than one carbon atom, such as where the substituent comprises a cyclic structure fused to one of the peripheral benzene rings of the ribbon. The length of the ribbon as determined by the integers n and m, and the scope of the various substituents R$^1$, R$^2$, R$^3$, R$^4$, R$^5$, R$^6$, R$^7$, Y, W, Y', W', Y", W" are discussed herein below. With particular election of the various substituents, Compound (III) will have various rotational symmetries.

Figure 12:
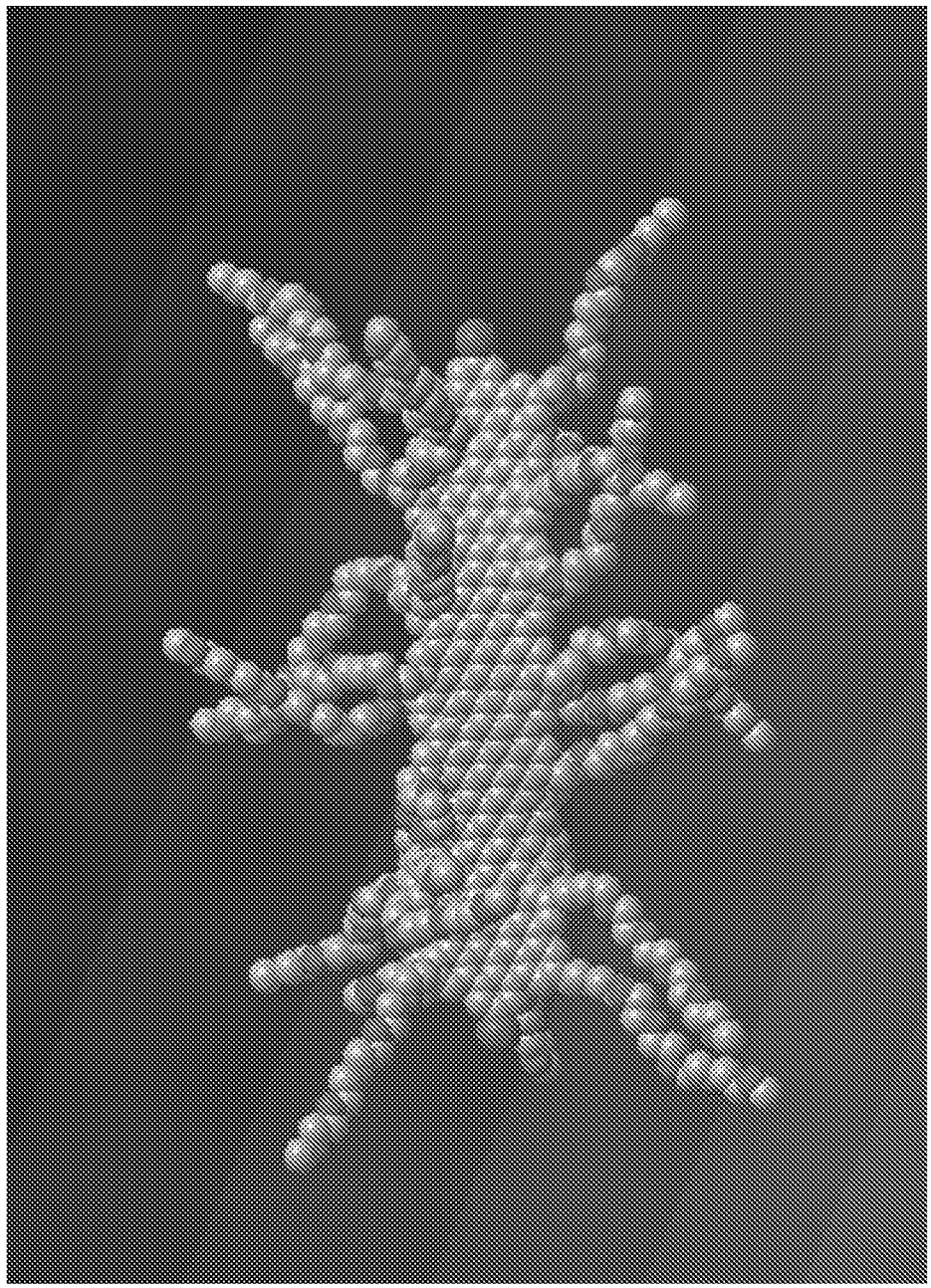
FIG. 12 illustrates a 3D space-filling model of an embodiment of a polycyclic aromatic hydrocarbon (PAH) bridge molecule Compound (IV) comprising PEG side chains to promote water solubility.

FIG. 12 illustrates the 3D space-filling model of an embodiment of a polycyclic aromatic bridge molecule, Compound (IV), comprising a polycyclic aromatic hydrocarbon fused-ring nanoribbon structure with polyethylene glycol ("PEG") polymer sidechains for enhanced water solubility and terminal thiol groups for coupling to metal electrodes. The width of the nanoribbon portion of Compound (IV) is about 0.95 nm and length is about 6 nm. In various embodiments, this molecule may be synthesized to have a length from about 5 nm to about 50 nm by adding additional fused aromatic rings to the core ribbon portion of the molecule.

Figure 13:
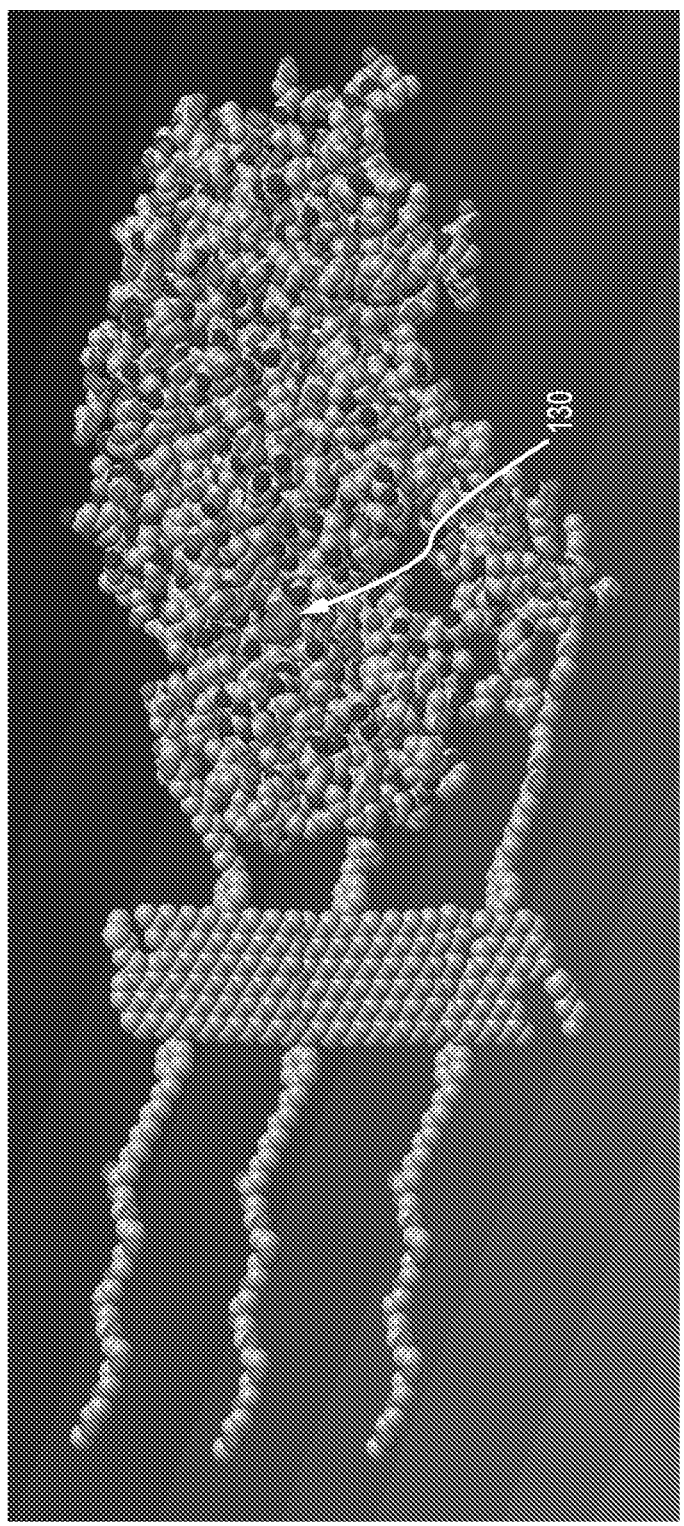
FIG. 13 illustrates the 3D space-filling model of an embodiment of a bridge and probe molecule complex Compound (V) comprising an *E. coli* Klenow fragment polymerase linked to a polycyclic aromatic hydrocarbon ("PAH") nanoribbon further comprising PEG sidechains.

FIG. 13 illustrates the 3D space-filling model of an embodiment of a polycyclic aromatic bridge complex, Compound (V), which is specifically applicable for DNA sequencing. Shown in a 3D space-filling model is an *E. coli* Klenow fragment polymerase with dNTP complexed thereon, linked to a PAH nanoribbon that also carries a number of PEG sidechains. In this case, the polymerase is conjugated to a self-assembly side group, the remaining PEG side chains provide for water solubility, and thiol end groups are provided on each of the two opposing short ends of the ribbon for coupling to gold electrodes via thiol-gold bonding. The Compound (V) complex measures about 16 nm long by about 6 nm wide by about 7 nm deep. The PAH portion of the molecule measures about 5.7 nm in length. In other variations, the PAH component may be from about 5 nm to about 50 nm in length and may comprise longer PEG sidechains and/or varying numbers of PEG sidechains. The central atoms 130 indicated in the model of FIG. 13 are the phosphorous atoms of a dNTP molecule complexed with the polymerase.

Figure 14:
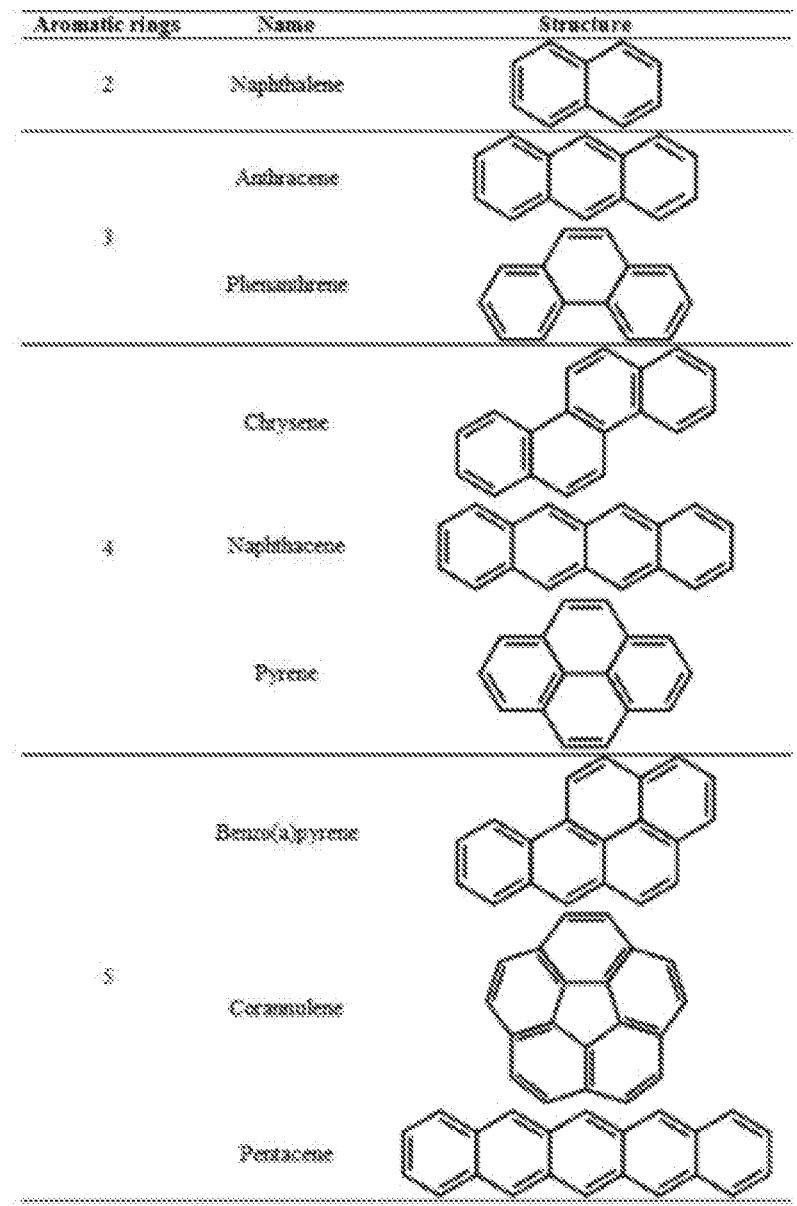
FIG. 14 illustrates embodiments of low molecular weight polycyclic aromatic hydrocarbons usable as building blocks or intermediates in the synthesis of bridge molecules herein or representative of monomeric moieties or sub-structures within the bridge molecules disclosed herein.
Figure 16:
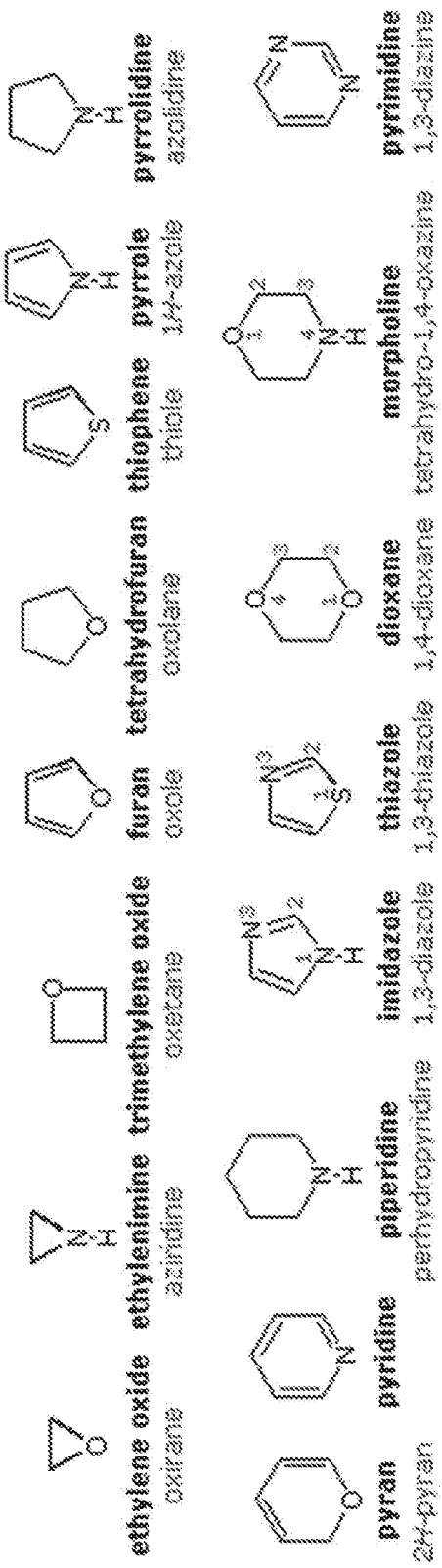
FIG. 16 illustrates embodiments of heterocyclic ring structures usable as building blocks for the polycyclic aromatic hydrocarbon bridge molecules herein or representative of monomeric moieties or sub-structures within the bridge molecules disclosed herein.

FIGS. 14, 15, and 16 illustrate non-limiting embodiments of low molecular weight cyclic aromatic rings usable as building blocks or reaction intermediates in the synthesis of the polycyclic aromatic bridge molecules herein, or as examples of the various substructures or polymeric units appearing in final bridge molecule structures disclosed herein.

In various embodiments of the present disclosure, polycyclic aromatic bridge molecules are "precision-manufacturable," meaning herein, manufacturing comprising a bottom-up synthesis using techniques of synthetic organic chemistry and polymer chemistry to achieve an atomically precise molecular structure. This synthesis method provides the benefit of reduced variation in sensor performance, as well as providing for efficient, precision mass production at scales needed for commercial applications using self-assembly chemical synthesis methods. It is another benefit that such molecules can be designed to be highly conductive, or semi-conducting with an energy bandgap, such as through the use of orderly carbon ring polymeric structures or other aromatic ring groups that provide beneficial electrical performance properties as a transducer in the molecular electronic circuit. Such aromatic molecules are known to promote electron conduction, and nano-scale dimensions of such structures are known to promote energy bandgaps. Higher currents may provide for more efficient measurement of signal current and improved signal to noise ratio. Further, the introduction of a band gap may provide for a larger or nonlinear current signal response to the modulating factors. It is another benefit that such molecules comprise self-assembly groups that enable precise self-assembly of the sensor constructs. The chemical structures herein provide a benefit for commercial deployment in highly scalable multi-sensor formats, and in particular as large-scale sensor arrays on CMOS chips. This CMOS format provides for thousands, millions or even billions of sensors, in an economical, mass producible format.

It is a further benefit of the molecules disclosed herein that the side chains on a particular nanoribbon can be used to promote solubility, as is important for their use in different solutions of interest. In various embodiments, such as in aqueous solutions, side chains like PEG render water solubility to a core aromatic ribbon that would otherwise have low solubility in the absence of such side groups.

Use of Polycyclic Aromatic Bridge Molecules for DNA Sequencing Applications

In various embodiments, polycyclic aromatic bridge molecules disclosed herein find use in molecular electronic sensors for DNA sequencing. For DNA or genome sequencing applications, a bridge molecule in a molecular sensor may be conjugated to a polymerase probe molecule, such as illustrated conceptually in FIGS. 4 and 5, and in FIG. 13 for a particular embodiment of a PAH bridge-probe complex, Compound (V). For this application, electric current through the bridge molecule, under the pressure of an applied voltage, is monitored as the polymerase synthesizes the complementary strand of a test DNA template. The signals of incorporation events, and base-specific incorporation events, provide the sensing capacity for DNA sequencing applications. In one embodiment, a native polymerase enzyme and native dNTPs (dATP, dCTP, dGTP, and dTTP) are used, in a standard enzyme buffer, resulting in such electrical signals.

In another embodiment, elements of the use of the molecular sensor may be modified to directly or indirectly enhance the modulation of current, and to increase the sequence-related signals of incorporation or base discrimination, such as the use of modified dNTPs and modified buffer compositions. In all of these settings, the use of a properly designed and optimized polycyclic aromatic bridge molecule can provide the benefits of enhanced signals, or enhanced signal-to-noise ratios, or improved self-assembly processes, or improved precision manufacturing for such DNA sequence sensors, as compared to other options for the molecular bridge—such as biopolymer molecular wires (DNA in FIG. 4, or proteins), molecular scale wires formed from materials such as carbon nanotubes, silicon nanowires, or metal nanowires, or bridges formed from 2D materials such as graphene, molybdenum disulfide ($MoS_2$), etc. These benefits relate as above to precise control over structure, assembly, solubility, electrical conductivity, and efficient mass production and manufacturing.

In the context of sensors for DNA sequencing, two or more polycyclic aromatic bridge molecules according to the present disclosure may be attached as "arms" to two distinct sites on a polymerase probe molecule, with the other ends of the arms coupling to the electrodes so that the polymerase directly forms a central element of the overall conducting pathway between the electrodes. The coupling of bridge molecule arms to the polymerase can be based on a variety of conjugation methods. For example, the polymerase may be mutated to comprise surface cysteine groups, and cysteine binding ends, such as maleimide, may be provided on the terminus of the arm intended to couple to the polymerase. In other example, two or more of such arms may be used for this application. Further, bridge molecules structured so as to promote interactions with dNTPs (native or modified) or with the polymerase (native or mutant) during incorporation may further enhance signaling. For example, such interactions may alter the kinetics of the enzyme processing the dNTP substrate, such as slowing it down, amplifying the conformational changes, or directly interacting with the incoming dNTPs (native or modified). For polycyclic aromatic bridges comprising hydrocarbon rings, the stacking of pyrene or other polycyclic aromatic substructures on a bridge may promote bridge-polymerase or bridge-dNTP interactions, or promote bridge-polymerase self-assembly, through the addition of pyrene-type groups to the polymerase, or dNTPs. In such cases of hydrocarbon aromatic ring bridges, various detergents, or specifically pyrene-based detergents may provide beneficial effects to prevent aggregation of the bridge molecules during assembly or prevent unwanted interactions during sensor operation.

Below are set forth a variety of embodiments for polycyclic aromatic bridge molecules, as well their manufacture by synthetic chemistry processes, and the methods for their use, in particular for the application of DNA sequencing.

Structure of Polycyclic Aromatic Hydrocarbon (PAH) Bridge Molecules

One genus class of polycyclic aromatic bridge molecules herein are polycyclic aromatic hydrocarbon (PAH) bridge molecules, such as represented schematically by Compound (I) shown in FIG. 9 and Compound (II) shown in FIG. 10, wherein the aromatic nanoribbon backbone of the molecule comprises fused hydrocarbon rings, such as benzene rings, or other building blocks and substructures such as those indicated more generally in FIGS. 14 and 15. Specific embodiments of both single- and multiple-component PAH bridge molecules are set forth herein.

Single PAH Electrode Bridge (PAHEB) Molecules for DNA Sequencing

Single conductor PAH electrode bridge molecules (herein "PAHEB") intended for use in DNA sequencing sensors are disclosed herein. For these embodiments, the probe molecule to which the PAHEB is to bind may comprise a polymerase. It is understood that other binding probe molecules could replace polymerase for other sensing applications, and otherwise derive benefits from the bridge molecule structures disclosed herein.

Figure 33:
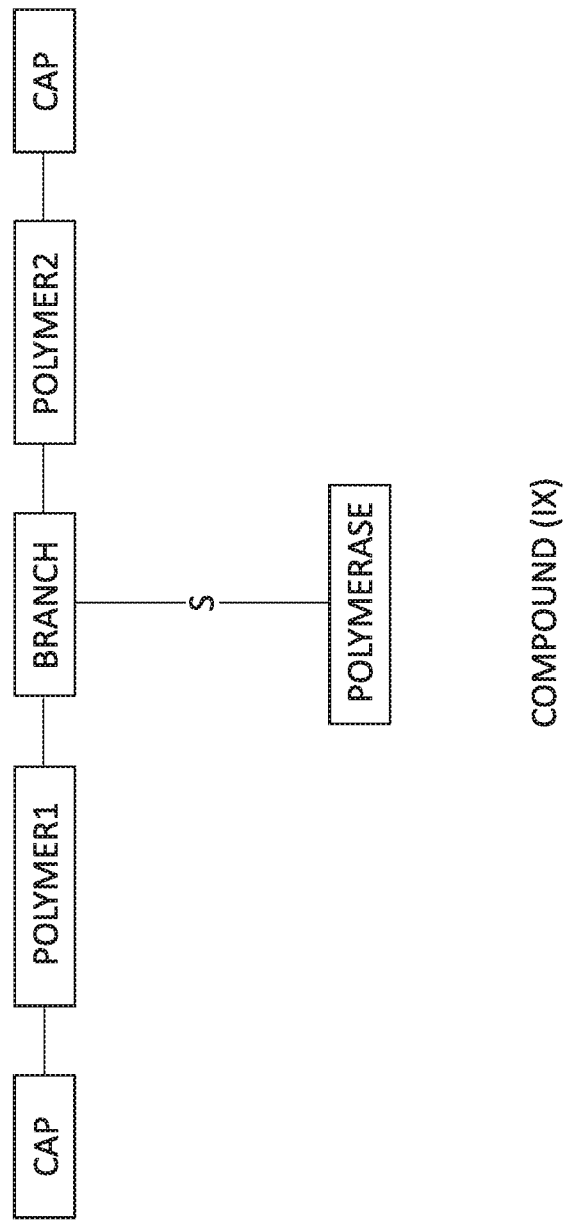
FIG. 33 illustrates an embodiment of a single PAH electrode bridge molecule usable in DNA sequencing.
Figure 34:
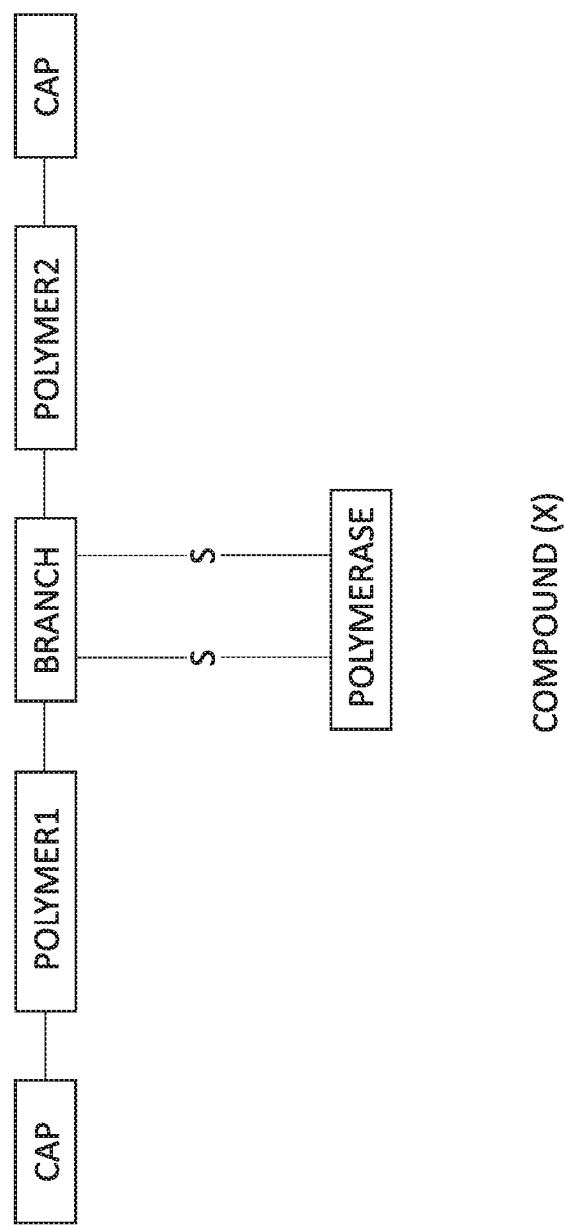
FIG. 34 illustrates an embodiment of a single PAH electrode bridge molecule usable in DNA sequencing.

Two exemplary structural classes of PAHEB are represented by Compounds (IX) in FIG. 33 and Compound (X) in FIG. 34. In both Compound (IX) and Compound (X), the structure "Cap-Polymer1-Branch-Polymer2-Cap" depicted in FIGS. 33 and 34 comprises a contiguous, fused polycyclic aromatic hydrocarbon nanoribbon derivatized at each of the shorter edges, and measuring from about 3 nm to about 1000 nm long, from about 5 nm to about 100 nm long, from about 10 nm to about 50 nm long, or from about 15 nm to about 30 nm long. For a non-zig-zag nanoribbon, the structure "Cap-Polymer1-Branch-Polymer2-Cap" comprises from 6 to about 2173 benzene rings, from about 10 to about 217 benzene rings, or from about 21 to about 108 benzene rings down its length. For a zig-zag nanoribbon, the structure "Cap-Polymer1-Branch-Polymer2-Cap" comprises from about 12 to about 4346 benzene rings, from about 20 to about 434 benzene rings, or from about 42 to about 216 benzene rings down its length.

In both Compound (IX) and Compound (X), each "Cap" depicted in FIGS. 33 and 34 represents a single monomer unit that can bind specifically and with self-assembly to each of two spaced-apart electrodes in a pair of electrodes to span a gap there between, such as specific binding to gold electrode surfaces through use of thiols, thioethers, disulfides, disulfide ethers, gold-binding peptide, dithiocarboxylate, or reactive carbene, or any combinations thereof on the PAH ribbon. There may be a left and right "cap" moiety of different chemical structure in order to promote oriented binding to distinct left and right electrode materials or anchor sites.

In both Compound (IX) and Compound (X), "Polymer 1" and "Polymer 2" depicted in FIGS. 33 and 34 each represent portions of polymer derivatized with at least one solubilizing group, such as polyethylene glycol (PEG), to enable solubility in organic solvents such as tetrahydrofuran and dispersibility in water. The length of the PEG moiety may be of any suitable length to overcome solubility issues the unsubstituted polymer may have in a particular solvent, such as water.

In both Compound (IX) and Compound (X), "Branch" depicted in FIGS. 33 and 34 represents a single monomer unit or short molecular linker (either of which being bivalent) linked to 1 or more sites on a DNA polymerase, e.g., via surface cysteine residues on the polymerase, through one or more S-alkyl or S-aryl connections. Such surface cysteines sites may comprise native or mutated sites on the enzyme.

In both Compound (IX) and Compound (X), "—S—" represents a bivalent sulfide linkage to a polymerase. Compound (IX) in FIG. 33 exemplifies the use of one sulfide linkage whereas Compound (X) in FIG. 34 exemplifies the use of two sulfide linkages to a polymerase.

In various embodiments, a single conductor PAHEB, such as Compounds (IX) and (X) would be attached to each of two electrodes in a pair of spaced-apart electrodes, through the "Cap" functionalities provided on opposite ends of the PAH ribbon.

Embodiments of Polycyclic Aromatic Bridge Molecule for Molecular Electronic Sensors The following are non-limiting illustrative embodiments of bridge molecules for various molecular electronic sensor applications. It is understood that each such embodiment could have many further variations obvious to those skilled in the art of organic chemistry and molecular sensing. It is also understood that these embodiments are provided for the purposes of highlighting beneficial structures, for teaching and for improved understanding, and do not limit the scope of the disclosure in any way.

Substantially Rectangular Nanoribbon Structures with Approximately Uniform Width In various embodiments, bridge molecules in accordance with the present disclosure comprise the general structure represented conceptually by Compound (I) in FIG. 9 and more definitively by genus structure Compound (II) in FIG. 10. In Compounds (I) and (II), the electrically conductive nanoribbon comprises aromatic rings fused together in polycyclic systems. The rings may be carbocyclic or heterocyclic, and the ribbon may be formed from one ring type or a mixture of ring types arranged into a definite structure. In various embodiments, the fused ring system such as exemplified by Compound (II) of FIG. 10 may comprise any number of nitrogen atoms at various positions in the ribbon. For example, any number of the rings may comprise pyridine or pyrimidine, e.g., interspersed throughout the structure. Nanoribbons may be conceived in accordance with the following design rational: the ring structure of the ribbon provides conductivity and structural properties. Left (L) and right (R) end groups provide for self-assembly to electrodes, potentially with orientation of left and right ends of the molecule depending on the chemical nature of L and R. The end groups provide bridge-to-electrode electrical conduction through direct bonding interactions (e.g., for example, S—Au bonds), through aromatic π-cloud interaction with the electrode surface, or through both kinds of contact. Functional substituent (P) provides for self-assembly conjugation to a probe molecule. Side chains on any of the edges of the nanoribbon core structure provide for solubility, structural and/or conformational properties.

Figure 17:
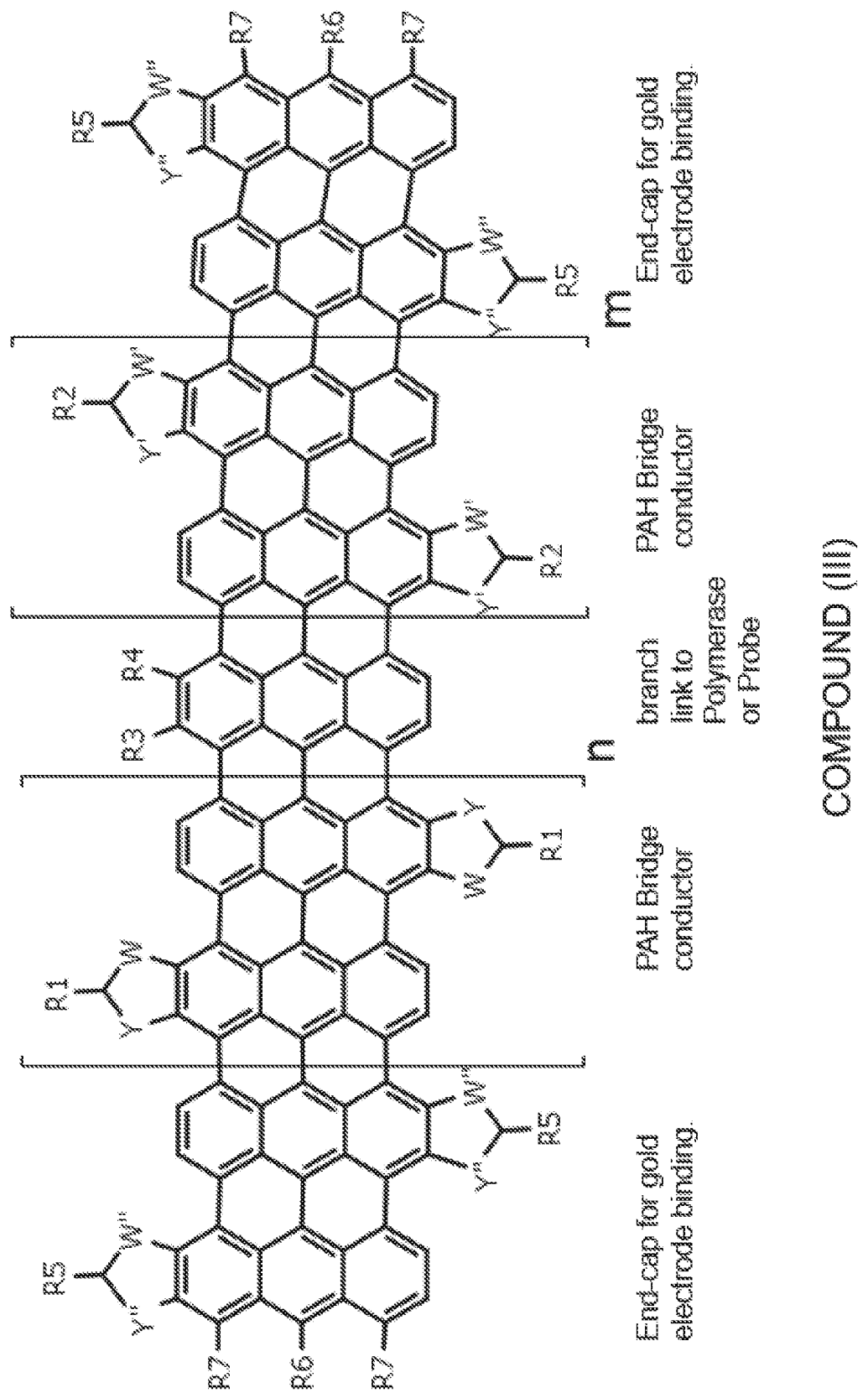
FIG. 17 illustrates a genus of polycyclic aromatic hydrocarbon bridge represented by Compound (III), with the functional regions of the molecule labeled below the chemical structure.

In various embodiments, bridge molecules in accordance to the present disclosure comprise structures represented by Compound (III) in FIG. 11, with the conductive oligomer ribbon=7-APAH (7 atoms wide polycyclic aromatic hydrocarbon, via anthracene units spanning across the width of the molecule). Compound (III) is approximately 0.7 nm in width. FIG. 17 shows genus Compound (III) with the functional regions of the molecule appropriately labeled below the structure. In various embodiments, the probe molecule, such as a polymerase, may be bonded to a central monomer in the synthetic molecular bridge, such as via $R^3$ and/or $R^4$ in the branch region, directly or through a bivalent linker, and may further comprise from 1 to 3 linkable groups chosen from the following, cross-compatible sets:

a. Azide or alkyne (for click chemistry);
b. Alkoxyamine, or ketone/aldehyde (for alkoxime click chemistry); or
c. Biotin or streptavidin (for biochemical linkage).

The probe molecule (such as a DNA polymerase or other binding probe) may be derivatized with complementary moieties to allow linkage of the probe molecule to the conductive PAH ribbon, such as through formation of a triazole, an alkoxime, a biotin-streptavidin complex, or any combination thereof.

In various embodiments, a synthetic bridge molecules in accordance with the present disclosure comprises Compound (IV), illustrated as a 3D space-filling model in FIG. 12. Compound (IV) is a species molecule within the genus structure represented by Compound (III) (FIG. 11), wherein:

$R^1$=PEG-20;
Y and W are —O—;
$R^3$ and $R^4$ are azido-$(CH_2)_{10}$ and biotin-PEG-5;
$R^5$=H;
$R^6$=methylthiol; and
$R^7$=H.

In various embodiments, a synthetic bridge molecule in accordance to the present disclosure comprises Compound (III) illustrated in FIG. 11, wherein:

n and m are independently 0 to 30;
W and Y are independently selected from —O—, —$CH_2$—, $CR^8R^9$, $CH_2CR^8R^9$, $CR^8CR^9CH_2$, $OCR^8R^9$, and $CR^8R^9O$, wherein $R^8$ and $R^9$ are attached to the same carbon atom and independently selected from H, $CH_3$, $C_2H_5$, $CH_2CH_2CH_3$, or $(CH_2)_x(OCH_2CH_2)_yOR^{10}$, wherein x is 2 to 10, y is 10 to 40 and $R^{10}$ is H, Me, or Et, and wherein $R^8$ and $R^9$ can optionally link to form a ring, wherein O is optionally linked directly to the aromatic ring, and wherein W and Y can optionally be exchanged with one another within a ring;
W' and Y' are independently selected from —O—, —$CH_2$—, $CR^8R^9$, $CH_2CR^8R^9$, $CR^8CR^9CH_2$, $OCR^8R^9$, and $CR^8R^9O$, wherein $R^8$ and $R^9$ are attached to the same carbon atom and independently selected from H, $CH_3$, $C_2H_5$, $CH_2CH_2CH_3$, or $(CH_2)_x(OCH_2CH_2)_yOR^{10}$, wherein x is 2 to 10, y is 10 to 40 and $R^{10}$ is H, Me, or Et, and wherein $R^8$ and $R^9$ can optionally link to form a ring, wherein O is optionally linked directly to the aromatic ring, and wherein W' and Y' can optionally be exchanged with one another within a ring;
$R^1$ is a moiety selected from ester linked PEG chains $(CH_2)_xCO(OCH_2CH_2)_yOR^{13}$ or $(CH_2)_xOC$—$OCH_2CH_2CH_2(OCH_2CH_2)_yOR^{13}$, wherein x is from 0 to 10, y is from 10 to 40, and $R^{13}$ is Me or H; $R^1$ can also be a water-soluble, ester-linked dendron linked from the core site with 8 to 64 branches derivatized with water-solubilizing PEG chains $(CH_2CH_2O)_zR^{14}$, wherein z is from 1 to 8 and $R^{14}$ is H or Me; $R^1$ can optionally include a 1) photocleavable, 2) redox-cleavable, 3) acid cleavable or 4) base-cleavable linker between the atom and the PEG chain or dendron so that the PEG chain or dendron can be removed using 1) light, 2) an oxidizing or reducing agent, 3)+acid or 4) base, respectively, after the cap portion of the molecule is linked to gold electrodes;
$R^2$ is a moiety selected from ester linked PEG chains $(CH_2)_xCO(OCH_2CH_2)_yOR^{13}$ or $(CH_2)_xOC$=$OCH_2CH_2CH_2(OCH_2CH_2)_yOR^{13}$ wherein x is from 0 to 10, y is from 10 to 40, and $R^{13}$ is Me or H; $R^2$ can also be a water-soluble, ester-linked dendron linked from the core site with 4 to 16 branches derivatized with water-solubilizing PEG chains $(CH_2CH_2O)_zR^{14}$ wherein z is from 1 to 4 and $R^{14}$ is H or Me; $R^2$ can optionally include a 1) photocleavable, 2) redox-cleavable, 3) acid cleavable or 4) base-cleavable linker between the atom and the PEG chain or dendron so that the PEG chain or dendron can be removed using 1) light, 2) an oxidizing or reducing agent, 3)+acid or 4) base, respectively, after the cap is linked to gold electrodes;
W" and Y" are independently selected from —S—, —$CH_2$—, $CH_2CH_2$, $CR^{11}R^{12}$, and $SCR^{11}R^{12}$, wherein $R^{11}$ and $R^{12}$ are bonded to the same carbon atom and independently selected from H, $CH_3$, $C_2H_5$, $CH_2CH_2CH_3$, $CH_2CH_2SCH_3$, $SCH_3$, or $SCH_2CH_2SCH_3$, and wherein $R^8$ and $R^9$ can optionally link to form a ring, wherein S is optionally linked directly to the aromatic ring, and wherein W" and Y" can optionally be exchanged with one another within a ring;
$R^5$ is H, SMe, or $CH_2CH_2SMe$;
$R^6$ is H, SMe, $SCH_2CH_2SMe$, $SCH_2C(CH_2SMe)_3$, SH, $CS_2H$, $CH_2SMe$, $CH_2SH$, $CH_2CS_2H$, 6-[1,3-diisopropyl-1H-benzo[d]imidazol-3-ium]-yl, or 6-[1,3-diisopropyl-1H-benzo[d]imidazol-3-ium]-thioyl; and
$R^7$ is H, SMe, $SCH_2CH_2SMe$, SH, $CS_2H$, $CH_2SMe$, $CH_2SH$, or $CH_2CS_2H$.

In various embodiments, the presence of —SH, —SSH, 6-[1,3-diisopropyl-1H-benzo[d]imidazol-3-ium]-yl or 6-[1,3-diisopropyl-1H-benzo[d]imidazol-3-ium]-thioyl moieties in the selections for at least one of $R^6$ and $R^7$ allow self-assembly of the ends of the ribbon shaped Compound (III) to gold electrodes or gold contacts disposed on metal electrodes. Bridge molecules functionalized with the groups —SH and —SSH link to gold through Au—S bonds, whereas bridge molecules functionalized with the groups 6-[1,3-diisopropyl-1H-benzo[d]imidazol-3-ium]-yl or 6-[1,3-diisopropyl-1H-benzo[d]imidazol-3-ium]-thioyl link to gold electrodes or gold contacts through Au—C bonds. In various examples, the selections for the two $R^6$ groups and the four $R^7$ groups determine the overall rotational symmetry of the molecule. In various embodiments, all four instances of $R^7$ are H and the two instances of $R^6$ are identical functional groups capable of bonding to metal.

In various embodiments, Compound (III) is covalently bonded to a probe molecule, such as a polymerase. In certain examples for DNA sequencing, the probe molecule comprises a DNA polymerase such as E. coli Klenow fragment, with linkage to Compound (III) obtained through a "click chemistry" linker (a triazole formed from an alkyne and an azide, and/or an O-alkyl-oxime formed from a ketone or an aldehyde and an alkoxyamine, R—O—$NH_2$) and/or through a biological linker (e.g., a biotin linker, which can link to streptavidin in a streptavidin-detector conjugate). In various embodiments of Compound (III), $R^4$ is optionally: (i) covalently linked to a distinct cysteine residue in the DNA polymerase molecule (or two links from PAH to polymerase via the selections for $R^3$ and $R^4$); (ii) covalently linked to $R^3$ to form a ring; or is hydrogen (i.e., leaving a single link from PAH to polymerase via a non-H choice for $R^3$). In various aspects, $R^3$ and $R^4$ can optionally contain from 1 to 4 aromatic side chains (such as, for example, phenyl, naphthyl, anthracenyl, phenanthrenyl, pyrenyl, thiophenyl, benzothiophenyl, ferrocenyl) on a flexible chain such as PEG or polyglycine, linked to one or more cysteine residues in the polymerase that are close in proximity to the γ-phosphate in dNTP and or close to the delta phosphate in a modified dNTP such as dN4P-R, where R is a rigid, water soluble group such as glucose, mannose or α-cyclodextrin. The chains can bind to the PAH through hydrophobic or electrostatic interactions, which are disturbed when dN4P-R binds to the active site of the polymerase and undergoes incorporation into the oligonucleotide chain.

In various embodiments, synthetic bridge molecules in accordance to the present disclosure comprise Compound (III), as illustrated in FIG. 11, wherein:

m+n=10 to 24;
Y=W=—$CH_2$— or —O—;
Y'=W'=—$CH_2$— or —O—;
Y"=W"=—S—;

$R^1$=—CO—O—$(CH_2CH_2O)_n$—$OCH_3$, wherein n is between 2 and 7 or between 20 and 48;
$R^2$=—CO—O—$(CH_2CH_2O)_n$—$OCH_3$, wherein n is between 2 and 7 or between 20 and 48;
$R^3$=(L-Phe-Gly)$_4$-$NHOCH_2CH_2O$—N=CH(p-$C_6H_4$)$CH_2$—;
$R^4$=H;
$R^5$=$CH_2CH_2SMe$;
$R^6$=$SCH_2CH_2SMe$; and
$R^7$=H.

In various embodiments, synthetic bridge molecules in accordance to the present disclosure comprise Compound (III) illustrated in FIG. 11, wherein:
m+n=10 to 24;
Y=W=—$CH_2$— or —O—;
Y'=W'=—$CH_2$— or —O—;
Y"=W"=—S—;
$R^1$=H;
$R^2$=—CO—O—$(CH_2CH_2O)_n$—$OCH_3$, wherein n is between 2 and 7 or between 20 and 48;
$R^3$=—$(CH_2)_n$C(O)NH—CH[$(CH_2)/(CH_2)R^{18}$][$CH_2CH_2$—O—$CH_2CH_2$—$(CH_2)_s$—$R^{19}$), wherein n, r and s are independently between 2 and 7; and wherein $R^{18}$ and $R^{19}$ are chosen from the combinations in TABLE 1 such that $R^{18}$ and $R^{19}$ cannot react with one another;

TABLE 1

| $R^{18}$ | $R^{19}$ |
|---|---|
| —$N_3$ | NHCO-biotin |
| —$N_3$ | —CHO |
| —$N_3$ | —$COCH_3$ |
| —$N_3$ | O—$NH_2$ |
| —CC—H | NHCO-biotin |
| —CC—H | —CHO |
| —CC—H | —$COCH_3$ |
| —CC—H | O—$NH_2$ |

$R^4$=$R^5$=p- or m-$C_6H_4$—$(CH_2)_t$COO$(CH_2CH_2O)_u$$CH_3$, wherein t is from 0 to 10 and u is from 5 to 50;
$R^6$=$SCH_2CH_2SMe$; and
$R^7$=H.

Figure 35B:
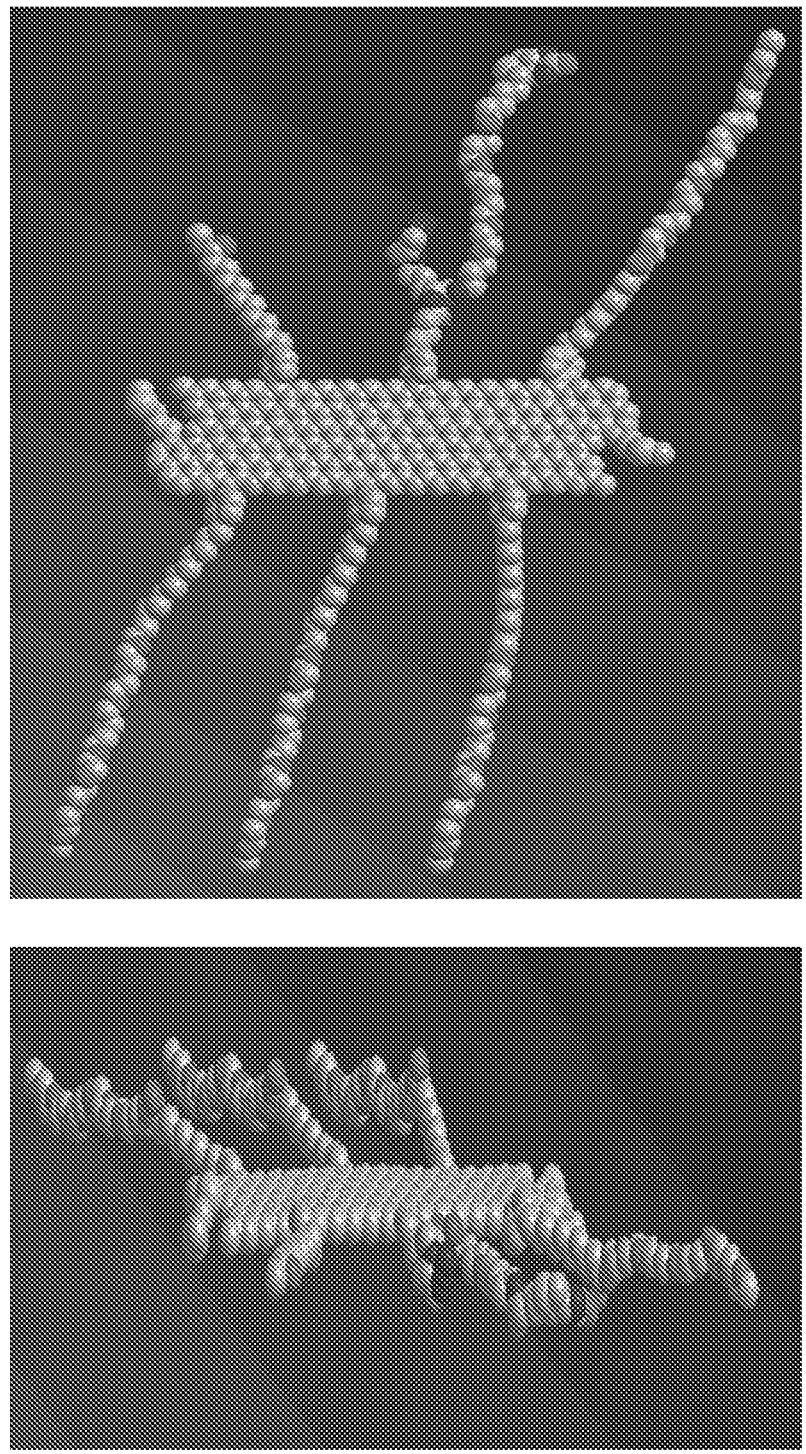

In various embodiments, a synthetic bridge molecule in accordance to the present disclosure comprises Compound (XIII), illustrated as both the chemical structure in FIG. 35a, and as the 3D space-filling model in FIG. 35b (illustrating two rotations of the model). The molecule comprises zig-zag long edges, PEG side chains, caps with thiol linkages, and a site comprising a tethered biotin for probe molecule binding, such as through self-assembly.

Figure 18:
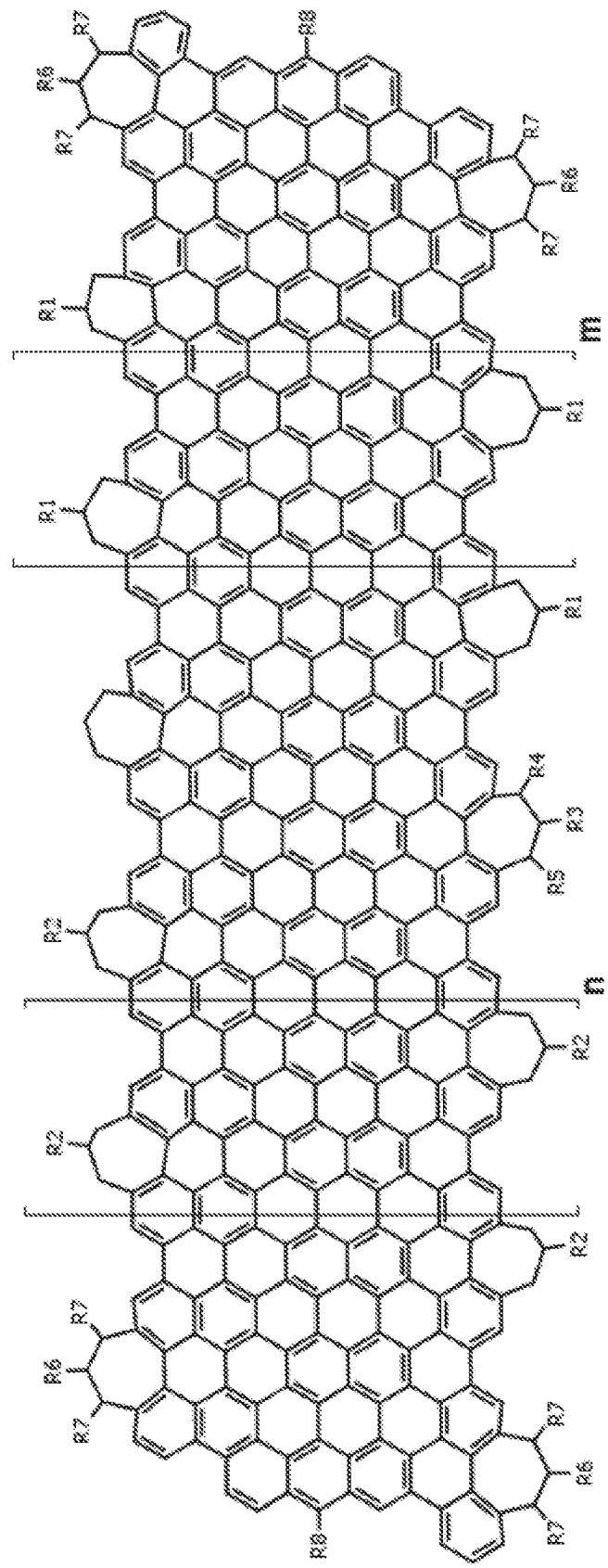
FIG. 18 illustrates a genus of polycyclic aromatic hydrocarbon bridge molecules represented by Compound (VI), comprising a single continuous 13-atom wide polycyclic aromatic hydrocarbon conductor, (herein, "13-APAH"), wherein the aromatic portion of the ribbon is about 1.4 nm wide.

In various embodiments, synthetic bridge molecules in accordance to the present disclosure comprise Compound (VI), as illustrated in FIG. 18. Compound (VI) comprises the single continuous 13-APAH (13-atom width polycyclic aromatic hydrocarbon) conductor), wherein the aromatic portion is about 1.4 nm wide.

In various embodiments, synthetic bridge molecules in accordance with the present disclosure comprise Compound (VI) (FIG. 18), wherein:
$R^4$=$R^5$=H; and
$R^3$=$NR^9R^{10}$, wherein $R^9$ is linked to a DNA polymerase cysteine residue and $R^{10}$ is either H, or forms a ring with $R^9$ that does not include the polymerase, or is linked to a DNA polymerase cysteine residue that is distinct from the residue linked to $R^9$. In other embodiments where $R^3$=H, $R^4$ is linked to a DNA polymerase cysteine residue and $R^5$ is either H, or forms a ring with $R^4$ that does not include the polymerase, or is linked to a DNA polymerase cysteine residue that is distinct from the residue linked to $R^9$.

An embodiment of an organic reaction scheme useful for the synthesis of Compound (VI) is shown in FIGS. 36-42. Compound (VI) comprises a single continuous 13-APAH conductor, wherein the aromatic ribbon portion of the molecule is about 1.4 nm wide.

In various embodiments, a synthetic bridge molecule in accordance to the present disclosure comprises Compound (VI) (FIG. 18), wherein:
$R^1$=$R^2$=$(CH_2)_4$C(O)O-PEG-48;
$R^3$ is $(CH_2)_4$C(O)NH—$CH_2CH_2CH(CH_2CH_2CH_2N_3)$($CH_2CH_2OCH_2CH_2OCH_2CH_2$NH-biotin);
$R^4$=$R^5$=H;
$R^6$=$CH_2SCH_2CH_2SCH_3$ or H;
$R^7$=$CH_2SCH_2CH_2SCH_3$ or H; and
$R^8$=$CH_2SCH_2CH_2SCH_3$ or —SH.

Figure 19:
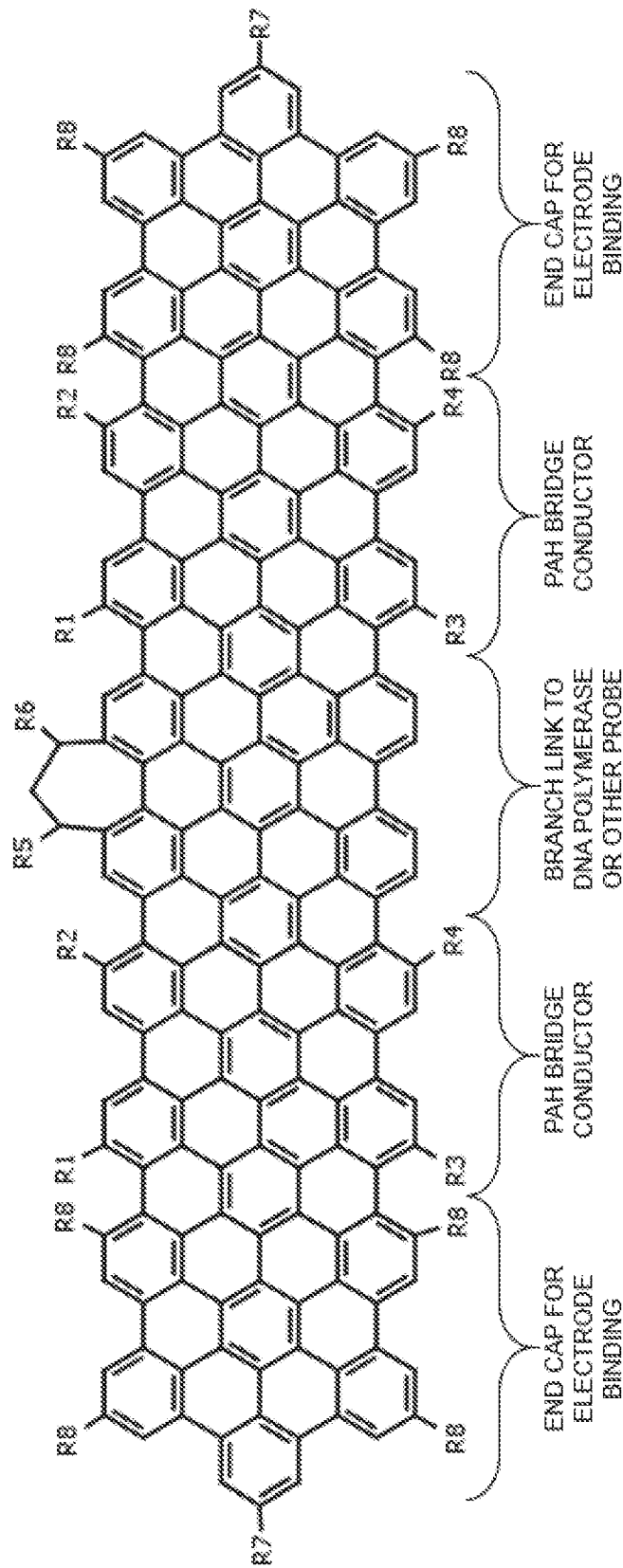
FIG. 19 illustrates a genus of polycyclic aromatic hydrocarbon bridge molecules represented by Compound (VII), comprising a single continuous 9-atom wide polycyclic aromatic hydrocarbon conductor, (herein, "9-APAH")

In various embodiments, synthetic bridge molecules in accordance to the present disclosure are represented by Compound (VII), illustrated in FIG. 19. Compound (VII) comprises a conducting oligomer further comprising a single continuous 9-APAH (9-atom width polycyclic aromatic hydrocarbon) conductor, wherein the aromatic portion is about 0.95 nm wide.

In various embodiments, synthetic bridge molecules in accordance to the present disclosure comprise Compound (VII), illustrated in FIG. 19, wherein:
3 of the 4 substituents $R^1$, $R^2$, $R^3$, and $R^4$ are hydrogen, and the remaining $4^{th}$ substituent is selected from:
(1) an ester linked PEG chain having the structure $(CH_2)_x$CO$(OCH_2CH_2)_y$$OR^{13}$ or $(CH_2)_x$OC—$OCH_2CH_2CH_2$ $(OCH_2CH_2)_y$$OR^{13}$, wherein x is from 3 to 10, y is from 10 to 40, and $R^{13}$ is Me or H;
(2) an ether linked PEG chain having the structure $(CH_2)_x$O—$CH_2CH_2CH_2(OCH_2CH_2)_y$$OR^{13}$, wherein x>2, y is from 10 to 40, and $R^{13}$ is Me or H; or
(3) a water-soluble, ester-linked dendron linked from the core site with 8 to 64 branches derivatized with water-solubilizing PEG chains $(CH_2CH_2O)_z$$R^{14}$, wherein z is from 1 to 8 and $R^{14}$ is H or Me; and wherein $R^1$ can optionally include a 1) photocleavable, 2) redox-cleavable, 3) acid cleavable or 4) base-cleavable linker between the atom and the PEG chain or dendron so that the PEG chain or dendron can be removed using 1) light, 2) an oxidizing or reducing agent, 3)+acid or 4) base, respectively, after the cap portion of the molecule is linked to gold electrodes;
3 of the 4 $R^8$ substituents appended at either end of the molecule are hydrogen, and the $4^{th}$ $R^8$ substituent is a short alkyl group (1-5 carbons), optionally substituted with a methoxy or carboxyl group; and
$R^7$ is $CH_2SCH_2CH_2SCH_3$ or —SH.

Figure 20:
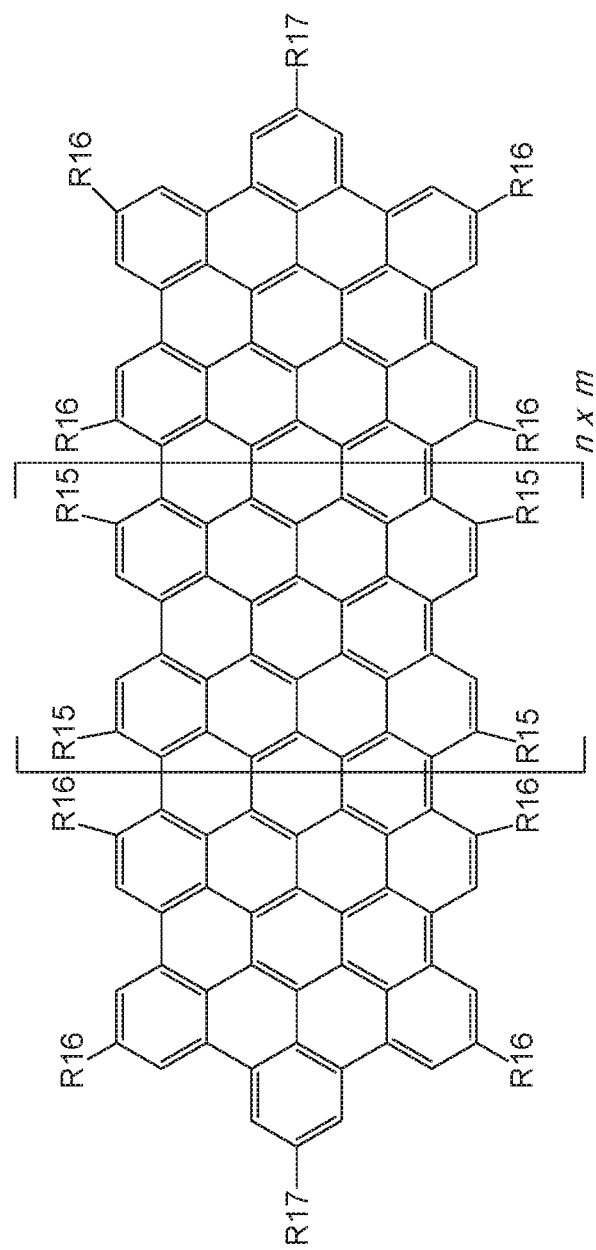
FIG. 20 illustrates a genus of polycyclic aromatic hydrocarbon bridge molecules represented by Compound (VIII), comprising 2-mono PEG-PAH structure.

In various embodiments, synthetic bridge molecules in accordance to the present disclosure comprise Compound (VIII), as illustrated in FIG. 20. This compound is referred to herein as "2-Mono PEG-PAH single component polymer and is a bridge molecule not having a branch monomer. The central monomer shown enables PAH bridges of various lengths as desired. This genus of compounds has optional number of monomeric units and optional PEG chains to affect solubility.

In various embodiments, synthetic bridge molecules comprise compound (VIII) in FIG. 20, wherein:
n=3;

m=3 to 1000, or in various embodiments, from 3 to 10; 3 of the 4 $R^{15}$ substituents are hydrogen, and the 4th $R^{15}$ substituent is a PEG chain having the structure $(CH_2CH_2)O(CH_2CH_2O)_{24}CH_3$;

6 of the 8 $R^{16}$ substituents are hydrogen, and two of the remaining $R^{16}$ substituents are 2-methoxyethyl; and each $R^{17}$ are —S—$CH_3$.

Figure 21:
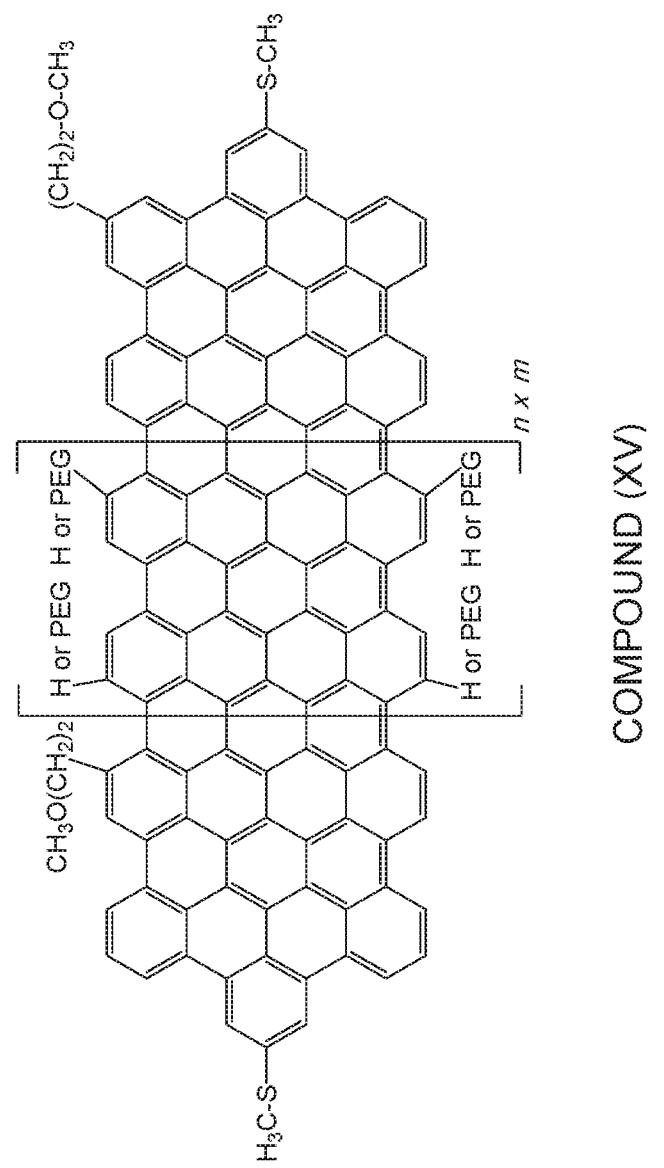
FIG. 21 illustrates a genus of polycyclic aromatic hydrocarbon bridge molecules represented by Compound (XV), comprising 2-mono PEG-PAH structure, having variable length based on number of monomer units and thiomethyl substituents at each end for electrode binding.

In various embodiments, synthetic bridge molecules in accordance to the present disclosure comprise Compound (XV), as illustrated in FIG. 21. Compound (XV) includes methylthiol end groups and an optional number of central monomeric units n and m, wherein n=2 and m=3 to 1000 or from 3 to 10. The presence of the PEG side chains improves solubility of an otherwise hydrophobic aromatic core structure.

FIGS. 22 to 30 set forth an embodiment of a synthetic protocol for preparing Compound (XV). In various embodiments, Compound (XV) comprises 3 or more carbons situated between the aromatic ring and the PEG oxygen atom, or an ester linkage to any PEG substituent.

Figure 22:
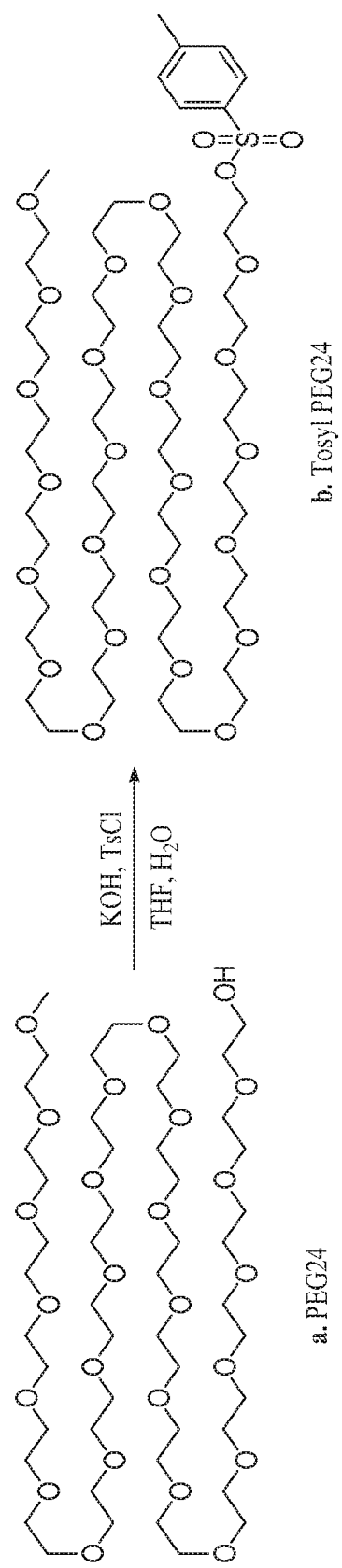
Figure 23:
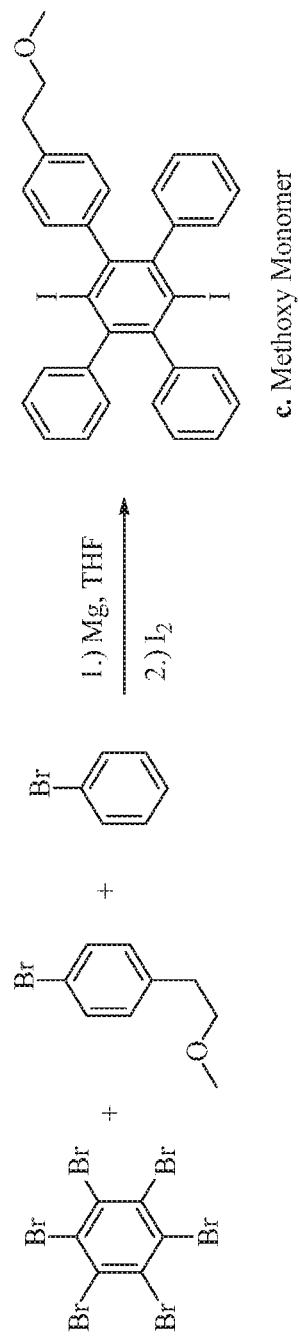
Figure 24:
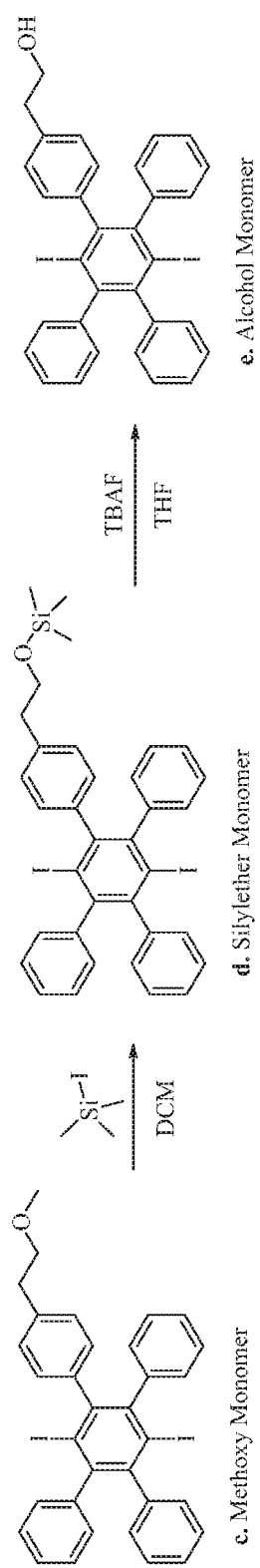
Figure 25:
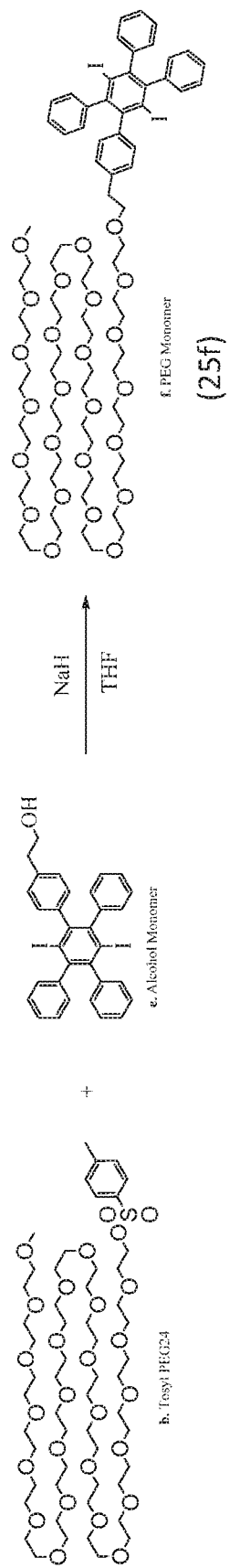
Figure 27:
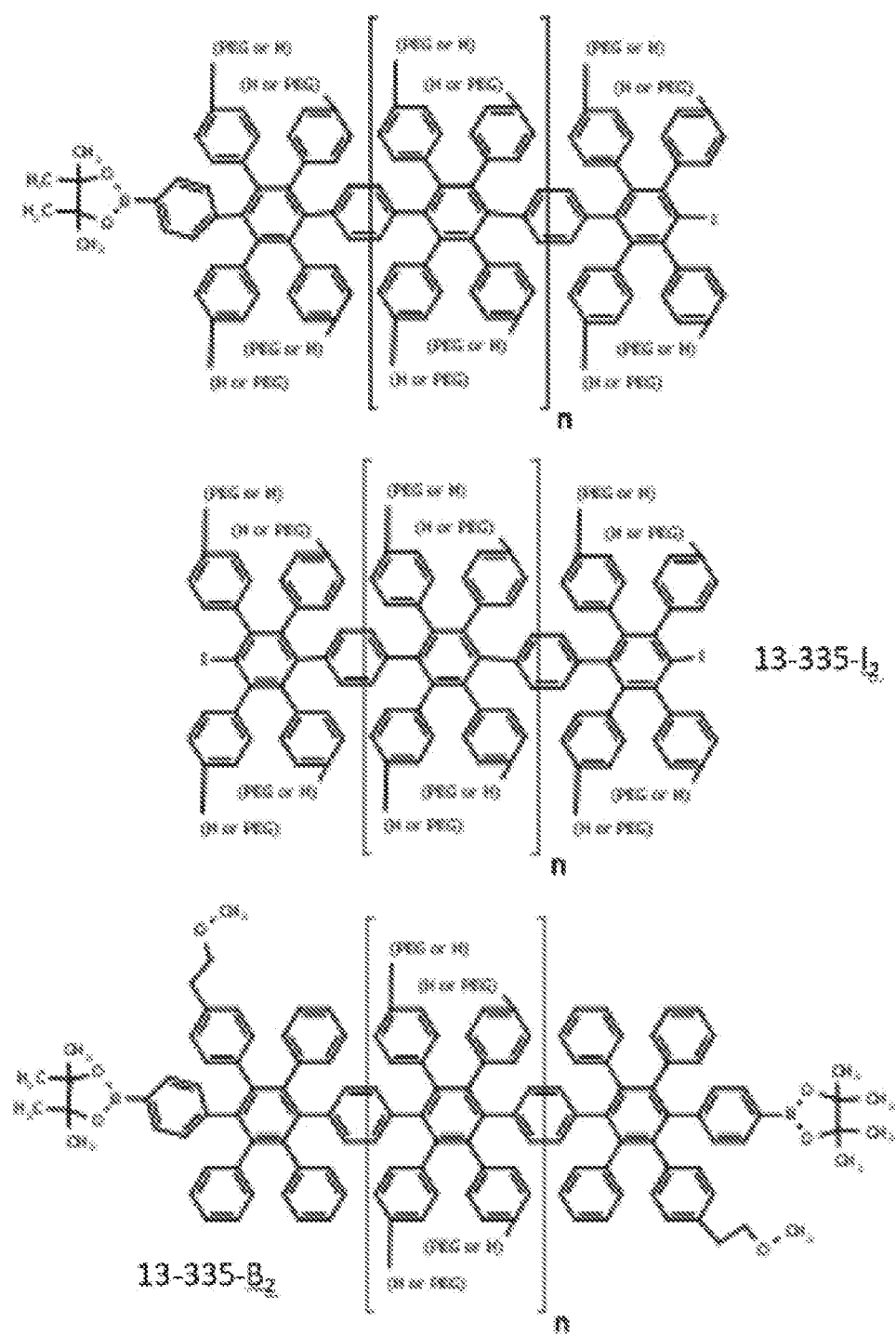
Figure 28:
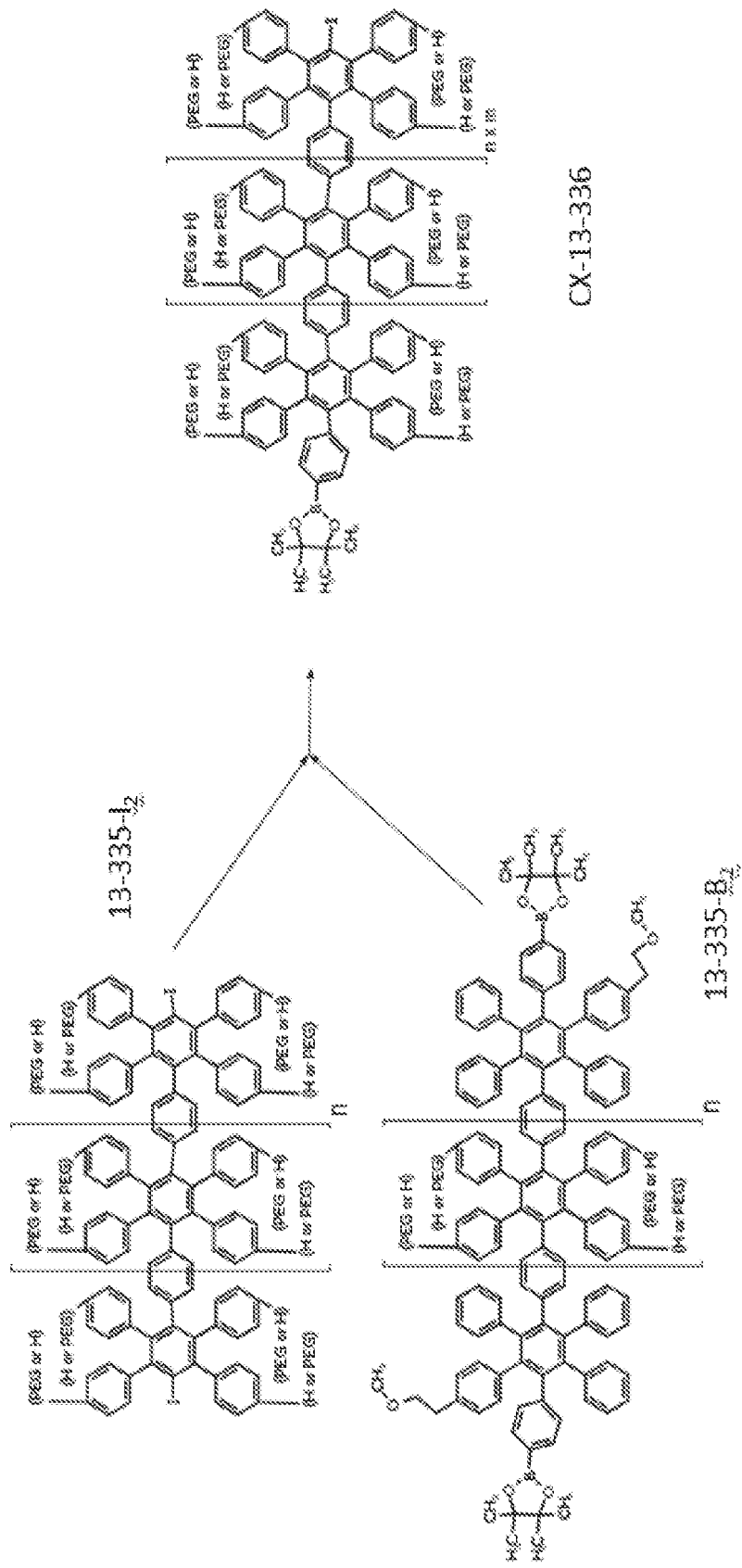
Figure 29:
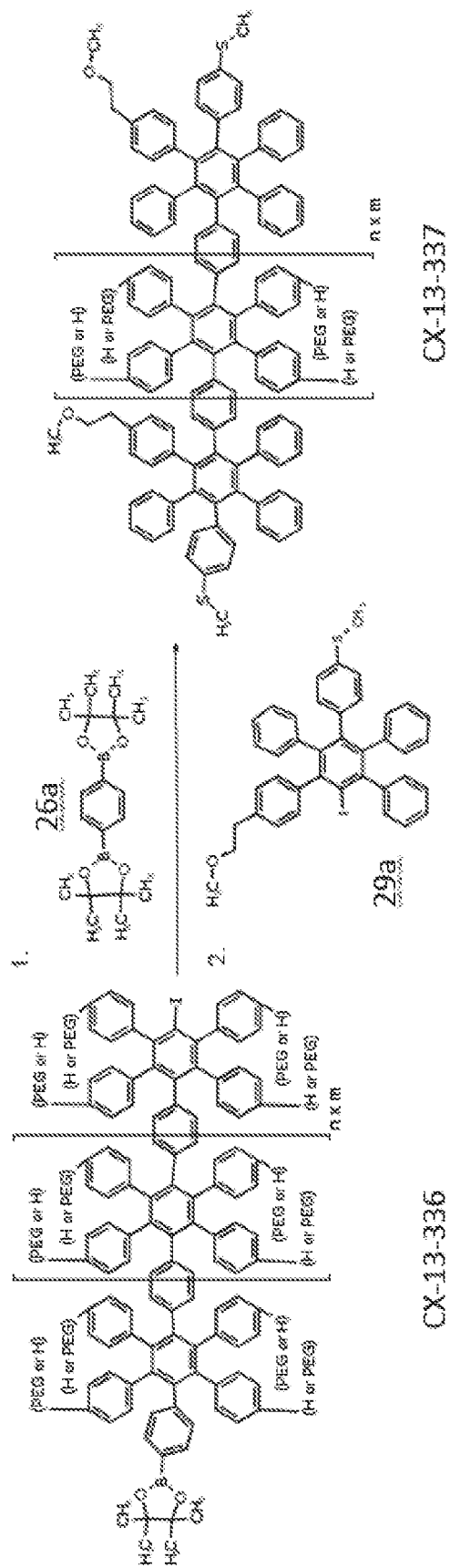
Figure 30:
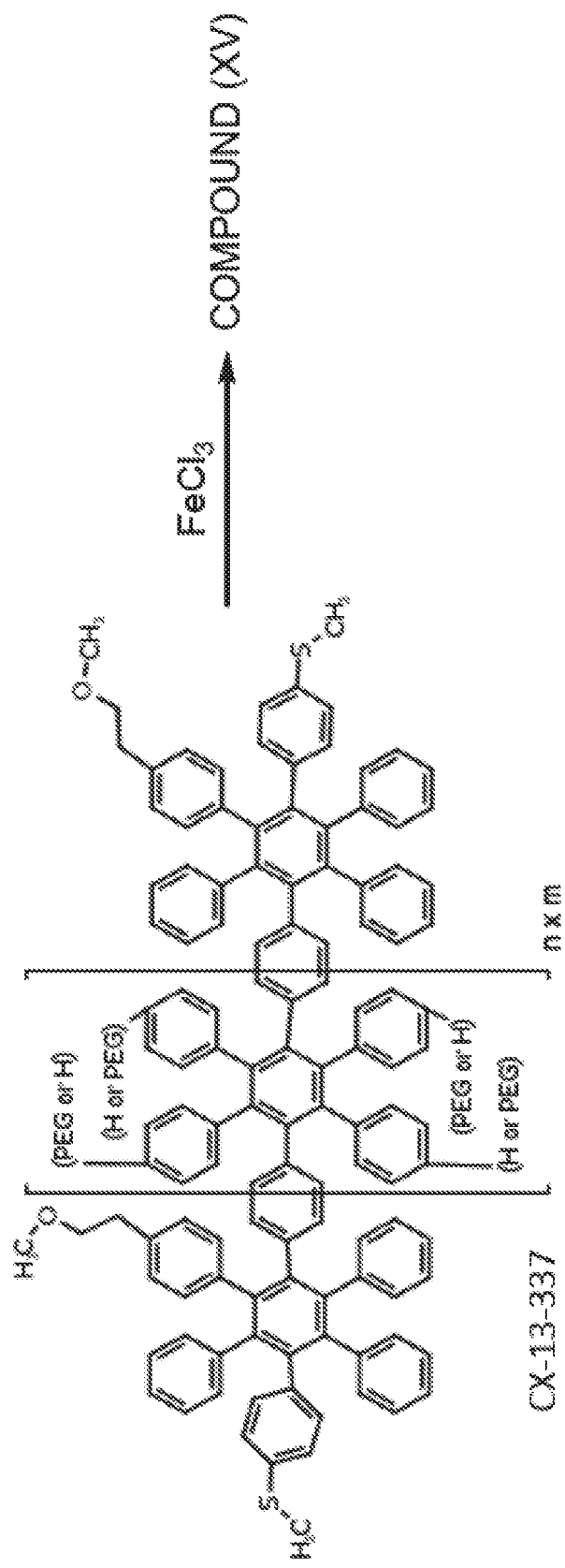

FIG. 22 sets forth the synthesis of tosyl-PEG-24 (22b), comprising the reaction of PEG-24 (22a) with tosyl-Cl and KOH in aqueous THF. FIG. 23 shows a synthesis of tetraphenyl diiodobenzene methoxyether (23c) beginning with perbromobenzene, 1-bromo-4-(2-methoxyethyl)benzene and bromobenzene. FIG. 24 show a synthesis of the monomer alcohol (24e) by demethylation of the previous methoxy monomer with trimethyliodosilane in dichloromethane. FIG. 25 shows a synthesis of PEG monomer (25f) by SN2 reaction of the previous tosyl-PEG-24 with the anion of the alcohol monomer formed with NaH in THF. FIGS. 26 and 27 show thermal and microwave Suzuki-Miyaura coupling reactions to generate the various fused ring systems from 1,4-benzenediboronic acid bis(pinacol) ester (26a) and the PEG monomer (25f). FIG. 28 sets forth additional Suzuki-Miyaura coupling to generate the nanoribbon intermediate CX-13-336. FIG. 29 shows additional Suzuki-Miyaura coupling to produce the nanoribbon intermediate CX-13-337. Lastly, FIG. 30 illustrates the synthesis of Compound (XV) by treatment with $FeCl_3$.

Figure 31A:
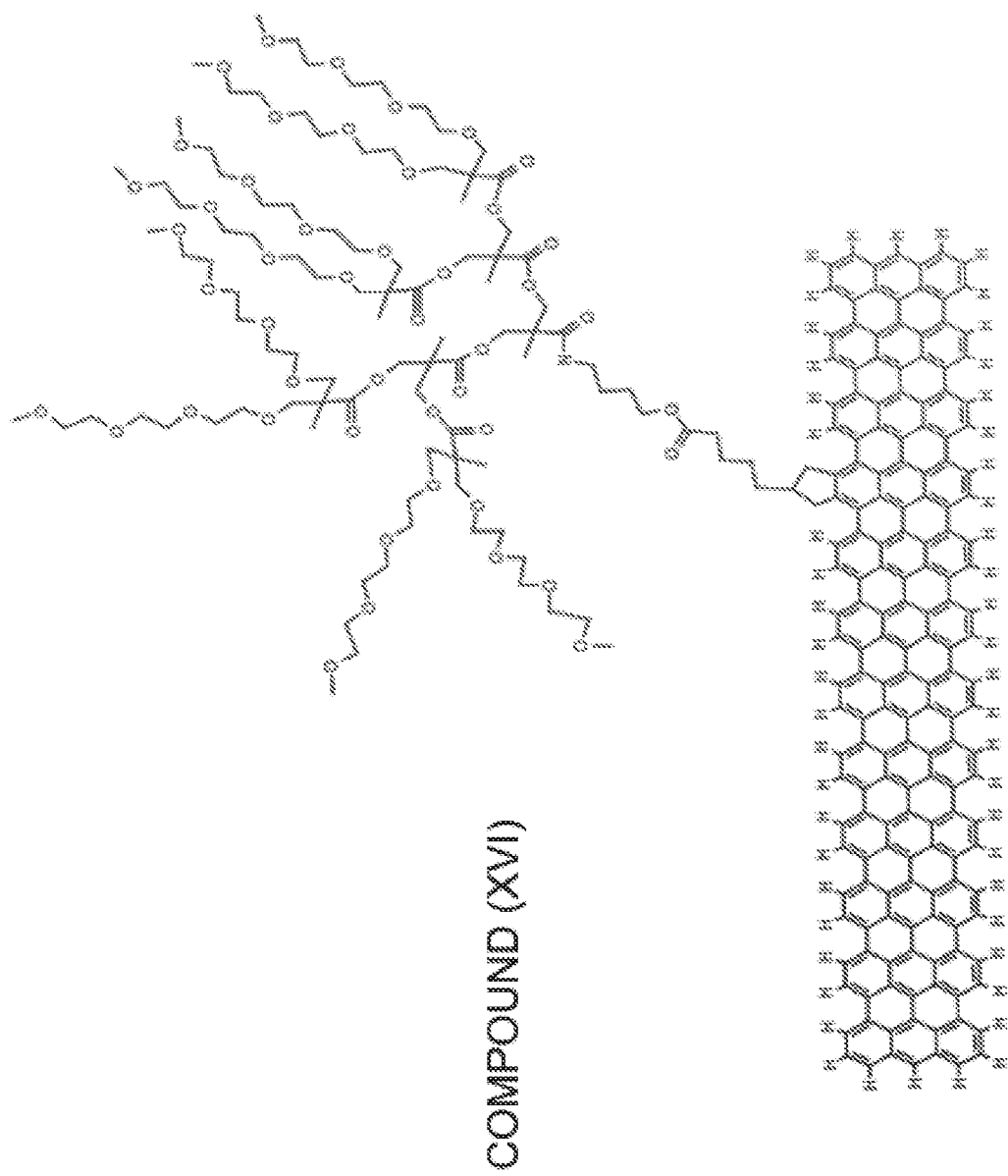
FIGS. 31a and 31b illustrate the 2D chemical structure of a synthetic bridge molecule comprising a polyanthracene nanoribbon with a single dendron attached, and the corresponding 3D structural model, respectively.

In various embodiments, a conducting synthetic organic bridge molecule is solubilized by at least one dendron. For example, Compound (XVI) illustrated in FIG. 31a shows a simplified version of a bridge molecule comprising a polyanthracene nanoribbon and only a single dendron attached thereon. Usable embodiments of Compound (XVI) further comprise (i) more than one dendron along both longer edges of the nanoribbon, e.g., as many as 1 dendron per every 1 to 3 nm length of nanoribbon, and (ii) an —SH or —S-alkyl group on each of the left and right ends of the molecule for bonding to metal electrodes.

Figure 31B:
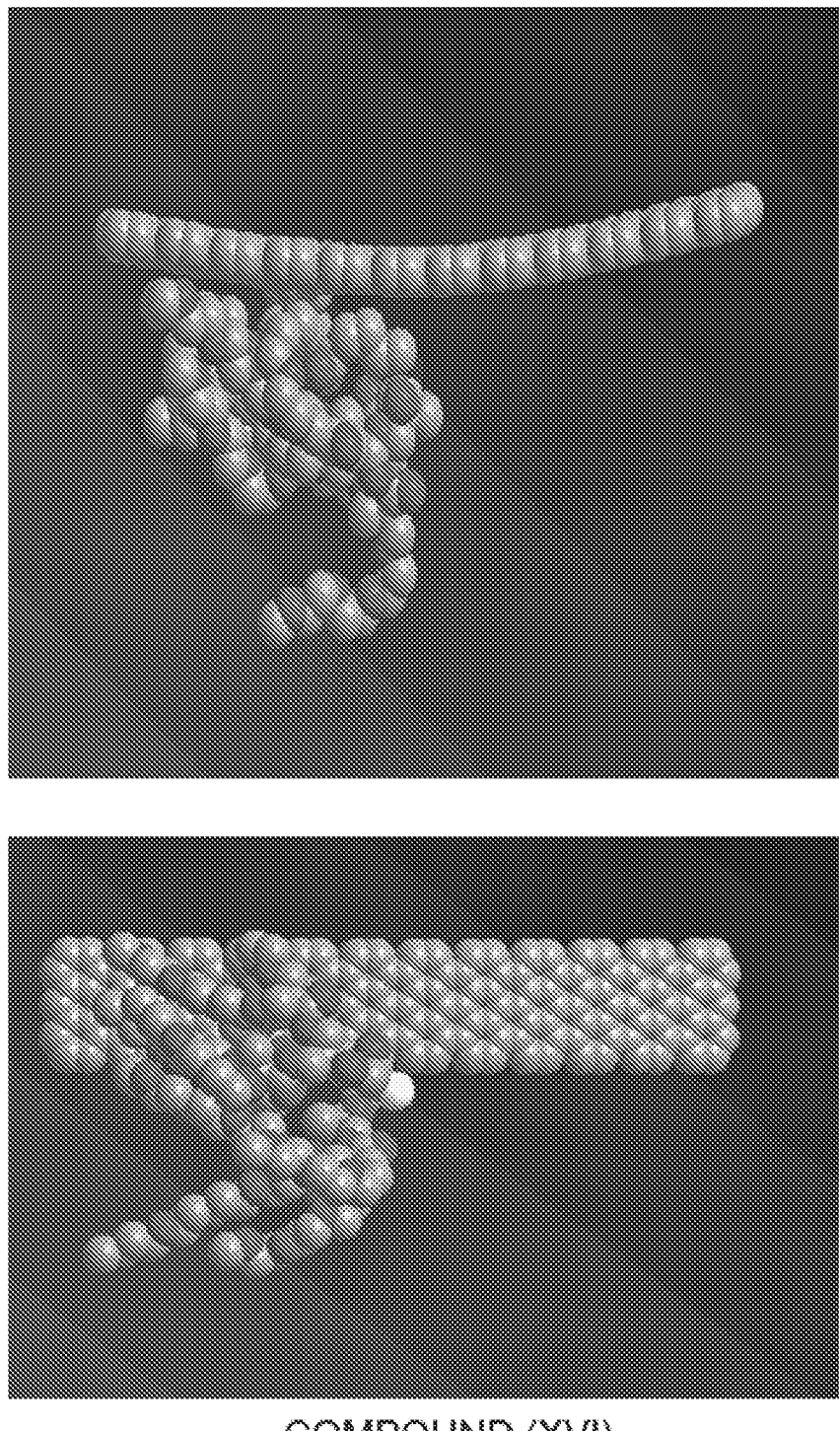

FIG. 31b shows a 3D structure model of Compound (XVI) comprising only one dendron and no other substituent groups on the nanoribbon.

Figure 32:
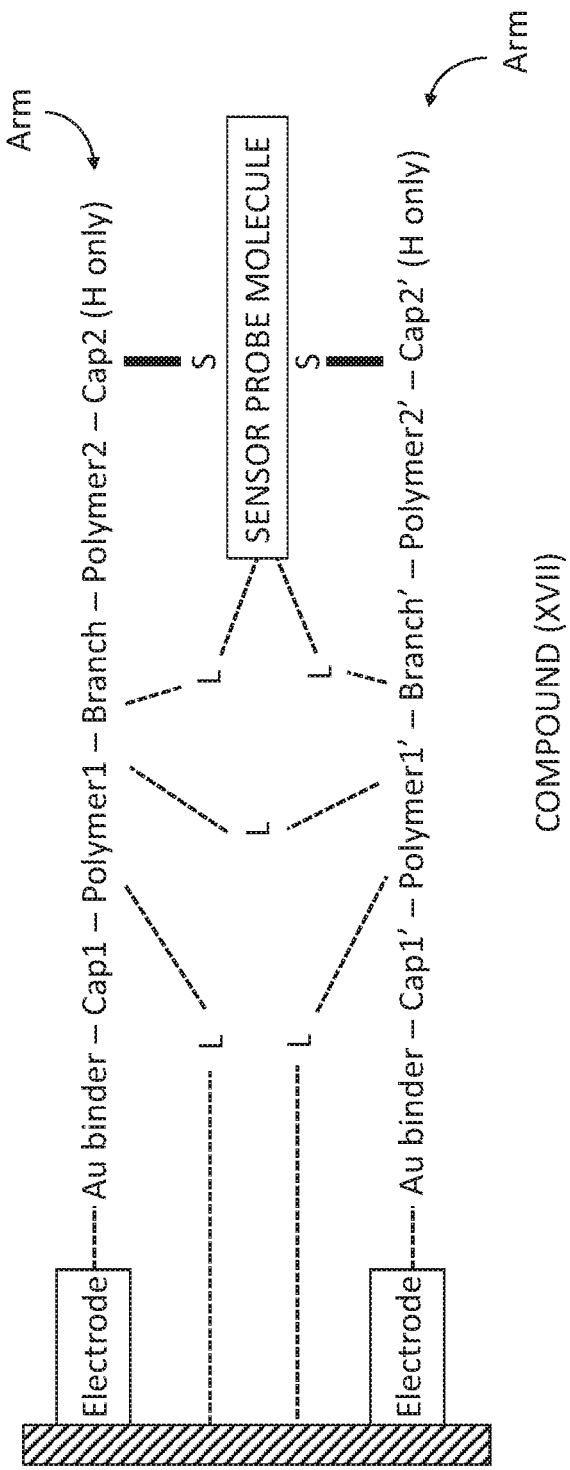
FIG. 32 illustrates an embodiment of a molecular component for a sensor circuit wherein the molecular component comprises two PAH molecules acting as arms to wire the sensor probe molecule into the circuit.

In various embodiments, a conducting synthetic organic bridge molecule comprises Compound (XVII) illustrated in FIG. 32. This schematic illustrates the use of two distinct polycyclic aromatic molecules as arms to wire a sensor probe molecule directly into a sensor circuit. As illustrated, electrical conductivity runs from the Au binding site, through one of the arms, through the sensor probe molecule, and then through the second arm to the second Au binding site, wherein:

"Cap1-Polymer1-Branch-Polymer2-Cap2" and "Cap1'-Polymer1'-Branch'-Polymer2'-Cap2'" represent two distinct, fused polycyclic aromatic hydrocarbon molecular arms, derivatized at the edges, which are each about 5 to about 100 nm long, about 8 to about 60 nm long, or about 10 to about 30 nm long;

Cap1 and Cap1' are single monomer units that can bind to electrode surfaces, such as e.g., gold surfaces, through thioethers, reactive carbenes, gold-binding peptide or other material binding sequences, thiols, and/or dithiocarboxylate;

Cap2 and Cap2' are single, underivatized monomer units;

Polymer1, Polymer1', Polymer2, and Polymer2' are polyaromatic fused ring segments optionally derivatized with any number of solubilizing groups such as PEG groups to enable solubility in organic solvents such as tetrahydrofuran and dispersibility in water. In various embodiments, Polymer1 and Polymer1' segments may be of any length, and may be the same or different than the Polymer 2 and Polymer 2' segments;

Branch and Branch' are each linked to a different finger or helix on the DNA polymerase, chosen so that the distance between Branch and Branch' changes as the polymerase incorporates a dNTP through one or more S-alkyl or S-aryl connections; and L are optional connections, such as bivalent anchoring linkages, that (i) tie the distinct polyaromatic arms together; (ii) tie either or both arms to an electrode in the pair of spaced-apart electrodes; (iii) tie either or both arms to the underlying substrate supporting the electrodes as shown; and/or (iv) provide an additional attachment point from any position along either or both arms to the sensor probe molecule. In various embodiments, there can be at least one bivalent linkage as shown to anchor the one or more arms of the bridging complex. In various embodiments, each L, when present, is selected from (poly)methylene, —$(CH_2)_x$—, of any length and with any number of intervening heteroatoms instead of C; PEG of any length; a polypeptide; various ring structures, e.g., 1,4-phenylene; or any combinations of the above.

In various embodiments, Compound (XVII) in FIG. 32 comprises two functional groups, one at each of the opposite ends, labeled here as "Au-Binder" on each end. The "Au binder" at opposite ends of each arm may comprise a metal binding moiety such as —SH, —SMe, or —CS2H.

In various embodiments, synthetic bridge molecules in accordance to the present disclosure are based on Compound (II) of FIG. 10, wherein the conducting nanoribbon core structure comprises a phenyl-substituted 12-APAH conducting ribbon with a zigzag edge. Various examples are set forth below.

In various embodiments, a synthetic bridge molecule comprises Compound (XIII) illustrated in FIG. 35a. This molecule comprises the zig-zag edge PAH bridge based on the 12-APAH ribbon conductor structure. Compound (XIII) is fully functionalized with PEG ester side chains, caps with thiol linkages for binding to metal electrodes, and a side chain comprising a tethered biotin for binding to a probe molecule and for sensor self-assembly. In various embodiments of Compound (XIII), the PEG ester side chains comprise the structure—p-$(C_6H_4)$—$(CH_2)_t$COO$(CH_2CH_2O)_u CH_3$, wherein t is from 0) to 10 and us is from 5 to 50.

FIG. 35b shows a 3D model of Compound (XIII).

In general, synthetic bridge molecules comprising the fused polycyclic aromatic hydrocarbon nanoribbons as disclosed herein are obtainable by a convergent synthesis scheme based on palladium catalyzed Suzuki-Miyaura cross-coupling between a boron compound and an organic halide. A convergent synthesis, rather than a linear synthesis scheme, is practical here due to the size of these molecules. The key steps in assembling these molecules comprise (i) the palladium or microwave catalyzed Suzuki-Miyaura cross-coupling of an aryl 4,4,5,5-tetramethyl-1,3,2-dioxaborolane and an aryl halide to form biaryls and (ii) $FeCl_3$ catalyzed intramolecular dehydrogenative coupling to form the fused ring nanoribbons (e.g., see Y. Huang, et al., supra). In various embodiments of the synthetic schemes herein, the ordering of the steps in the synthesis can be changed such that key side chain moieties are attached either before or after the palladium or $FeCl_3$ catalyzed coupling reactions, e.g., based on the compatibility of particular side chains to these reaction conditions.

Figure 36:
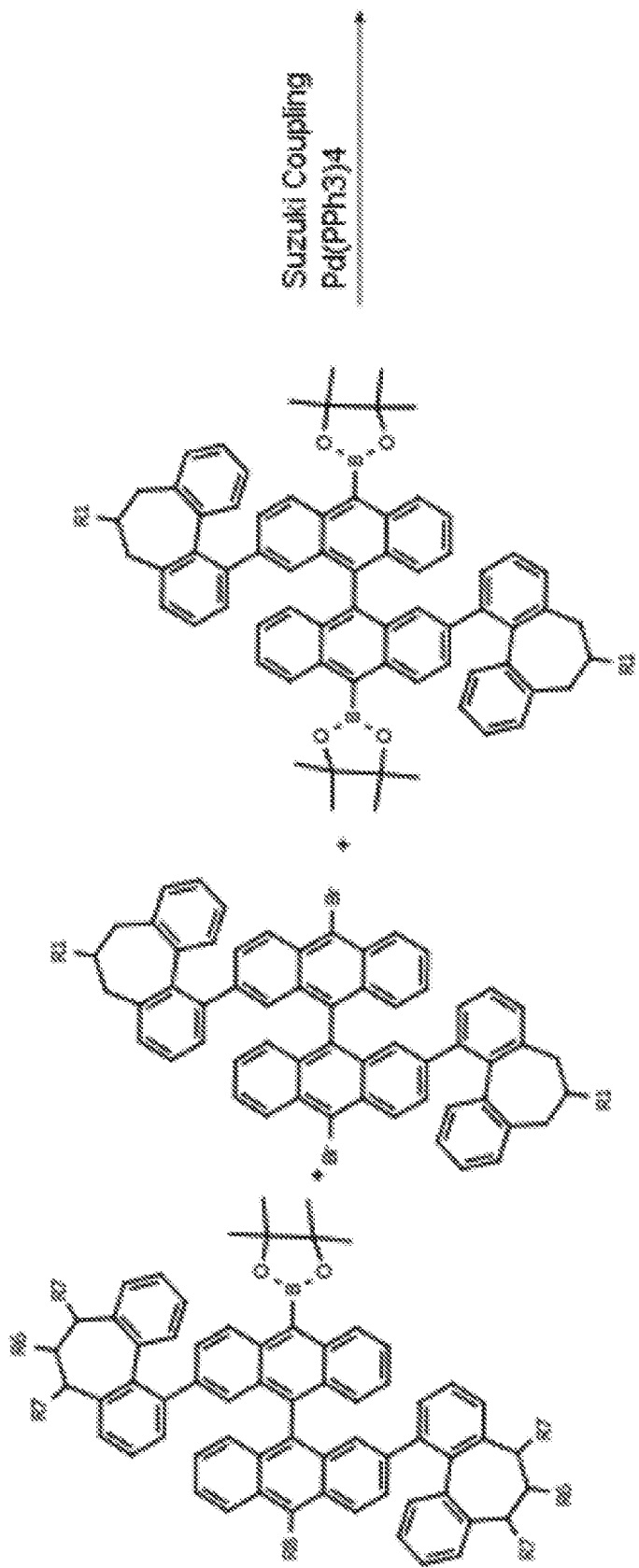
FIGS. 36-42 illustrate an embodiment of a synthetic route to Compound (VI) of FIG. 18.
Figure 37:
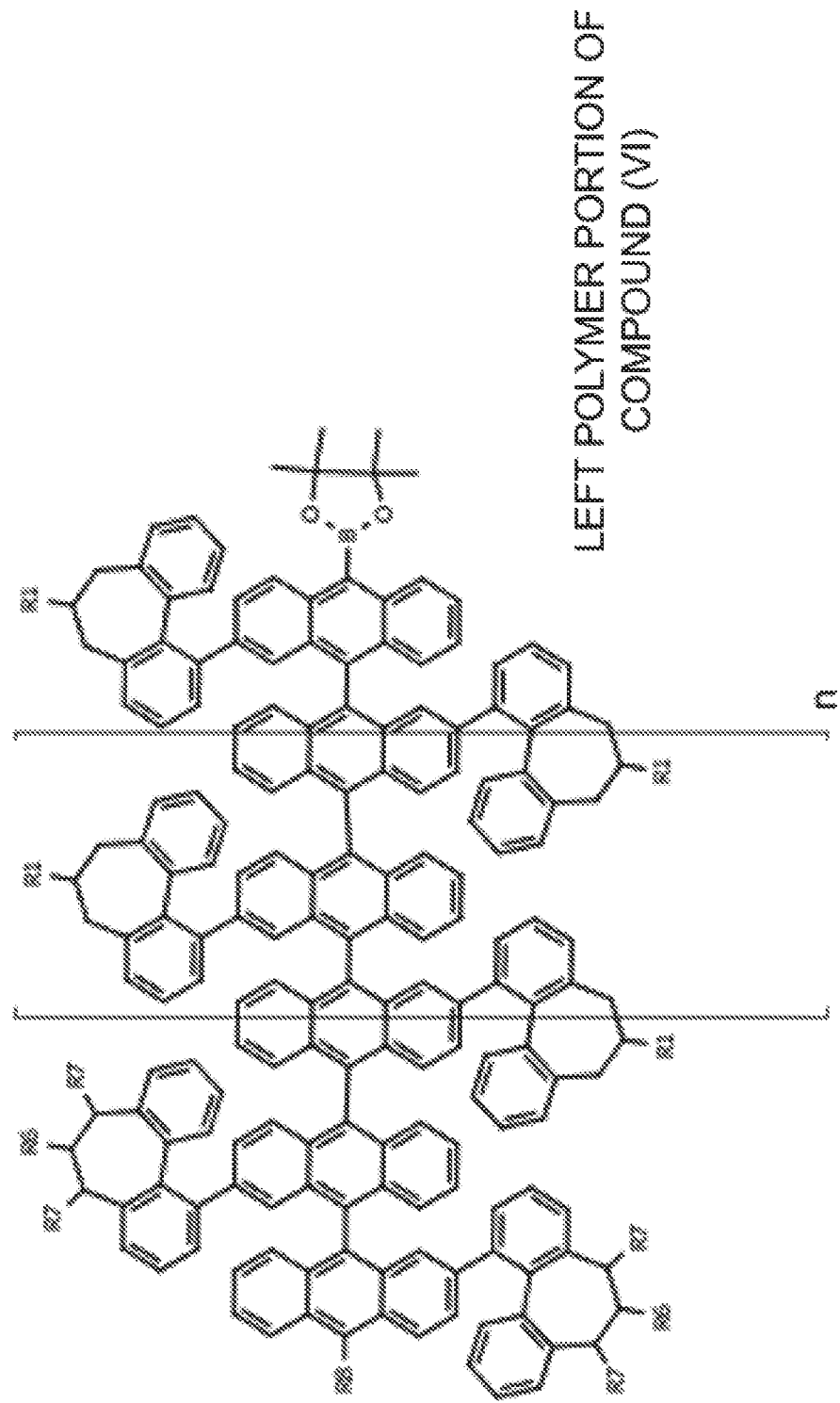
Figure 38:
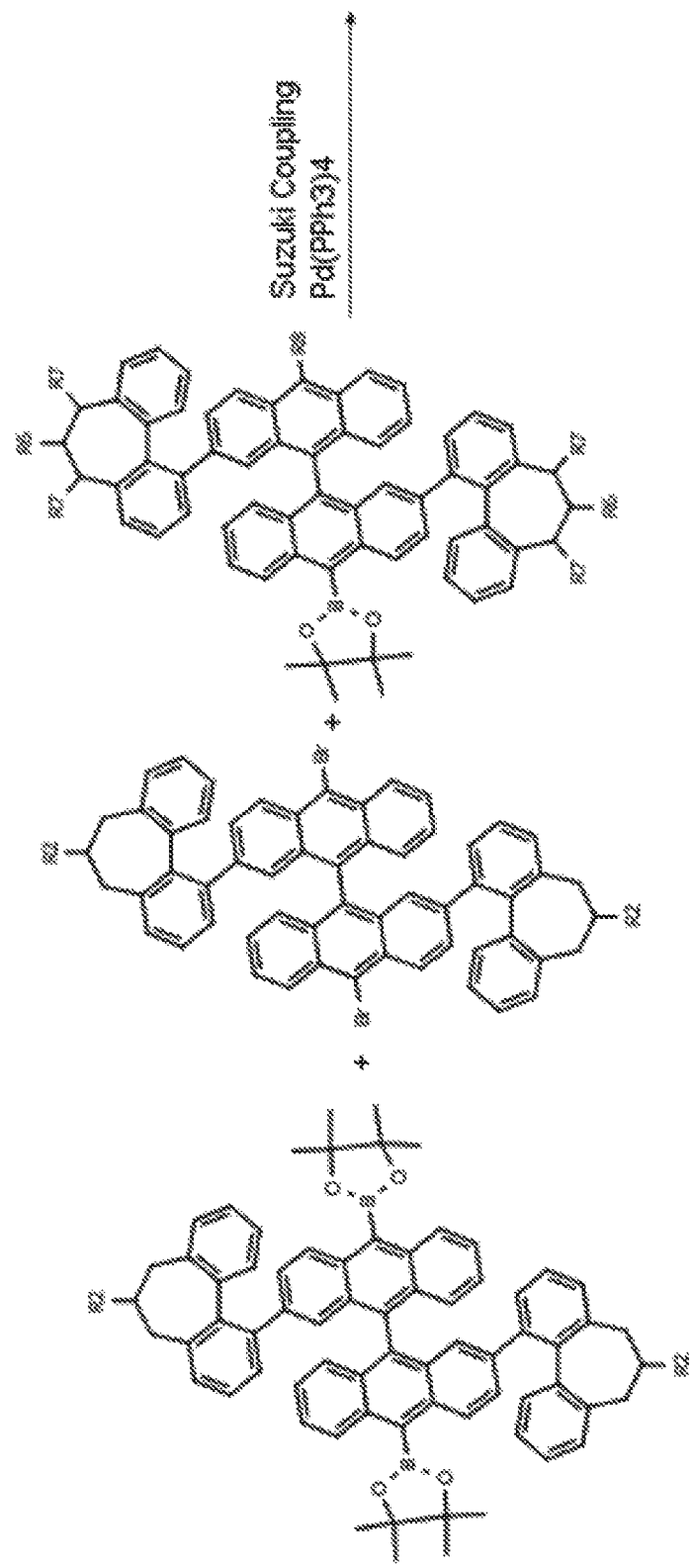
Figure 39:
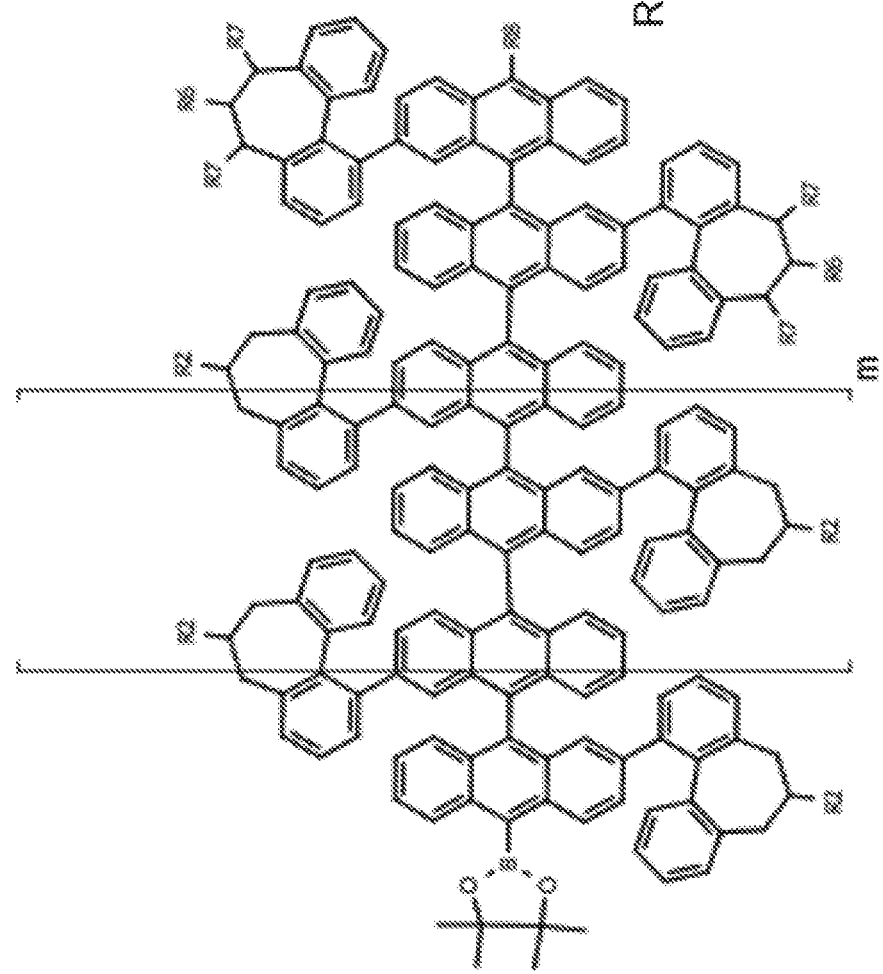
Figure 40:
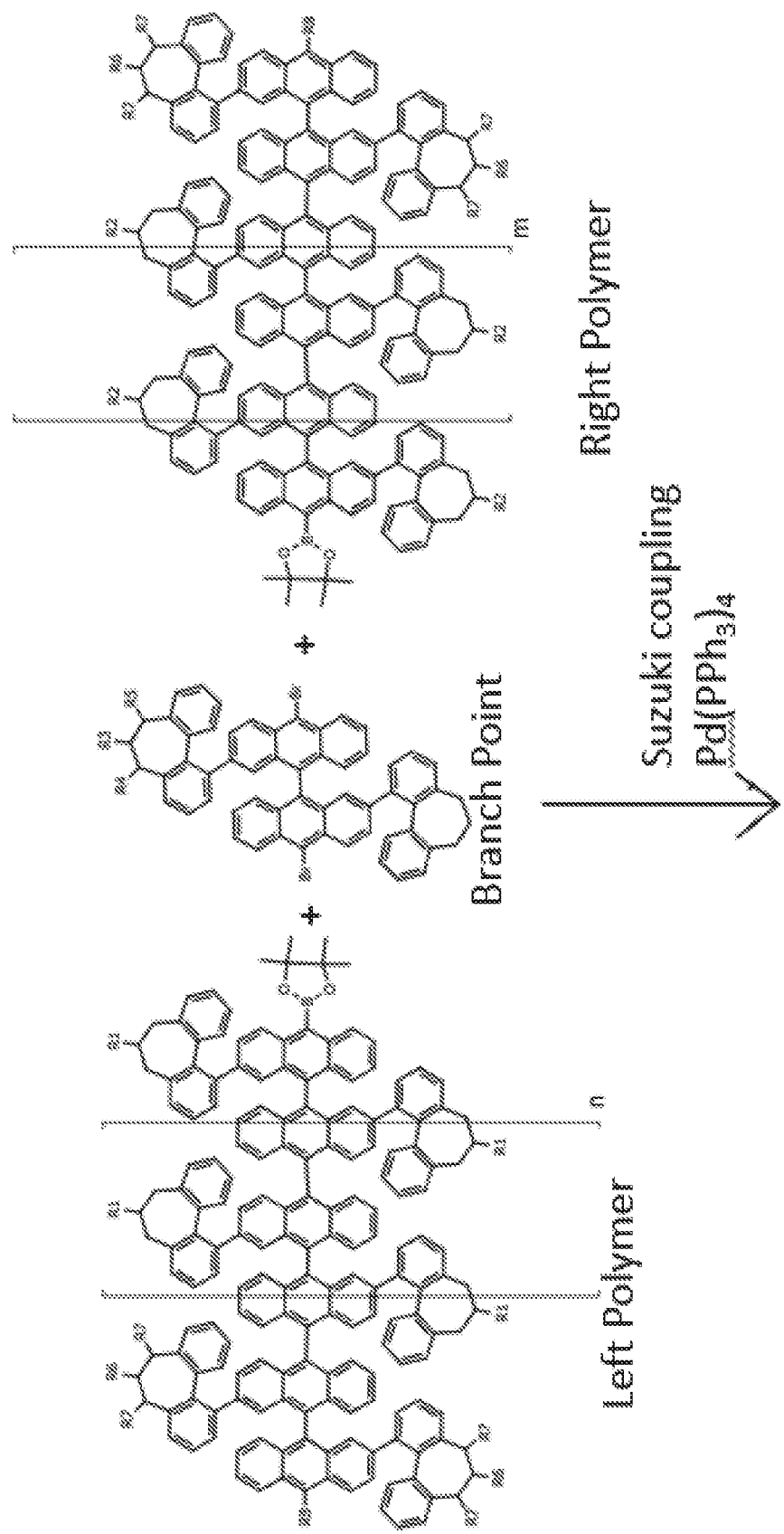
Figure 41:
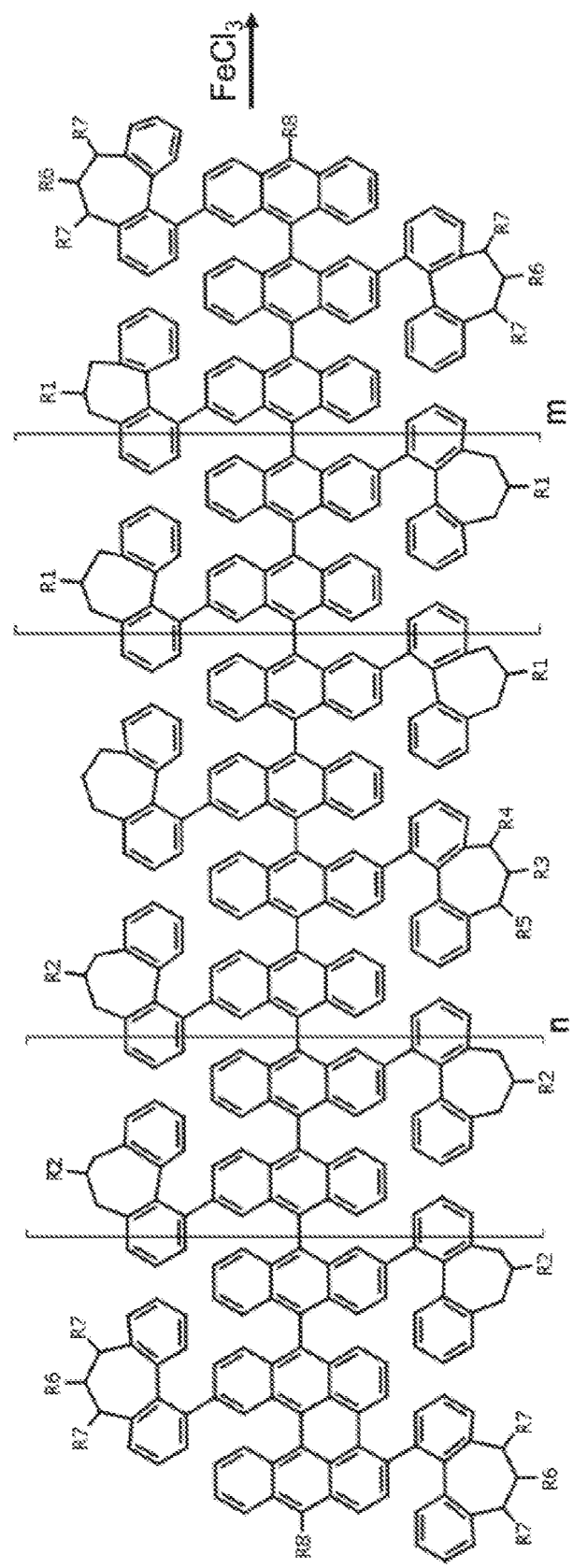
Figure 42:
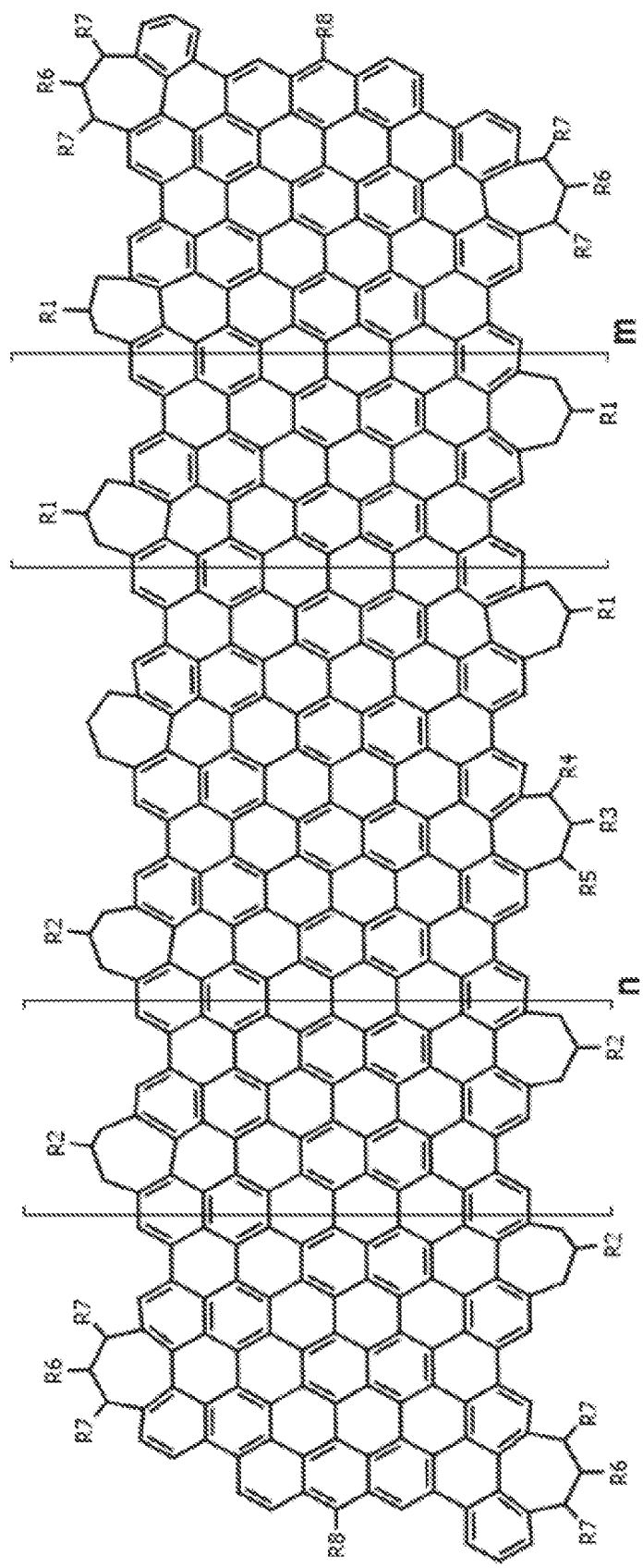

An embodiment of a synthetic route to Compound (VI) (FIG. 18) is illustrated in FIGS. 36-42. FIGS. 36 and 37 illustrate synthesis of the left polymer portion of Compound (VI) by Suzuki coupling. FIGS. 38 and 39 illustrate synthesis of the right polymer portion of Compound (VI) by Suzuki coupling. FIGS. 40 and 41 illustrate the Suzuki coupling of left and right polymer portions to a central branch point substructure to produce the pre-13AGNR Compound (FIG. 41). Lastly, $FeCl_3$ treatment completes the aromatization of pre-13AGNR into Compound (VI).

Figure 43:
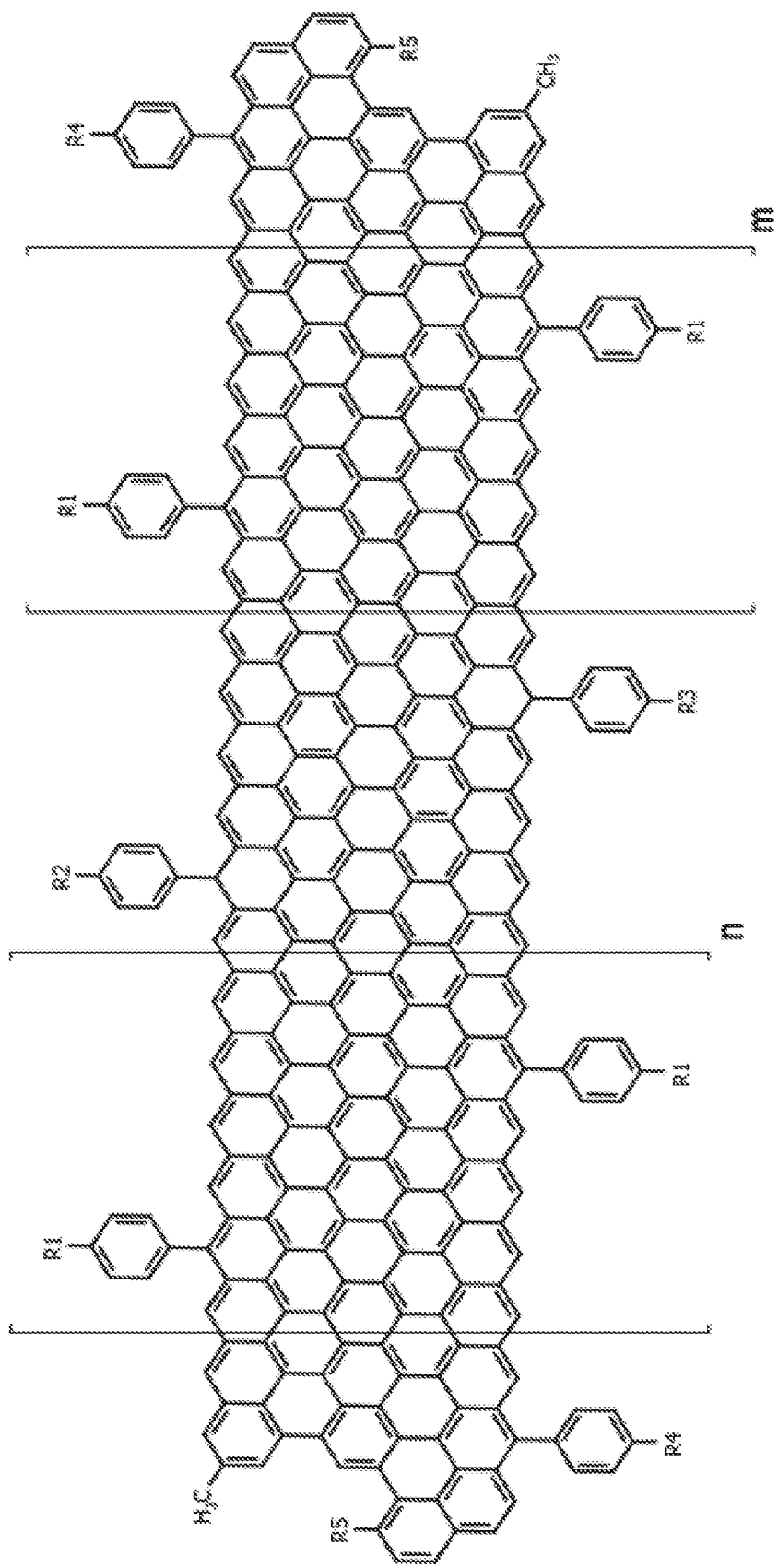
FIG. 43 illustrates an embodiment of polycyclic bridge molecules represented by Compound (XII) comprising a phenyl substituted 12-APAH ribbon structure with a zigzag edge.

In various embodiments, a synthetic bridge molecule comprises Compound (XII) illustrated in FIG. 43. Compound (XII) comprises a phenyl substituted 12-APAH ribbon with a zigzag edge.

In various embodiments, a synthetic bridge molecule comprises Compound (XII) of FIG. 43, wherein:

n=2;

m=3 to 500;

$R^1$ is selected from: (1) an ester linked PEG chain having the structure $(CH_2)_xCO(OCH_2CH_2)_yOR^{13}$ or $(CH_2)_xOC=OCH_2CH_2CH_2(OCH_2CH_2)_yOR^{13}$, wherein x is from 3 to 10, y is from 10 to 40, and $R^{13}$ is Me or H; (2) an ether linked PEG chain having the structure $(CH_2)_xO—CH_2CH_2CH_2(OCH_2CH_2)_yOR^{13}$, wherein x>2, y is from 10 to 40, and $R^{13}$ is Me or H; or (3) a water-soluble ester linked dendron, linked from the core site with 8 to 64 branches derivatized with water-solubilizing PEG chains $(CH_2CH_2O)_zR^{14}$, wherein z is from 1 to 8 and $R^{14}$ is H or Me; and wherein $R^1$ can optionally include a 1) photocleavable, 2) redox-cleavable, 3) acid cleavable or 4) base-cleavable linker between the atom and the PEG chain or dendron so that the PEG chain or dendron can be removed using 1) light, 2) an oxidizing or reducing agent, 3)+acid or 4) base, respectively, after the cap portion of the molecule is linked to gold electrodes;

$R^2$ is selected from: (1) an ester linked PEG chain having the structure $(CH_2)_xCO(OCH_2CH_2)_yOR^{13}$ or $(CH_2)_xOC—OCH_2CH_2CH_2(OCH_2CH_2)_yOR^{13}$, wherein x is from 3 to 10, y is from 10 to 40, and $R^{13}$ is Me or H; (2) an ether linked PEG chain having the structure $(CH_2)_xO—CH_2CH_2CH_2(OCH_2CH_2)_yOR^{13}$, wherein x>2, y is from 10 to 40, and $R^{13}$ is Me or H; or (3) —H;

$R^3$=

$(CH_2)_nC(O)NH—CH[(CH_2)_r(CH_2)R^{18}][CH_2CH_2—O—CH_2CH_2O—(CH_2)_s—R^{19}]$, wherein n, r and s are independently between 2 and 7; and wherein $R^{18}$ and $R^{19}$ are chosen from the combinations in TABLE 1 such that $R^{18}$ and $R^{19}$ cannot react with one another;

TABLE 1

| $R^{18}$ | $R^{19}$ |
|---|---|
| —$N_3$ | NHCO-biotin |
| —$N_3$ | —CHO |
| —$N_3$ | —$COCH_3$ |
| —$N_3$ | O—$NH_2$ |
| —CC—H | NHCO-biotin |
| —CC—H | —CHO |
| —CC—H | —$COCH_3$ |
| —CC—H | O—$NH_2$ |

$R^4$ is H or $SCH_2CH_2SCH_3$; and $R^5$ is —SH or $SCH_2CH_2SCH_3$.

Figure 44A:
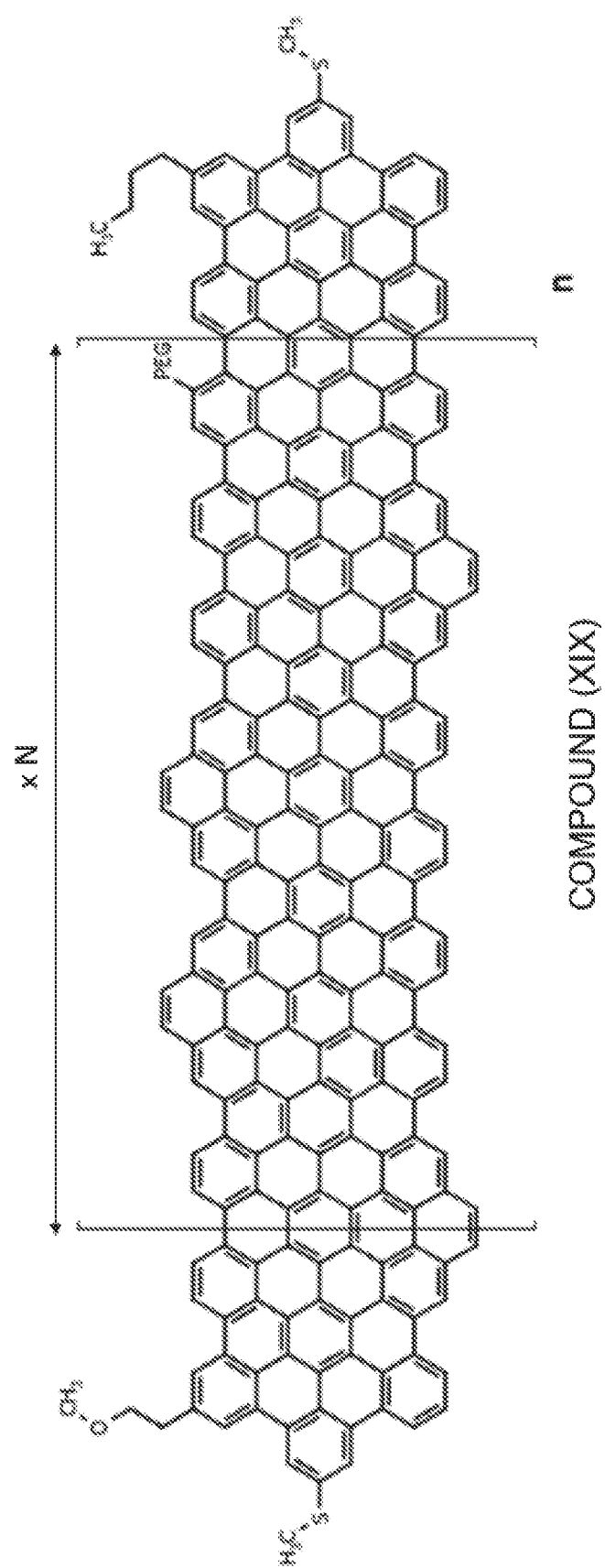
Figure 44B:
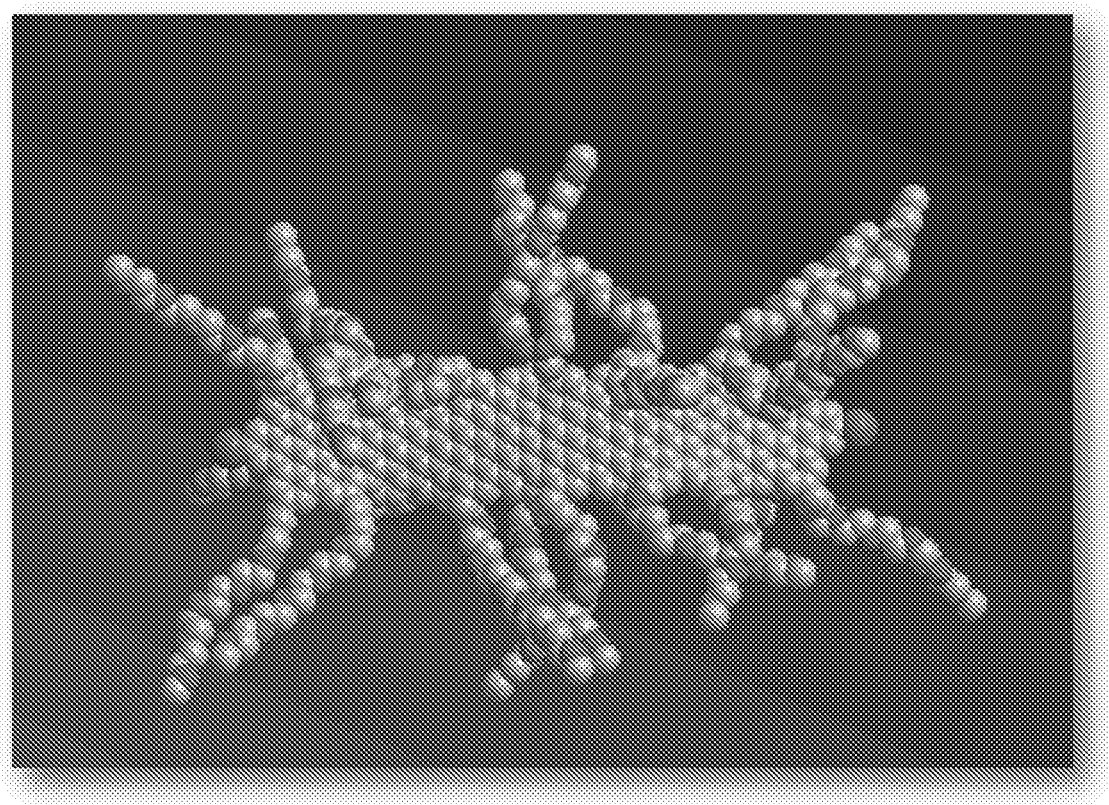
Figure 44D:
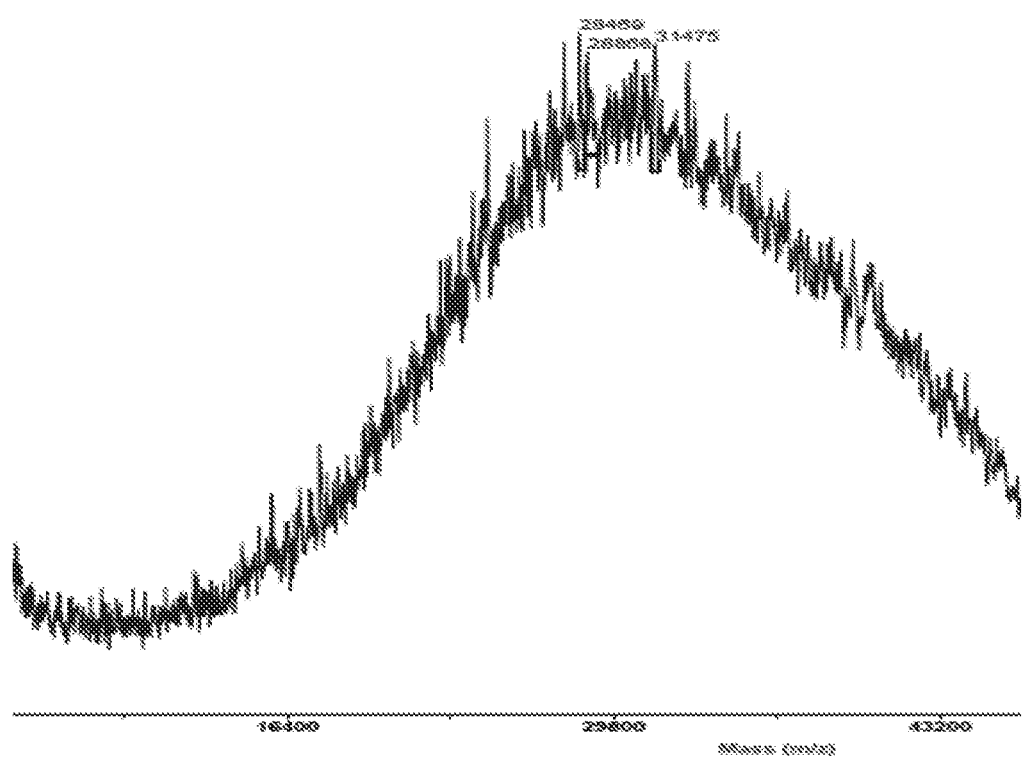
Figure 44E:
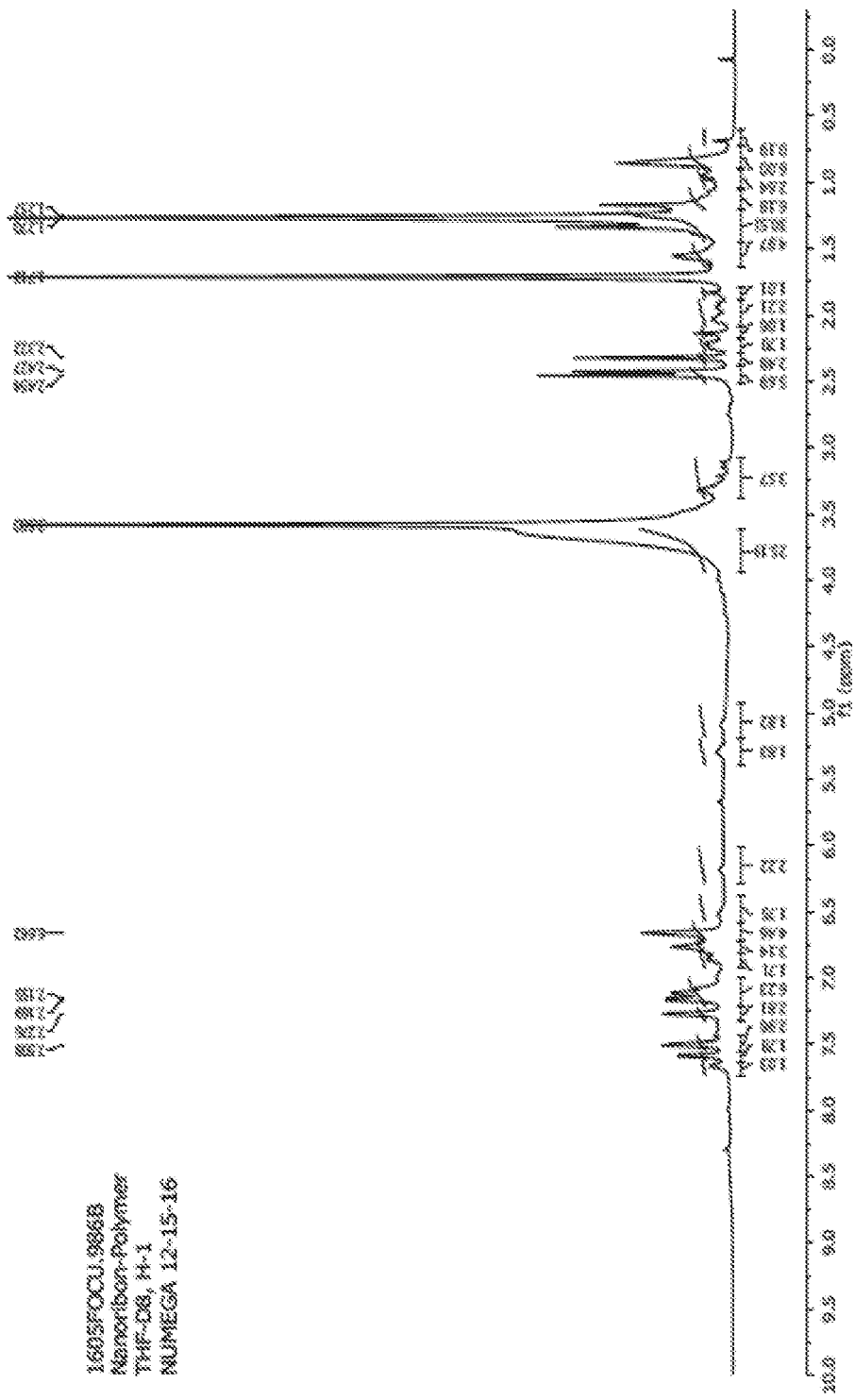

In various embodiments, a synthetic bridge molecule comprises Compound (XIX) illustrated in FIG. 44a. This bridge molecule comprises PEG side chains, —S—$CH_3$ end groups, and a PAH nanoribbon conducting core structure. Representative diverse lengths of this form, in the range of about 5 nm to 30 nm in length, were synthesized by the methods outlined below. The 3D model of Compound (XIX) is shown in FIG. 44b. The synthesis product Compound (XIX) in shown in bulk, suspended in THF and by the TEM image in THF solvent in FIG. 42c. The mass spectra of Compound (XIX) is shown is FIG. 42d, and the NMR spectra partially characterizing the size and composition of these products are also shown in FIG. 42e. The spectra illustrate the range of masses present, and the ratio of PEG groups to aromatic rings.

Synthetic Protocols

The following illustrates an embodiment of a synthesis of the series of intermediate components and final ribbon for an embodiment of a PAHEB.

Synthesis of Tosyl PEG-24 (22b) (FIG. 22)

To a 0° C. suspension of PEG-24 (22a) (0.750 g, 0.689 mmol) and tosyl chloride (0.197 g, 1.03 mmol) in 1.5 ml of anhydrous tetrahydrofuran was added 16 M potassium hydroxide (aq.) (0.140 ml) in four portions over 1 hour at that temperature. Once the addition was complete, the reaction was stirred for 16 hours at room temperature under an inert atmosphere. The reaction was diluted with dichloromethane/water, and stirred until the layers cleared. The layers were separated and the aqueous phase was extracted with additional dichloromethane. The combined organics were washed three times with water, dried over sodium sulfate, and concentrated in vacuo. The crude material was purified via flash chromatography (silica gel, 0-10% methanol/dichloromethane) to provide Tosyl PEG-24 (22b) (0.678 g, 79% yield) as a white amorphous solid. 1H NMR (499 MHz, Chloroform-d) δ 7.80 (d, J=8.3 Hz, 2H), 7.34 (d, J=8.0 Hz, 2H), 4.18-4.13 (m, 2H), 3.81-3.45 (m, 89H), 3.38 (s, 3H), 2.45 (s, 3H), 1.71 (s, 5H). MS: mass calculated for $C_{56}H_{106}O_{27}S$: 1242.66. found: positive (m/z): 1243.5 $(M+H)^+$, 1265.5 $(M+Na)^+$, 1281.9 $(M+K)^+$.

Synthesis of Tetraphenyl Diiodo Benzene Methoxyether (23c) (FIG. 23)

To a suspension of magnesium turnings (1.22 g, 50.3 mmol) in 47 ml of anhydrous tetrahydrofuran was carefully added a mixture of 1-bromo-4-(2-methoxyethyl)benzene (1.68 g, 7.80 mmol) and bromobenzene (4.04 g, 25.7 mmol) slowly, as not to boil the solvent, over a period of 1 hour. Once the addition was complete, the reaction was stirred for an additional 1 hour at room temperature until the heating ceased. The reaction was cooled to 0° C. before perbromobenzene (1.85 g. 3.35 mmol) was added, and the reaction was stirred for 16 hours at room temperature under an inert atmosphere. The reaction was cooled to 0° C. and iodine (8.51 g. 33.5 mmol) dissolved in 10 ml of tetrahydrofuran was added until the deep purple color (characteristic of iodine) remained, and was stirred for an additional 2 hours. The reaction was diluted with water and chloroform and the iodine quenched with saturated sodium thiosulfate solution. The phases were separated and the aqueous phase extracted twice with 100 ml of chloroform. The combined organics were washed twice with saturated sodium bicarbonate, once with brine, dried over sodium sulfate, and concentrated in vacuo. The crude material was purified via flash chromatography (silica gel, 0-40% ethyl acetate/hexane) to provide 3',6'-diiodo-4-(2-methoxyethyl)-4',5'-diphenyl-1,1':2',1''-terphenyl(23c) (0.328 g) (14-179p11) and a less pure sample (djs-14-179p12) which was re-purified by flash chromatography (silica gel, 0-30% ethyl acetate/hexane) to provide (0.175 g) of additional product (23c) for a total of (0.503 g. 22% yield) as a pale yellow solid. 1H NMR (499 MHz, Chloroform-d) δ 7.20-6.92 (m, 19H), 3.50 (t. J=7.3 Hz, 2H), 3.28 (s, 3H), 2.78 (t, J=7.2 Hz, 2H); MS: mass calculated for $C_{33}H_{26}I_2O$: 692.01. found: positive (m/z): 715.1 $(M+Na)^+$, 731.1 $(M+K)^+$.

Synthesis of Monomer Alcohol (24e) (FIG. 24)

To a solution of methoxy monomer (23c) (0.190 g, 0.274 mmol) dissolved in 5.0 ml of anhydrous dichloromethane was added iodotrimethylsilane (0.284 g, 1.42 mmol), and the deeply colored reaction was stirred for 16 hours at room temperature under an inert atmosphere. The reaction was quenched with 2.0 ml of concentrated ammonia (aq.) and stirred for 20 minutes. The reaction was diluted with water and the phases separated. The aqueous phase was extracted twice with dichloromethane, and the combined organics were washed with water, brine, dried over sodium sulfate, and concentrated in vacuo. The crude material was used in the subsequent step (silyl ether cleavage) without further purification.

To a solution of crude silyether monomer (24d) dissolved in 15.0 ml of anhydrous tetrahydrofuran was added tetrabutylammonium fluoride TBAF (0.612 mmol, 1.0 M in THF), and the reaction was stirred for 16 hours at room temperature under an inert atmosphere. The reaction was concentrated in vacuo, dissolved in dichloromethane/water, and the phases separated. The aqueous phase was extracted two additional times with dichloromethane, and the combined organics were washed with brine, dried over sodium sulfate, and concentrated in vacuo. The crude material was purified via flash chromatography (silica gel, 0-50% ethyl acetate/hexane) to provide alcohol monomer (24e) (60% yield over the 2-steps) as a white solid. 1H NMR (499 MHz, Chloroform-d) δ 7.19-6.97 (m, 19H), 3.76 (t, J=6.5 Hz, 2H), 2.77 (t, J=6.4 Hz, 2H), MS: mass calculated for $C_{32}H_{24}I_2O$: 677.99; found: positive (m/z): 701.0 $(M+Na)^+$, 716.8 $(M+K)^+$.

Synthesis of PEG-24-Monomer (25f) (FIG. 25)

To a 0° C. solution of alcohol monomer (24e) (0.040 g, 0.059 mmol) dissolved in 1.0 ml of anhydrous tetrahydrofuran was carefully added 60% sodium hydride (8.0 mg, 0.206 mmol), and the reaction was stirred at reflux for 1 hour under an inert atmosphere. The reaction was cooled, and added tosyl PEG-24 (22b) (0.077 g, 0.062 mmol) dissolved in 1.1 ml of anhydrous tetrahydrofuran dropwise and the reaction was stirred at reflux for 16 hours under an inert atmosphere. The reaction was cooled, charged with additional sodium hydride (10 mg), and stirred at reflux for an additional 24 hours. The reaction was quenched with a few drops of water, and concentrated in vacuo. The resulting residue was dissolved in dichloromethane/water, and the phases separated. The aqueous phase was saturated with sodium chloride, extracted six additional times with dichloromethane, and the combined organics were washed with brine, dried over sodium sulfate, and concentrated in vacuo. The crude material was purified via flash chromatography (silica gel, 0-10% methanol/dichloromethane) to provide PEG-24-Monomer (25f) (0.058 g, 57% yield) as a clear solid. 1H NMR (499 MHz, Chloroform-d) δ 7.22-6.90 (m, 19H), 3.81-3.45 (m, 211H), 3.38 (s, 7H), 2.79 (t, J=7.2 Hz, 2H), ~50% excess PEG by NMR; MS: mass calculated for $C_{81}H_{122}I_2O_{25}$: 1748.64. found: positive (m/z): 1771.7 $(M+Na)^+$.

Synthesis of Nanoribbon Polymer by Thermal Reaction (FIGS. 26-27)

A solution a PEG-monomer (25f) (29 mg, 0.0166 mmol), 1,4-benzenediboronic acid bis(pinacol) ester (26a) (5.5 mg. 0.0166 mmol) and $K_3PO_4$ (7.0 mg, 0.0332 mmol) in 1 ml DMF was degassed 5 times with argon bubbling. Then $Pd(PPh_3)_4$ (2.0 mg) was added, and the reaction mixture was degassed 3 times with argon bubbling. The reaction mixture was heated up to 100° C. and stirred under Argon overnight. The "thermal reaction" crude product was used in the following reaction without purification.

Synthesis of Nanoribbon Polymer by Microwave Reaction (FIG. 28)

A solution of the PEG-monomer (25f) (47.3 mg, 0.027 mmol) and $K_3PO_4$ (11.4 mg, 0.054 mmol) in 1.4 ml DMF was degassed 5 times with argon bubbling. Then $Pd(PPh_3)_4$ (7.8 mg) was added, and the reaction mixture was degassed 3 times with argon bubbling. This intermediate solution, containing 19 millimolar PEG-monomer (25f), is referred to herein as "Solution A."

A solution of 1,4-benzenediboronic acid bis(pinacol) ester (26a) (12.7 mg, 0.038 mmol) and $K_3PO_4$ (16.1 mg. 0.076 mmol) in 2 ml DMF was degassed 5 times with argon bubbling. This intermediate solution, containing 19 millimolar 1,4-benzenediboronic acid bis(pinacol) ester (26a), is referred to herein as "Solution B."

Six (6) microwave reaction solutions were set up, using 200 μL of Solution B for each reaction, and 200 μL (B:A mole ratio 1:1), 160 μL (B:A mole ratio 1:0.8), 140 μL (B:A mole ratio 1:0.7), 124 μL (B:A mole ratio 1:0.62), 100 μL (B:A mole ratio 1:0.5), and 80 μL (B:A mole ratio 1:0.4) of Solution A for each reaction separately. Each microwave reaction was microwaved for 10 minutes at 150° C.

After microwave reaction, the three reactions at mole ratios of 1:0.62, 1:0.5 and 1:0.4 were combined and then mixed with half of the "thermal reaction" product, and then reacted with more diiodo-PEG-monomer (25f) (16.7 mg), additional $K_3PO_4$ (5.0 mg) and $Pd(PPh_3)_4$ (3.0 mg), following the same procedure as above, which lead to the 13-335-$I_2$ polymer (FIG. 27), after removing DMF, used directly in the next step without purification.

The other three reactions at mole ratio of 1:1, 1:0.8 and 1:0.7 were combined and then mixed with the other half of the "thermal reaction" product, and then reacted with more 1,4-benzenediboronic acid bis(pinacol) ester (26a) (6.4 mg), $K_3PO_4$ (5.0 mg) and $Pd(PPh_3)_4$ (3.0 mg), following the same procedure above, which lead to 13-335-$B_2$. After removing DMF, the crude product was used directly in the next step (FIG. 28).

Synthesis of Nanoribbon Intermediate CX-13-336 (FIG. 28)

A solution of 13-335-$I_2$ polymer, 13-335-$B_2$ polymer and $K_3PO_4$ (27.2 mg. 0.128 mmol) in 1 ml DMF was degassed 5 times with argon bubbling. Then $Pd(PPh_3)_4$ (4.2 mg) was added, and the reaction mixture was degassed 3 times with argon bubbling. Then the reaction mixture was heated up to 100° C. and stirred under argon overnight. Solvent was removed, the residue was dissolved in 0.5 ml THF and purified by SEC column to yield 7.0 mg polymer CX-13-336 (FIG. 28).

Synthesis of Nanoribbon Intermediate CX-13-337 (FIG. 29)

Polymer CX-13-336, purified by SEC column, (7.0 mg), 1,4-benzenediboronic acid bis(pinacol) ester (26a) (16.5 mg, 0.049 mmol,) and $K_3PO_4$ (0.128 mmol, 27.2 mg) in 1 ml DMF was degassed 5 times with argon bubbling. Then $Pd(PPh_3)_4$ (4.2 mg) was added, and the reaction mixture was degassed 3 times with argon bubbling. Then the reaction mixture was heated up to 100° C. and stirred under argon overnight. After removing DMF, the crude product was dissolved in 0.5 ml THF and purified by SEC column.

The resulting polymer (5.0 mg) was dissolved in 0.5 ml DMF, and cap Compound 29a (9 mg, 0.013 mmol) was added, followed by $K_3PO_4$ (5.0 mg, 0.023 mmol), was degassed 5 times with argon bubbling. Then $Pd(PPh_3)_4$ (3.0 mg) was added. The reaction mixture was microwaved at 150° C. for 1 hour. After cooling, solvent was removed and the residue purified by SEC column to yield 3.5 g polymer CX-13-337 (FIG. 29). MALDI/TOF mass spectroscopy suggests increasing fractions of 20 KDalton to 40 KDalton polymer with each Suzuki coupling step and gel permeation chromatography.

Synthesis of Nanoribbon Compound (XV) (FIG. 30)

Polymer CX-13-337 (3.5 mg, purified from SEC column) was dissolved in 20 ml dichloromethane, and argon was bubbled through for 10 minutes. Iron (III) chloride (120 mg) dissolved 3 ml nitromethane was added slowly and the resulting mixture stirred for 1 hour at RT, after which time about 1-2 mg of insoluble black precipitate formed. The reaction mixture was quenched with 20 ml methanol, solvent was removed, and the residue purified with SEC column to afford 1.5 mg product. The soluble product had lost at least 30% of its PEG chains during the dehydrogenation step, as judged from integration of the $^1H$ NMR spectrum.

We claim:

1. A synthetic bridge molecule for use in a molecular electronics sensor, the molecule comprising the structure:

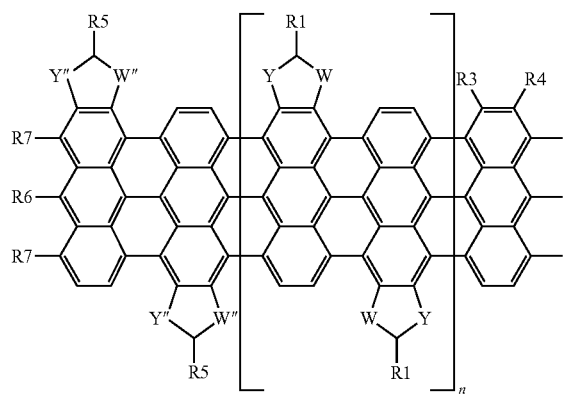

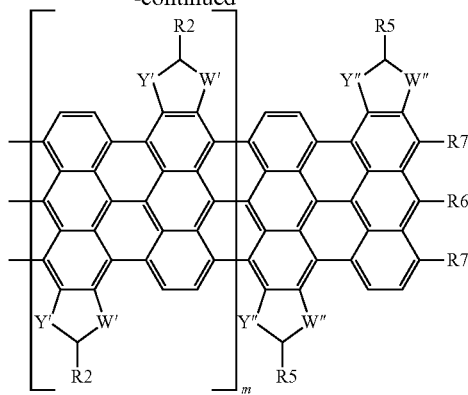

wherein:

n and m are independently 0 to 30;

W and Y are independently selected from —O—, —CH2-, $CR^8R^9$, $CH_2CR^8R^9$, $CR^8CR^9CH_2$, $OCR^8R^9$ and $CR^8R^9O$, wherein $R^8$ and $R^9$ are attached to the same carbon atom and independently selected from H, $CH_3$, $C_2H_5$, $CH_2CH_2CH_3$, or $(CH_2)_x(OCH_2CH_2)_yOR^{10}$, wherein x is 2 to 10, y is 10 to 40 and $R^{10}$ is H, Me, or Et, and wherein $R^8$ and $R^9$ can optionally link to form a ring, wherein O is optionally linked directly to the aromatic ring, and wherein W and Y can optionally be exchanged with one another within a ring;

W' and Y' are independently selected from —O—, —CH2-, $CR^8R^9CH2CR^8R^9$, $CR^8CR^9CH2$, $OCR^8R^9$, and $CR^8R^9O$, wherein $R^8$ and $R^9$ are attached to the same carbon atom and independently selected from H, $CH_3$, $C_2H_5$, $CH_2CH_2CH_3$, or $(CH_2)_x(OCH_2CH_2)_yOR^{10}$, wherein x is 2 to 10, y is 10 to 40 and $R^{10}$ is H, Me, or Et, and wherein $R^8$ and $R^9$ can optionally link to form a ring, wherein O is optionally linked directly to the aromatic ring, and wherein W' and Y' can optionally be exchanged with one another within a ring;

$R^1$ is a moiety selected from (i) ester linked PEG chains $(CH_2)_xCO(OCH_2CH_2)_yOR^{13}$ or $(CH_2)_xOC=OCH_2CH_2CH_2(OCH_2CH_2)_yOR^{13}$, wherein x is from 0 to 10, y is from 10 to 40, and $R^{13}$ is Me or H; or (ii) a water-soluble, ester-linked dendron comprising 8 to 64 branches, each derivatized with water-solubilizing PEG chains of structure $(CH2CH_2O)_zR^{14}$ wherein z is from 1 to 8 and $R^{14}$ is H or Me, wherein the ester-linkage of $R^1$ optionally comprises a 1) photocleavable, 2) redox-cleavable, 3) acid cleavable or 4) base-cleavable linker such that the dendron can be removed using 1) light, 2) an oxidizing or reducing agent, 3) an acid or 4) a base, respectively;

$R^2$ s a moiety selected from (i) ester linked PEG chains $(CH_2)_xCO(OCH_2CH_2)_yOR^{13}$ or $(CH_2)_xOC=OCH_2CH_2CH_2(OCH_2CH_2)_yOR^{13}$ wherein x is from 0 to 10, y is from 10 to 40, and $R^{13}$ is Me or H, ii) a water-soluble, ester-linked dendron linked from the nanoribbon with 4 to 16 branches, each devitalized with water-solubilizing PEG chains $(CH_2CH_2O)_zR^{14}$ wherein z is from 1 to 4 and $R^{14}$ is H or Me, wherein the ester-linkage of $R^2$ optionally comprises a 1) photocleavable, 2) redox-cleavable, 3) acid cleavable or 4) base-cleavable linker such that the dendron can be removed using 1) light, 2) an oxidizing or reducing agent, 3) an acid or 4) a base, respectively;

W'' and Y'' are independently selected from —S—, —CH$_2$—, CH$_2$CH$_2$, CR$^{11}$R$^{12}$, and SCR$^{11}$R$^{12}$, wherein R$^{11}$ and R$^{12}$ are bonded to the same carbon atom and independently selected from H, CH$_3$, C$_2$H$_5$, CH$_2$CH$_2$CH$_3$, CH$_2$CH$_2$SCH$_3$, SCH$_3$, or SCH$_2$CH$_2$SCH$_3$, and wherein R$^8$ and R$^9$ can optionally link to form a ring, wherein S is optionally linked directly to the aromatic ring, and wherein W'' and Y'' can optionally be exchanged with one another within a ring;

R$^5$ is H, SMe, or CH$_2$CH$_2$SMe;

R$^6$ is H, SMe, SCH$_2$CH$_2$SMe, SCH$_2$C(CH$_2$SMe)$_3$, SH, CS$_2$H, CH$_2$SMe, CH$_2$SH, CH$_2$CS$_2$H, 6[1,3-diisopropyl-1H-benzo[d]imidazol-3-ium]-yl or 6-[1,3-diisopropyl-1H-benzo[d]imidazol-3-ium]-thioyl; and R$^7$ is H, SMe, SCH$_2$CH$_2$SMe, SH, CS$_2$H, CH$_2$SMe, CH$_2$SH, CH$_2$CS$_2$H, 6-[1,3-diisopropyl-1H-benzo[d]imidazol-3-ium]-yl or 6-[1,3-diisopropyl-1H-benzo[d]imidazol-3-ium]-thioyl.

2. The synthetic bridge molecule of claim 1, wherein:
m+n=10 to 24;
Y=W=—CH$_2$— or —O—;
Y'=W'=—CH$_2$— or —O—;
Y''=W''=—S—;
R$^1$=—CO—O—(CH$_2$CH$_2$O)n-OCH$_3$, wherein n is between 2 and 7 or between 20 and 48;
R$^2$=—CO—O—(CH$_2$CH$_2$O)$_n$—OCH$_3$, wherein n is between 2 and 7 or between 20 and 48;
R$^3$=(L-Phe-Gly)$_4$-NHOCH$_2$CH$_2$O—N=CH(p-C$_6$H$_4$)CH$_2$—;
R$^4$=H;
R$^5$=CH$_2$CH$_2$SMe;
R$^6$=SCH$_2$CH$_2$SMe; and
R$^7$=H.

3. The synthetic bridge molecule of claim 2, wherein:
R$^1$=PEG-20;
Y and W are —O—;
R$^3$=azido-(CH$_2$)$_{10}$;
R$^4$=biotin-PEG-5;
R$^5$=H;
R$^6$=methylthiol, and
R$^7$=H.

4. The synthetic bridge molecule of claim 1, wherein:
m+n=10 to 24;
Y=W=—CH$_2$— or —O—;
Y'=W'=—CH$_2$— or —O—;
Y''=W''=—S—;
R$^1$=H;
R$^2$=—CO—O—(CH$_2$CH$_2$O)$_n$—OCH$_3$, wherein n is between 2 and 7 or between 20 and 48;
R$^3$=—(CH$_2$)$_n$C(O)NH—CH[(CH$_2$)$_r$(CH$_2$)R$^{18}$][CH$_2$CH$_2$—O—CH$_2$CH$_2$O—(CH$_2$)$_s$R$^{19}$, wherein n, r and s are independently between 2 and 7; and wherein R$^{18}$ and R$^{19}$ are independently selected from —N$_3$, —CC—H, —NHCO-biotin, —CHO, —COCH$_3$ and —O—NH$_2$, with the proviso that R$^{18}$ and R$^{19}$ cannot react with one another;
R$^4$=R$^5$=p- or m-(C$_6$H$_4$)—(CH$_2$)$_t$COO(CH$_2$CH$_2$O)$_u$CH$_3$, wherein t is from 0) to 10 and u is from 5 to 50;
R$^6$=SCH$_2$CH$_2$SMe; and
R$^7$=H.

5. A synthetic bridge molecule according to claim 1, comprising the structure

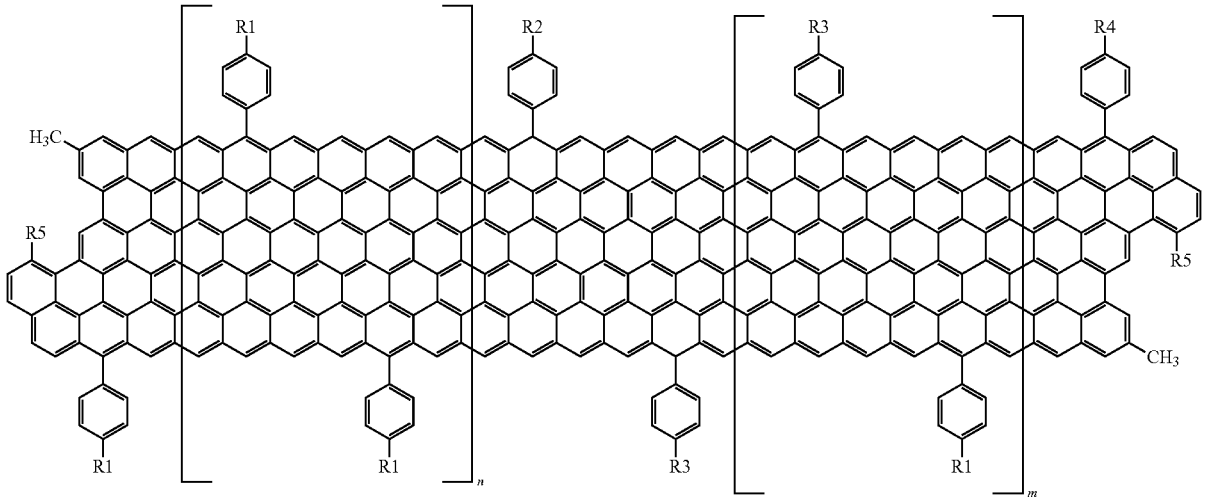

wherein:
n=2;
m=3 to 500;
R$^1$ is selected from: (1) an ester linked PEO chain having the structure (CH$_2$)$_x$CO(OCH$_2$CH$_2$)$_y$OR$^{13}$ or (CH$_2$)$_x$OC=OCH$_2$CH$_2$CH$_2$(OCH$_2$CH$_2$)$_y$OR$^{13}$; wherein x is from 3 to 10, y is from 10 to 40, and R$^{13}$ is Me or H; (2) an ether linked PEG chain having the structure (CH$_2$)O—CH$_2$CH$_2$CH$_2$(OCH$_2$CH$_2$)$_y$OR$^{13}$, wherein x>2, y is from 10 to 40, and R$^{13}$ is Me or H; or (3) water-soluble ester-linked dendron, comprising 8 to 64 branches, each derivatized with water-solubilizing PEG chains (CH$_2$CH$_2$O)$_z$R$^{14}$, wherein z is from 1 to 8 and R$^{14}$ is H or Me, and wherein the ester-linkage of R$^1$ can optionally include a 1) photo-cleavable, 2) redox-cleavable, 3) acid cleavable or 4) base-cleavable linker so that the dendron can be removed using 1) light, 2) an oxidizing or reducing agent, 3) an acid or 4) a base, respectively, after the cap portion of the molecule is linked to gold electrodes;
R$^2$ is selected from: (1) an ester linked PEG chain having structure (CH$_2$)$_x$CO(OCH$_2$CH$_2$)$_y$OR$^{13}$ or $(CH_2)_xOC=OCH_2CH_2CH_2(OCH_2CH_2)_yOR^{13}$, wherein x is from 3 to 10, y is from 10 to 40, and $R^{13}$ is Me or H; (2) an ether linked PEG chain having the structure $(CH_2)_xO-CH_2CH_2CH_2(OCH_2CH_2)_yOR^{13}$, wherein x>2, y is from 10 to 40, and $R^{13}$ is Me or H or (3) —H;

$R^3$=—$(CH_2)_nC(O)NH-CH[(CH_2)_r(CH_2)R^{18}][CH_2CH_2-O-CH_2CH_2O-(CH_2)_sR^{19}$, wherein n, r and s are independently between 2 and 7; and wherein $R^{18}$ and $R^{19}$ are independently selected from —$N_3$, —CC—H, —NHCO-biotin, —CHO, —$COCH_3$ and —O—NH2, with the proviso that R18 AND R19 cannot react with one another;

R4 is H or $SCH_2CH_2SCH_3$; and

R5 is —SH or $SCH_2CH_2SCH_3$.

6. A synthetic bridge molecule according to claim 1, the molecule comprising the structure,

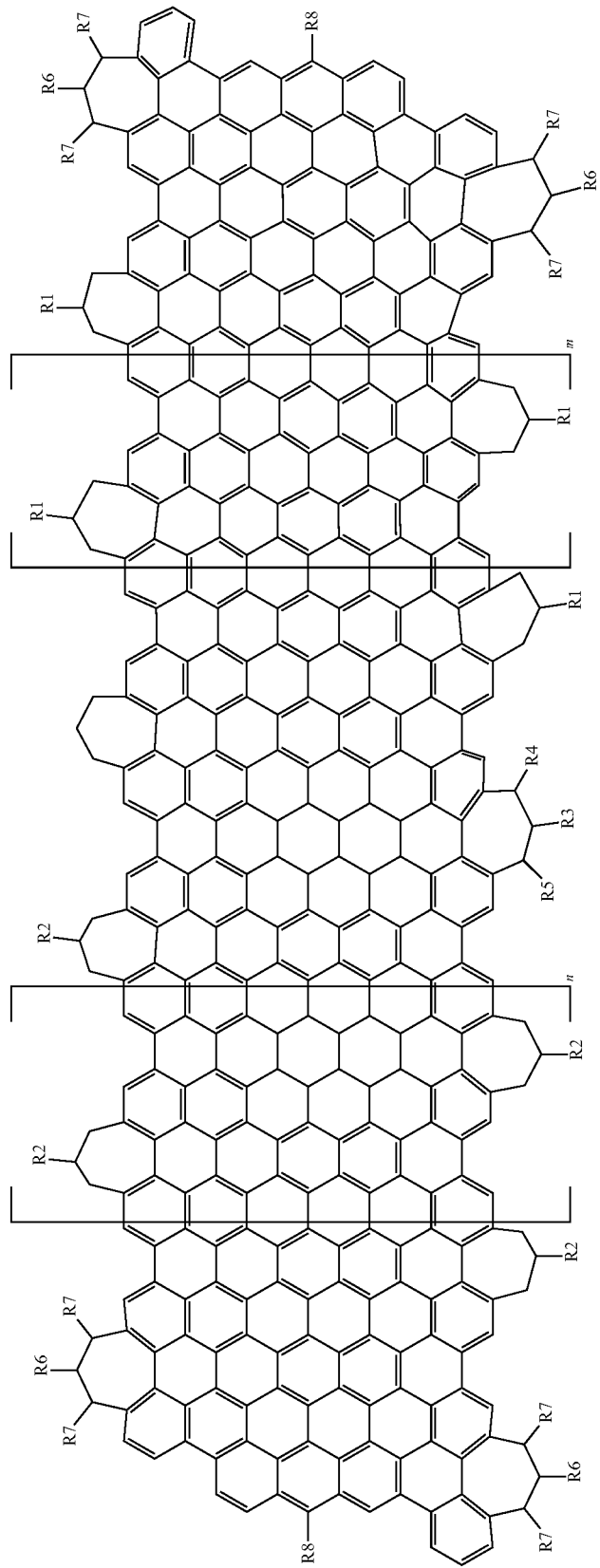

wherein:

n and m are independently 0 to 30;

$R^1=R^2=-(CH_2)_4C(O)O\text{-PEG-48}$;

$R^3=$H or $-NR^9R^{10}$ wherein $R^9$ is linked to a DNA polymerase cysteine residue and $R^{10}$ is either H or $R^{10}$ forms a ring with $R^9$ that does not include the polymerase, or $R^{10}$ is linked to a DNA polymerase cysteine residue that is distinct from the residue linked to $R^9$;

$R^4=R^5=$H $R^6=CH_2SCH_2CH_2SCH_3$ or H, $R^7=CH_2SCH_2CH_2SCH_3$ or H; and $R^8=CH_2SCH_2CH_2SCH_3$ or —SH.

7. The synthetic bridge molecule of claim 6, wherein:

$R^1=R^2=(CH_2)_4C(O)O\text{-PEG-48}$;

$R^3$ is $(CH_2)_4C(O)NH-CH_2CH_2CH(CH_2CH_2CH_2N3)(CH_2CH_2OCH_2CH_2OCH_2CH_2NH\text{-biotin})$;

$R^4=R^5=$H;

$R^6=CH_2SCH_2CH_2SCH_3$ or H;

$R^7=CH_2SCH_2CH_2SCH_3$ or H; and $R^8=CH_2SCH_2CH_2SCH_3$ or —SH.

8. The synthetic bridge molecule of claim 6, wherein:

$R^4$ is linked to a DNA polymerase cysteine residue; and $R^5$ is either H or forms a ring with $R^4$ that does not include the polymerase, or $R^5$ is linked to a DNA polymerase cysteine residue that is distinct from the residue linked to $R^9$.

9. A synthetic bridge molecule according to claim 1, the molecule comprising the structure:

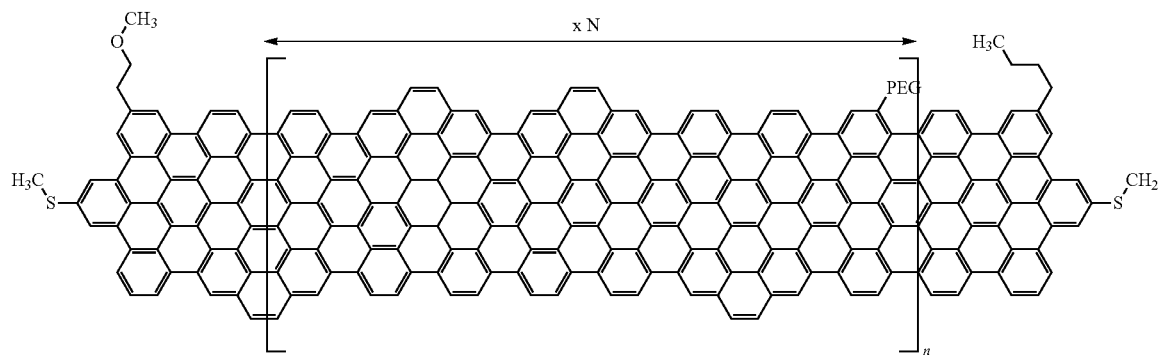

wherein n is an integer chosen such that the length of the synthetic bridge molecule is from about 5 nm to about 30 nm.

10. A synthetic bridge molecule for according to claim 1, the molecule comprising the structure:
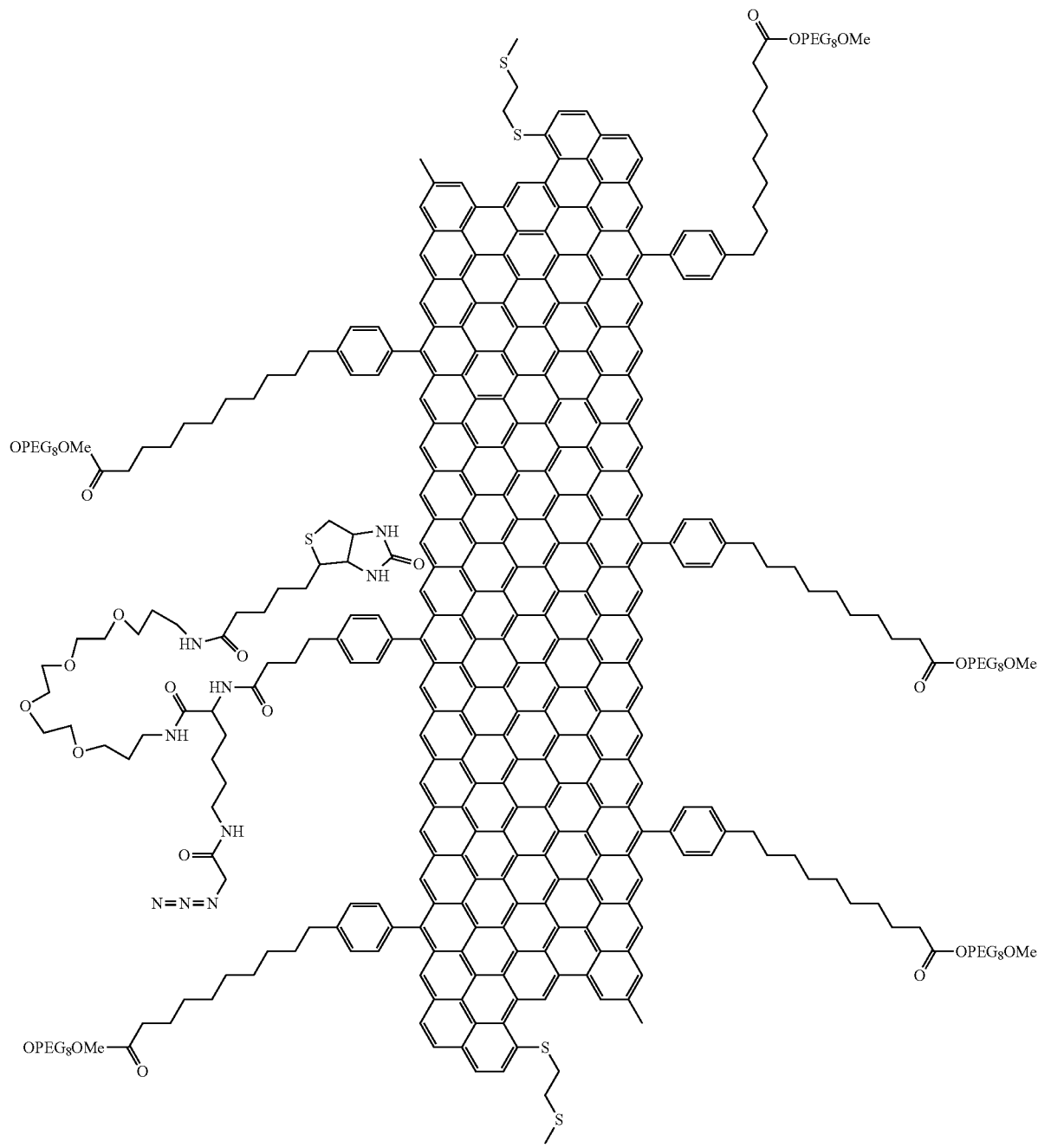
* * * * *